United States Patent
Takahashi et al.

(10) Patent No.: US 11,015,077 B2
(45) Date of Patent: May 25, 2021

(54) PIGMENT DISPERSION LIQUID, CURABLE COMPOSITION, FILM, NEAR INFRARED CUT FILTER, SOLID-STATE IMAGING ELEMENT, IMAGE DISPLAY DEVICE, AND INFRARED SENSOR

(71) Applicant: FUJIFILM Corporation, Tokyo (JP)

(72) Inventors: Kazutaka Takahashi, Haibara-gun (JP); Kyohei Arayama, Haibara-gun (JP); Takuya Tsuruta, Haibara-gun (JP); Tetsushi Miyata, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 25 days.

(21) Appl. No.: 16/413,350

(22) Filed: May 15, 2019

(65) Prior Publication Data

US 2019/0270904 A1 Sep. 5, 2019

Related U.S. Application Data

(63) Continuation of application No. PCT/JP2017/042330, filed on Nov. 27, 2017.

(30) Foreign Application Priority Data

Nov. 30, 2016 (JP) .............................. JP2016-232777

(51) Int. Cl.
*C09D 17/00* (2006.01)
*C09B 67/38* (2006.01)
(Continued)

(52) U.S. Cl.
CPC .......... *C09D 17/002* (2013.01); *C09B 67/008* (2013.01); *C09B 67/009* (2013.01);
(Continued)

(58) Field of Classification Search
CPC .... C09D 17/002; C09D 17/00; C09D 17/003; G02B 5/223; G02B 5/22; C09B 67/008;
(Continued)

(56) References Cited

U.S. PATENT DOCUMENTS

2002/0118285 A1\* 8/2002 Misawa ............... H04N 1/2112
348/208.16
2004/0180235 A1\* 9/2004 Yamamoto ........... C07D 487/04
428/690
(Continued)

FOREIGN PATENT DOCUMENTS

JP 2004-258134 A 9/2004
JP 2010-181596 A 8/2010
(Continued)

OTHER PUBLICATIONS

STN Search Report, pp. 1-27 Jul. 16, 2019.\*
(Continued)

*Primary Examiner* — Alexander C Kollias
(74) *Attorney, Agent, or Firm* — Birch, Stewart, Kolasch & Birch, LLP

(57) ABSTRACT

Provided is a pigment dispersion liquid used in a curable composition capable of manufacturing a film having fewer foreign matters. Provided are a curable composition capable of manufacturing a film having fewer foreign matters, a film, a near infrared cut filter, a solid-state imaging element, an image display device, and an infrared sensor. The pigment dispersion liquid includes a near infrared absorbing organic pigment having an maximum absorption wavelength in a wavelength range of 600 to 1,200 nm; two or more kinds of pigment derivatives having different structures; and a solvent.

22 Claims, 1 Drawing Sheet

(51) Int. Cl.
  *G02B 5/22* (2006.01)
  *C09B 67/22* (2006.01)
  *C09K 3/00* (2006.01)
  *C09B 67/44* (2006.01)
  *C09B 67/46* (2006.01)

(52) U.S. Cl.
  CPC ...... *C09B 67/0033* (2013.01); *C09B 67/0034* (2013.01); *C09B 67/0083* (2013.01); *C09D 17/00* (2013.01); *C09K 3/00* (2013.01); *G02B 5/22* (2013.01); *G02B 5/223* (2013.01)

(58) Field of Classification Search
  CPC ............ C09B 67/0033; C09B 67/0034; C09B 67/0083; C09B 67/009; C09K 3/00
  See application file for complete search history.

(56) References Cited

U.S. PATENT DOCUMENTS

| | | | |
|---|---|---|---|
| 2015/0146057 A1* | 5/2015 | Konishi | G02B 5/208 348/294 |
| 2015/0259547 A1* | 9/2015 | Ezoe | C09D 201/00 257/432 |
| 2017/0010528 A1 | 1/2017 | Takishita et al. | |
| 2017/0190923 A1 | 7/2017 | Tsuruta et al. | |
| 2018/0179306 A1* | 6/2018 | Tone | C08F 20/28 |

FOREIGN PATENT DOCUMENTS

| | | | | |
|---|---|---|---|---|
| JP | 2010-181812 A | | 8/2010 | |
| JP | 2011-38061 A | | 2/2011 | |
| JP | 2014-80576 A | | 5/2014 | |
| JP | 2014-169432 A | | 9/2014 | |
| WO | WO-2015115539 | * | 8/2015 | ............ C09B 21/00 |
| WO | 2015/166779 A1 | | 11/2015 | |
| WO | 2016/052091 A1 | | 4/2016 | |

OTHER PUBLICATIONS

English langague translation of WO 2015/115539, pp. 1-109.*
International Preliminary Report on Patentability and Written Opinion of the International Searching Authority (Forms PCT/IB/326, PCT/IB/373, and PCT/ISA/237) for International Application No. PCT/JP2017/042330, dated Jun. 13, 2019, with English translation.
International Search Report (Form PCT/ISA/210) for International Application No. PCT/JP2017/042330, dated Jan. 30, 2018, with English translation.

* cited by examiner

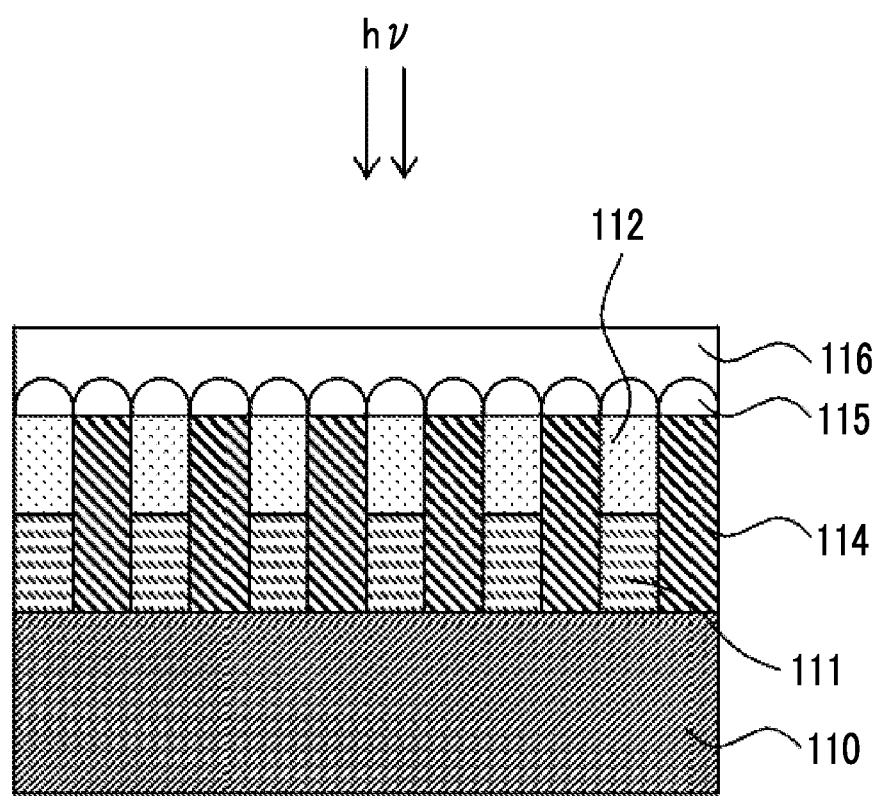

PIGMENT DISPERSION LIQUID, CURABLE COMPOSITION, FILM, NEAR INFRARED CUT FILTER, SOLID-STATE IMAGING ELEMENT, IMAGE DISPLAY DEVICE, AND INFRARED SENSOR

CROSS-REFERENCE TO RELATED APPLICATIONS

This application is a Continuation of PCT International Application No. PCT/JP2017/042330 filed on Nov. 27, 2017, which claims priority under 35 U.S.C § 119(a) to Japanese Patent Application No. 2016-232777 filed on Nov. 30, 2016. Each of the above application(s) is hereby expressly incorporated by reference, in its entirety, into the present application.

BACKGROUND OF THE INVENTION

1. Field of the Invention

The present invention relates to a pigment dispersion liquid, a curable composition, a film, a near infrared cut filter, a solid-state imaging element, an image display device, and an infrared sensor.

2. Description of the Related Art

In recent years, the demand for solid-state imaging elements such as a charge coupled device (CCD) and a complementary metal oxide semiconductor (CMOS) has been greatly increased due to the widespread use of digital cameras, mobile phones with a camera and the like. Color filters are used as key devices for displays and optical elements.

For example, in a color filter, an organic pigment may be used as a colorant. In the case where an organic pigment is used as the colorant, in order to enhance the dispersibility of the organic pigment in the composition, a pigment derivative may be used together with the organic pigment (see, for example, JP2011-038061A, JP2010-181812A, JP2010-181596A, and JP2004-258134A).

Since the solid-state imaging element uses a silicon photodiode having sensitivity to near infrared rays at a light receiving section thereof, it is necessary to correct visual sensitivity, and a near infrared cut filter or the like is used in many cases. For example, the near infrared cut filter is manufactured by using a composition including a near infrared absorbing agent.

SUMMARY OF THE INVENTION

In a case where a near infrared absorbing organic pigment is used as a near infrared absorbing agent, in order to increase the dispersibility of the near infrared absorbing organic pigment in the composition, it has been studied to use a pigment derivative together with the near infrared absorbing organic pigment. For example, it has been studied to prepare and use a pigment dispersion liquid by dispersing the near infrared absorbing organic pigment in the presence of a pigment derivative and a solvent.

The inventors of the present invention have conducted research on a composition including a near infrared absorbing organic pigment and a pigment derivative and found that, in a case where a film was manufactured by using such a composition, a foreign matter derived from a pigment derivative is generated in the film in some cases. In JP2011-038061A, JP2010-181812A, JP2010-181596A, and JP2004-258134A, the near infrared absorbing organic pigment is not disclosed.

An object of the present invention is to provide a pigment dispersion liquid and a curable composition capable of manufacturing a film having fewer foreign matters. Another object of the present invention is to provide a film, a near infrared cut filter, a solid-state imaging element, an image display device, and an infrared sensor.

As the pigment derivative to be used in combination with the near infrared absorbing organic pigment, in order to not influence the dispersibility of the near infrared absorbing organic pigment or the visible transparency of the near infrared absorbing organic pigment, a compound having a structure similar to the near infrared absorbing organic pigment is used in some cases. The near infrared absorbing organic pigment includes a wide conjugated structure in many cases, and thus even in the pigment derivatives used in combination with the near infrared absorbing organic pigment, a compound having a wide conjugated structure is used in many cases. Meanwhile, in the composition, most of the pigment derivatives are adsorbed in the near infrared absorbing organic pigment, but a portion thereof is not adsorbed and is free in the composition in some cases. Here, as the conjugated structure of the compound becomes wider, the π-π interaction becomes stronger, and thus the crystal growth due to associate formation easily occurs. Therefore, the inventors of the present invention have considered that, in a case where a film is formed by using the composition including a near infrared absorbing organic pigment and a pigment derivative, a foreign matter derived from the pigment derivative is formed, because the crystallinity of the pigment derivative that is free in the composition is high. The inventors of the present invention thought that it is possible to form a film having fewer foreign matters by decreasing the crystallinity of the pigment derivative that is free in the composition, so as to complete the present invention. The present invention provides the following.

<1> A pigment dispersion liquid comprising: a near infrared absorbing organic pigment having an maximum absorption wavelength in a wavelength range of 600 to 1,200 nm; two or more kinds of pigment derivatives having different structures; and a solvent.

<2> The pigment dispersion liquid according to <1>, in which the near infrared absorbing organic pigment has an maximum absorption wavelength in a wavelength range of 700 to 1,000 nm.

<3> The pigment dispersion liquid according to <1> or <2>, in which the pigment derivative is a compound represented by Formula (1);

$$P\text{-}(\text{-}L\text{-}(X)_n)_m \quad (1)$$

in Formula (1), P represents a coloring agent structure, L represents a single bond or a linking group, X represents an acid group, a basic group, a group having a salt structure, or a phthalimide group, m represents an integer of 1 or more, n represents an integer of 1 or more, in a case where m is 2 or more, a plurality of L's and X's may be different from each other, and in a case where n is 2 or more, a plurality of X's may be different from each other.

<4> The pigment dispersion liquid according to <3>, in which at least two kinds of two or more kinds of the pigment derivatives having different structures are compounds in which L's in Formula (1) are linking groups of a structural isomer.

<5> The pigment dispersion liquid according to <3>, in which, with respect to at least two kinds of two or more kinds of the pigment derivatives having different structures, a difference in the numbers of carbon atoms of L's in Formula (1) is 6 or less.

<6> The pigment dispersion liquid according to any one of <3> to <5>, in which at least two kinds of two or more kinds of the pigment derivative having different structures are compounds having different X's in Formula (1).

<7> The pigment dispersion liquid according to any one of <3> to <6>, in which at least two kinds of two or more kinds of the pigment derivative having different structures are compounds in which P in Formula (1) has a common skeleton.

<8> The pigment dispersion liquid according to any one of <3> to <7>, in which the coloring agent structure represented by P in Formula (1) is a coloring agent structure derived from a coloring agent compound having a π conjugate plane including a monocyclic or fused aromatic ring.

<9> The pigment dispersion liquid according to any one of <3> to <8>, in which the coloring agent structure represented by P in Formula (1) is a pyrrolo pyrrole coloring agent structure or a squarylium coloring agent structure.

<10> The pigment dispersion liquid according to <9>, in which the coloring agent structure represented by P in Formula (1) is a pyrrolo pyrrole coloring agent structure.

<11> The pigment dispersion liquid according to any one of <1> to <10>, in which the pigment derivative is a compound having a coloring agent structure having a skeleton common to the near infrared absorbing organic pigment.

<12> The pigment dispersion liquid according to any one of <1> to <11>, in which the pigment derivative is a compound having an acid group.

<13> The pigment dispersion liquid according to any one of <1> to <12>, in which a content of one kind of the pigment derivative included in two or more kinds of the pigment derivatives having different structures is 99 mass % or less.

<14> A curable composition comprising: the pigment dispersion liquid according to any one of <1> to <13>; and a curable compound.

<15> A film formed of the curable composition according to <14>.

<16> A near infrared cut filter comprising: the film according to <15>.

<17> A solid-state imaging element comprising: the film according to <15>.

<18> An image display device comprising: the film according to <15>.

<19> An infrared sensor comprising: the film according to <15>.

According to the present invention, it is possible to provide a pigment dispersion liquid and a curable composition capable of manufacturing a film having fewer foreign matters. It is possible to provide a film, a near infrared cut filter, a solid-state imaging element, an image display device, and an infrared sensor.

BRIEF DESCRIPTION OF THE DRAWINGS

FIG. 1 is a schematic diagram illustrating an embodiment of an infrared sensor.

DESCRIPTION OF THE PREFERRED EMBODIMENTS

Hereinafter, the content of the present invention is specifically described.

In the present specification, "to" is used to mean that the numerical values listed before and after "to" are a lower limit and an upper limit respectively.

In the present specification, "(meth)acrylate" represents both or any one of "acrylate" or "methacrylate", "(meth)acrylic" represents both or any one of "acrylic" or "methacrylic", and "(meth)acryloyl" represents both or any one of "acryloyl" or "methacryloyl".

With respect to an indication of a group (atomic group) in the present specification, an indication in which substitution or unsubstitution is not described includes a group (atomic group) having a substituent together with a group (atomic group) not having a substituent. For example, an "alkyl group" includes not only an alkyl group not having a substituent (unsubstituted alkyl group) but also an alkyl group having a substituent (substituted alkyl group).

In the present specification, Me in the chemical formula indicates a methyl group, Et indicates an ethyl group, Pr indicates a propyl group, Bu indicates a butyl group, and Ph indicates a phenyl group.

In the present specification, the near infrared ray indicates light (electromagnetic wave) having a wavelength range of 700 to 2,500 nm.

In the present specification, the total solid content refers to the total mass of components obtained by removing the solvent from all components of the composition.

In the present specification, the weight-average molecular weight is defined as polystyrene equivalent values measured by gel permeation chromatography (GPC). In the present specification, the weight-average molecular weight (Mw) can be obtained, for example, by using HLC-8220 (manufactured by Tosoh Corporation) as a determination device, TSKgel Super AWM-H (manufactured by Tosoh Corporation, 6.0 mm (inner diameter)×15.0 cm) as a column, and a 10 mmol/L lithium bromide N-methylpyrrolidinone (NMP) solution as an eluent.

<Pigment Dispersion Liquid>

The pigment dispersion liquid according to the embodiment of the present invention includes a near infrared absorbing organic pigment having a maximum absorption wavelength in a wavelength range of 600 to 1,200 nm, and pigment derivatives having two or more different structures, and a solvent.

It is possible to manufacture a film having fewer foreign matters by using the pigment dispersion liquid according to the embodiment of the present invention. The reason that the effect can be obtained is assumed as follows.

As described above, in the pigment dispersion liquid, most of the pigment derivatives are adsorbed on the near infrared absorbing organic pigment, but some are not adsorbed and are free in the composition in some cases. However, in the present invention, since two or more kinds of pigment derivatives having different structures are contained, the purity of the pigment derivative that is free in the pigment dispersion liquid is decreased to increase the compatibility between the free pigment derivatives. As a result, it is assumed that the crystallinity of the pigment derivative that is free in the pigment dispersion liquid can be decreased, and it becomes possible to manufacture a film having fewer foreign matters.

With respect to the pigment dispersion liquid according to the embodiment of the present invention, the viscosity at 25°

C. is preferably 1 to 100 mPa·s. According to this aspect, the dispersibility of the pigment is satisfactory. The upper limit is more preferably 50 mPa·s or less and even more preferably 20 mPa·s or less. The concentration of solid contents of the pigment dispersion liquid according to the embodiment of the present invention is preferably 5 to 60 mass % and more preferably 10 to 40 mass %. Hereinafter, the respective components of the pigment dispersion liquid according to the embodiment of the present invention are described.

<<Near Infrared Absorbing Organic Pigment>>

The pigment dispersion liquid according to the embodiment of the present invention contains a near infrared absorbing organic pigment. The near infrared absorbing organic pigment is preferably a coloring agent compound having an maximum absorption wavelength in the wavelength range of 600 to 1,200 nm and more preferably a coloring agent compound having an maximum absorption wavelength in the wavelength range of 700 to 1,000 nm.

The near infrared absorbing organic pigment is preferably a coloring agent compound having a π conjugate plane including a monocyclic or fused aromatic ring. The number of atoms other than hydrogen constituting the 11 conjugate plane included in the above coloring agent compound is preferably 6 or more and more preferably 14 or more. The upper limit is preferably, for example, 50 or less. In a case where the above coloring agent compound has two or more π conjugate planes, the total number of atoms other than hydrogen constituting each π conjugate plane is preferably 14 or more and more preferably 20 or more. The upper limit is preferably, for example, 80 or less. Also in this case, the number of atoms other than hydrogen constituting one it conjugate plane is preferably 6 or more and more preferably 14 or more. The upper limit is preferably, for example, 50 or less. The π conjugated plane of the above coloring agent compound preferably includes two or more monocyclic or fused aromatic rings, more preferably includes three or more of the aromatic rings, even more preferably includes four or more of the aromatic rings, and particularly preferably includes five or more of the aromatic rings. The upper limit is preferably 100 or less, more preferably 50 or less, and even more preferably 30 or less. Examples of the aromatic ring include a benzene ring, a naphthalene ring, a pentalene ring, an indene ring, an azulene ring, a heptalene ring, an indacene ring, a perylene ring, a pentacene ring, a quaterrylene ring, an acenaphthene ring, a phenanthrene ring, anthracene ring, a naphthacene ring, a chrysene ring, a triphenylene ring, a fluorene ring, a pyridine ring, a quinoline ring, an isoquinoline ring, an imidazole ring, a benzimidazole ring, a pyrazole ring, a thiazole ring, a benzothiazole ring, a triazole ring, a benzotriazole ring, an oxazole ring, a benzoxazole ring, an imidazoline ring, a pyrazine ring, a quinoxaline ring, a pyrimidine ring, a quinazoline ring, a pyridazine ring, a triazine ring, a pyrrole ring, an indole ring, an isoindole ring, a carbazole ring, and a fused ring having these rings.

Examples of the near infrared absorbing organic pigment include a pyrrolo pyrrole compound, a phthalocyanine compound, a naphthalocyanine compound, a perylene compound, a cyanine compound, a dithiol metal complex compound, a naphthoquinone compound, an iminium compound, an azo compound, and a squarylium compound, a pyrrolo pyrrole compound, a phthalocyanine compound, a naphthalocyanine compound, a cyanine compound, and a squarylium compound are preferable, and a pyrrolo pyrrole compound is more preferable. The pyrrolo pyrrole compound is preferably a pyrrolo pyrrole boron compound. Since the pyrrolo pyrrole compound is excellent in near infrared absorptivity and excellent invisibility, a near infrared cut filter having excellent near infrared shielding properties and excellent visible transparency or the like can be easily obtained. Examples of the pyrrolo pyrrole compound include compounds disclosed in paragraphs 0016 to 0058 of JP2009-263614A. As a phthalocyanine compound, a naphthalocyanine compound, an iminium compound, a cyanine compound, a squarylium compound, and a croconium compound, compounds disclosed in paragraphs 0010 to 0081 of JP2010-111750A may be used, and the contents thereof are incorporated in the present specification.

According to the present invention, the near infrared absorbing organic pigment is preferably a compound having a coloring agent structure having a skeleton common to a coloring agent structure that is included in the pigment derivative.

According to the present invention, it is also preferable to use two or more kinds of near infrared absorbing organic pigments as the near infrared absorbing organic pigment. In this case, the maximum absorption wavelengths of the respective near infrared absorbing organic pigments may be identical to or different from each other. In a case where two or more kinds of the near infrared absorbing organic pigments having different maximum absorption wavelengths are used, the waveform of the absorption spectrum of the film is expanded compared with the case where one kind of the near infrared absorbing organic pigment was used, and thus near infrared rays in a wider wavelength range can be shielded.

In a case where two or more kinds of the near infrared absorbing organic pigments having different maximum absorption wavelengths are used, it is preferable to use a first pigment having a maximum absorption wavelength in the wavelength range of 600 to 1,200 nm and a second pigment that is on a shorter wavelength side of the maximum absorption wavelength of the first pigment and that has a maximum absorption wavelength in the wavelength range of 600 to 1,200 nm. A difference of the maximum absorption wavelength of the first pigment and the maximum absorption wavelength of the second pigment is preferably 1 to 150 nm.

According to the present invention, the solubility of the near infrared absorbing organic pigment with respect to the solvent (25° C.) included in the pigment dispersion liquid is preferably 0 to 0.1 g/L and more preferably 0 to 0.01 g/L.

In the pigment dispersion liquid according to the embodiment of the present invention, the content of the near infrared absorbing organic pigment is preferably 10 to 60 mass % with respect to the total solid content of the pigment dispersion liquid. The lower limit is preferably 20 mass % or more and more preferably 25 mass % or more. The upper limit is preferably 50 mass % or less and more preferably 45 mass % or less.

(Pyrrolo Pyrrole Compound)

According to the present invention, the pyrrolo pyrrole compound is preferably a compound represented by Formula (PP). The maximum absorption wavelength of the compound represented by Formula (PP) is preferably included in the range of 600 to 1,200 nm, more preferably included in in the range of 700 to 1,000 nm, even more preferably included in the range of 730 to 980 nm, and still even more preferably included in the range of 750 to 950 nm. The maximum absorption wavelength of the compound is designed according to the performance required in an optical device such as a solid-state imaging element or an infrared sensor described below.

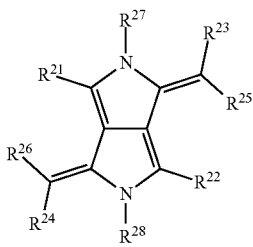

(PP)

In Formula (PP), $R^{21}$ and $R^{22}$ each independently represent an alkyl group, an aryl group or a heteroaryl group, $R^{23}$, $R^{24}$, $R^{25}$, and $R^{26}$ each independently represent a cyano group, an acyl group, an alkoxycarbonyl group, an alkylsulfinyl group, an arylsulfinyl group, or a heteroaryl group, $R^{27}$ and $R^{28}$ each independently represent a hydrogen atom, an alkyl group, an aryl group, a heteroaryl group, —$BR^{29}R^{30}$, or a metal atom, $R^{27}$ may form a covalent bond or a coordinate bond with $R^{21}$, $R^{23}$, or $R^{25}$, $R^{28}$ may form a covalent bond or a coordinate bond with $R^{22}$, $R^{24}$, or $R^{26}$, and $R^{29}$ and $R^{30}$ each independently represent a hydrogen atom, a halogen atom, an alkyl group, an aryl group, a heteroaryl group, an alkoxy group, an aryloxy group, or a heteroaryloxy group, and $R^{29}$ and $R^{30}$ may be bonded to each other to form a ring.

In Formula (PP), $R^{21}$ and $R^{22}$ each independently represent an alkyl group, an aryl group or a heteroaryl group, is preferably an aryl group or a heteroaryl group, and is more preferably an aryl group.

The number of carbon atoms of the alkyl group represented by $R^{21}$ and $R^{22}$ is preferably 1 to 30, more preferably 1 to 20, and even more preferably 1 to 10.

The number of carbon atoms of the aryl group represented by $R^{21}$ and $R^{22}$ is preferably 6 to 30, more preferably 6 to 20, and is particularly preferably 6 to 12.

The number of the carbon atoms constituting the heteroaryl group represented by $R^{21}$ and $R^{22}$ is preferably 1 to 30 and more preferably 1 to 12. Examples of the kinds of the heteroatom constituting a heteroaryl group include a nitrogen atom, an oxygen atom, and a sulfur atom. The number of the heteroatoms constituting a heteroaryl group is preferably 1 to 3 and more preferably 1 to 2. The heteroaryl group is preferably a monocyclic ring or a fused ring, more preferably a monocyclic ring or a fused ring having a fused number of 2 to 8, and even more preferably a monocyclic ring or a fused ring having a fused number of 2 to 4.

The alkyl group, the aryl group, and the heteroaryl group may have a substituent and may be unsubstituted. It is preferable to have a substituent. Examples of the substituent include a hydrocarbon group which may contain an oxygen atom, an amino group, an acylamino group, an alkoxycarbonylamino group, an aryloxycarbonylamino group, a heteroaryloxycarbonylamino group, a sulfonylamino group, a sulfamoyl group, a carbamoyl group, an alkylthio group, an arylthio group, a heteroarylthio group, an alkylsulfonyl group, an arylsulfonyl group, a heteroarylsulfonyl group, an alkylsulfinyl group, an arylsulfinyl group, a heteroarylsulfinyl group, a ureido group, a phosphoric acid amide group, a mercapto group, an alkylsulfino group, an arylsulfino group, a hydrazino group, an imino group, a silyl group, a hydroxy group, a halogen atom, and a cyano group, and a hydrocarbon group which may contain an oxygen atom, or a halogen atom is preferable. In view of the dispersibility of the near infrared absorbing organic pigment, the substituent is preferably a group (that is, an acidic group, a basic group, a group having a salt structure, and a group other than a phthalimide group) other than the group represented by X of the compound (pigment derivative) represented by Formula (1). Specific examples of the acidic group, the basic group, and the group having a salt structure include a group described in X of the compound (pigment derivative) represented by Formula (1).

Examples of the halogen atom as the substituent include a fluorine atom, a chlorine atom, a bromine atom, and an iodine atom.

Examples of the hydrocarbon group as the substituent include an alkyl group, an alkenyl group, and an aryl group.

The number of carbon atoms of the alkyl group is preferably 1 to 40. The lower limit is more preferably 3 or more, even more preferably 5 or more, still even more preferably 8 or more, and particularly preferably 10 or more. The upper limit is more preferably 35 or less and even more preferably 30 or less. The alkyl group may be linear, branched, or cyclic, but is preferably linear or branched, and particularly preferably branched. The number of carbon atoms of the branched alkyl group is preferably 3 to 40. For example, the lower limit is more preferably 5 or more, even more preferably 8 or more, and still even more preferably 10 or more. The upper limit is more preferably 35 or less and even more preferably 30 or less. The number of branches of the branched alkyl group is preferably 2 to 10 and more preferably 2 to 8.

The number of carbon atoms of the alkenyl group is preferably 2 to 40. For example, the lower limit is more preferably 3 or more, even more preferably 5 or more, still even more preferably 8 or more, and particularly preferably 10 or more. The upper limit is more preferably 35 or less and even more preferably 30 or less. The alkenyl group may be linear, branched, or cyclic, but is preferably linear or branched, and particularly preferably branched. The number of carbon atoms of the branched alkenyl group is preferably 3 to 40. For example, the lower limit is more preferably 5 or more, even more preferably 8 or more, and still even more preferably 10 or more. The upper limit is more preferably 35 or less and even more preferably 30 or less. The number of branches of the branched alkenyl group is preferably 2 to 10 and more preferably 2 to 8.

The number of carbon atoms of the aryl group is preferably 6 to 30, more preferably 6 to 20, and even more preferably 6 to 12.

Examples of the hydrocarbon group including an oxygen atom include a group represented by -L-$R^{x1}$.

L represents —O—, —CO—, —COO—, —OCO—, —($OR^{x2}$)$_m$—, or —($R^{x2}O$)$_m$—. $R^{x1}$ represents an alkyl group, an alkenyl group, or an aryl group. $R^{x2}$ represents an alkylene group or an arylene group. m represents an integer of 2 or more, and m items of $R^{x2}$'s may be identical to or different from each other.

L is preferably —O—, —($OR^{x2}$)$_n$—, or —($R^{x2}O$)$_m$— and more preferably —O—. L is preferably —OCO—.

The alkyl group, the alkenyl group, and the aryl group represented by $R^{x1}$ are the same as described above, and the preferable ranges are also the same. $R^{x1}$ is preferably an alkyl group or an alkenyl group and more preferably an alkyl group. In a case where L is —OCO—, $R^{x1}$ is preferably an aryl group.

The number of carbon atoms of the alkylene group represented by $R^{x2}$ is preferably 1 to 20, more preferably 1 to 10, and even more preferably 1 to 5. The alkylene group may be linear, branched, or cyclic, but is preferably linear or branched. The number of carbon atoms of the arylene group represented by $R^{x2}$ is preferably 6 to 20 and more preferably 6 to 12. $R^{x2}$ is preferably an alkylene group.

m represents an integer of 2 or more, is preferably 2 to 20, and is more preferably 2 to 10.

The substituent that may be included in the alkyl group, the aryl group, and the heteroaryl group is preferably a group having a branched alkyl structure. The substituent is preferably a hydrocarbon group including an oxygen atom and is more preferably a hydrocarbon group including an oxygen atom. The hydrocarbon group including an oxygen atom is preferably a group represented by $—O—R^{x1}$. $R^{x1}$ is preferably an alkyl group or an alkenyl group, more preferably an alkyl group, and particularly preferably a branched alkyl group. That is, the substituent is more preferably an alkoxy group or particularly preferably a branched alkoxy group. In a case where the substituent is an alkoxy group, a film having the heat resistance and the light resistance is easily obtained. The number of carbon atoms of the alkoxy group is preferably 1 to 40. For example, the lower limit is more preferably 3 or more, even more preferably 5 or more, still even more preferably 8 or more, and particularly preferably 10 or more. The upper limit is more preferably 35 or less and even more preferably 30 or less. The alkoxy group may be linear, branched, or cyclic, but is preferably linear or branched, and particularly preferably branched. The number of carbon atoms of the branched alkoxy group is preferably 3 to 40. For example, the lower limit is more preferably 5 or more, even more preferably 8 or more, and still even more preferably 10 or more. The upper limit is more preferably 35 or less and even more preferably 30 or less. The number of branches of the branched alkoxy group is preferably 2 to 10 and more preferably 2 to 8.

In Formula (PP), $R^{23}$, $R^{24}$, $R^{25}$, and $R^{26}$ each independently represent a cyano group, an acyl group, an alkoxycarbonyl group, an alkylsulfinyl group, an arylsulfinyl group, or a heteroaryl group.

It is preferable that one of $R^{23}$ and $R^{25}$ represents a cyano group, an acyl group, an alkoxycarbonyl group, an alkylsulfinyl group, or an arylsulfinyl group and the other represents a heteroaryl group, and it is more preferable that one of $R^{23}$ and $R^{25}$ represents a cyano group and the other represents a heteroaryl group.

It is preferable that one of $R^{24}$ and $R^{26}$ represents a cyano group, an acyl group, an alkoxycarbonyl group, an alkylsulfinyl group, or an arylsulfinyl group and the other represents a heteroaryl group, and it is more preferable that one of $R^{24}$ and $R^{26}$ represents a cyano group and the other represents a heteroaryl group.

The heteroaryl group is preferably a 5-membered ring or a 6-membered ring. The heteroaryl group is preferably a monocyclic ring or a fused ring, more preferably a monocyclic ring or a fused ring having a fused number of 2 to 8, and even more preferably a monocyclic ring or a fused ring having a fused number of 2 to 4. The number of the heteroatoms constituting the heteroaryl group is preferably 1 to 3 and more preferably 1 to 2. Examples of the heteroatom include a nitrogen atom, an oxygen atom, and a sulfur atom. The heteroaryl group preferably has one or more nitrogen atoms. The number of carbon atoms constituting the heteroaryl group is preferably 1 to 30 and more preferably 1 to 12. The heteroaryl group may be a substituent and may be unsubstituted. Examples of the substituent include groups described in a substituent T. In view of the dispersibility of the pigment, the substituent is preferably a group (that is, an acidic group, a basic group, a group having a salt structure, and a group other than a phthalimide group) other than the group represented by X of the compound (pigment derivative) represented by Formula (1). Specific examples of the acidic group, the basic group, and the group having a salt structure include a group described in X of the compound (pigment derivative) represented by Formula (1).

(Substituent T)

An alkyl group (preferably an alkyl group having 1 to 30 carbon atoms), an alkenyl group (preferably an alkenyl group having 2 to 30 carbon atoms), an alkynyl group (preferably an alkynyl group having 2 to 30 carbon atoms), an aryl group (preferably an aryl group having 6 to 30 carbon atoms), an amino group (preferably an amino group having 0 to 30 carbon atoms), an alkoxy group (preferably an alkoxy group having 1 to 30 carbon atoms), an aryloxy group (preferably an aryloxy group having 6 to 30 carbon atoms), a heteroaryloxy group, an acyl group (preferably an acyl group having 1 to 30 carbon atoms), an alkoxycarbonyl group (preferably an alkoxycarbonyl group having 2 to 30 carbon atoms), an aryloxycarbonyl group (preferably an aryloxycarbonyl group having 7 to 30 carbon atoms), an acyloxy group (preferably an acyloxy group having 2 to 30 carbon atoms), an acylamino group (preferably an acylamino group having 2 to 30 carbon atoms), an alkoxycarbonylamino group (preferably an alkoxycarbonylamino group having 2 to 30 carbon atoms), an aryloxycarbonylamino group (preferably an aryloxycarbonylamino group having 7 to 30 carbon atoms), a sulfamoyl group (preferably a sulfamoyl group having 0 to 30 carbon atoms), a carbamoyl group (preferably a carbamoyl group having 1 to 30 carbon atoms), an alkylthio group (preferably an alkylthio group having 1 to 30 carbon atoms), an arylthio group (preferably an arylthio group having 6 to 30 carbon atoms), a heteroarylthio group (preferably having 1 to 30 carbon atoms), an alkylsulfonyl group (preferably having 1 to 30 carbon atoms), an arylsulfonyl group (preferably having 6 to 30 carbon atoms), a heteroarylsulfonyl group (preferably having 1 to 30 carbon atoms), an alkylsulfinyl group (preferably having 1 to 30 carbon atoms), an arylsulfinyl group (preferably having 6 to 30 carbon atoms), a heteroarylsulfinyl group (preferably having 1 to 30 carbon atoms), a ureido group (preferably having 1 to 30 carbon atoms), a phosphoric acid amide group (preferably having 1 to 30 carbon atoms), a hydroxy group, a mercapto group, a halogen atom, a cyano group, an alkylsulfino group, an arylsulfino group, a hydrazino group, an imino group, and a heteroaryl group (preferably having 1 to 30 carbon atoms). When these groups are further substitutable groups, the groups may further have a substituent. Examples of the substituent include the groups described as the substituent T.

The heteroaryl group represented by $R^{23}$ to $R^{26}$ is preferably a group represented by Formula (A-1) and a group represented by (A-2).

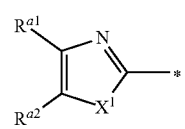

(A-1)

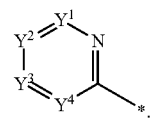

(A-2)

In Formula (A-1), $X^1$ represents O, S, $NR^{X1}$, or $CR^{X2}R^{X3}$, $R^{X1}$ to $R^{X3}$ each independently represent a hydrogen atom or a substituent, $R^{a1}$ and $R^{a2}$ each independently represent a hydrogen atom or a substituent, and $R^{a1}$ and $R^{a2}$ may be bonded to each other to form a ring. * represents a bonding position in Formula (PP).

Examples of $R^{a1}$, $R^{a2}$, and a substituent represented by $R^{X1}$ to $R^{X3}$ include the substituent T, and an alkyl group, an aryl group, and a halogen atom are preferable.

A ring formed by bonding $R^{a1}$ and $R^{a2}$ is preferably an aromatic ring. In a case where $R^{a1}$ and $R^{a2}$ forms a ring, examples of (A-1) include a group represented by (A-1-1) and a group represented by (A-1-2).

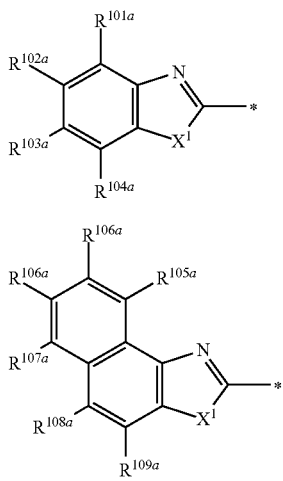

In the formulae, $X^1$ represents O, S, $NR^{X1}$, or $CR^{X2}R^{X3}$, $R^{X1}$ to $R^{X3}$ each independently represent a hydrogen atom or a substituent, and $R^{101a}$ to $R^{109a}$ each independently represent a hydrogen atom or a substituent. * represents a bonding position in Formula (PP). Examples of the substituent represented by $R^{101a}$ to $R^{109a}$ include the substituent T.

In Formula (A-2), $Y^1$ to $Y^4$ each independently represent N or $CR^{Y1}$, at least two of $Y^1$, ..., or $Y^4$ are $CR^{Y1}$, $R^{Y1}$ represents a hydrogen atom or a substituent, and adjacent $R^{Y1}$'s may be bonded to each other to form a ring. * represents a bonding position in Formula (PP). Examples of the substituent represented by $R^{Y1}$ include the substituent T, and an alkyl group, an aryl group, and a halogen atom are preferable.

At least two of $Y^1$, ..., or $Y^4$ are $CR^{Y1}$, and adjacent $R^{Y1}$'s may be bonded to each other to form a ring. A ring formed by bonding adjacent $R^{Y1}$'s to each other is preferably an aromatic ring. In a case where a ring is formed by adjacent $R^{Y1}$'s, examples of (A-2) include a group represented by (A-2-1) and a group represented by (A-2-2).

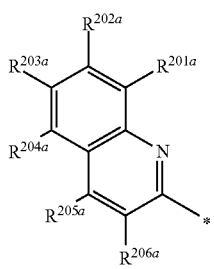

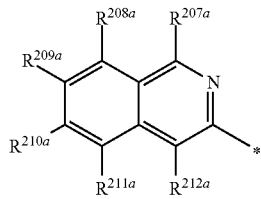

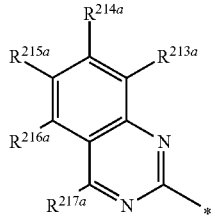

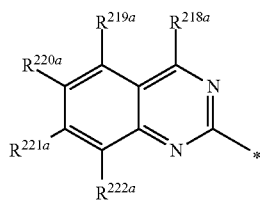

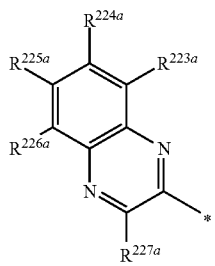

In the formulae, $R^{201a}$ to $R^{227a}$ each independently represent a hydrogen atom or a substituent, and * represents a bonding position in Formula (PP). Examples of the substituent represented by $R^{201a}$ to $R^{227a}$ include the substituent T.

In Formula (PP), $R^{27}$ and $R^{28}$ each independently represent a hydrogen atom, an alkyl group, an aryl group, a heteroaryl group, $-BR^{29}R^{30}$, or a metal atom, and $-BR^{29}R^{30}$ is preferable.

In a case where $R^{27}$ and $R^{28}$ represent an alkyl group, an aryl group, or a heteroaryl group, examples of the alkyl group, the aryl group, and the heteroaryl group include groups described in $R^{21}$ and $R^{22}$, and preferable ranges are also the same.

In a case where $R^{27}$ and $R^{28}$ represent metal atoms, examples of the metal atom include magnesium, aluminum, calcium, barium, zinc, tin, vanadium, iron, cobalt, nickel, copper, palladium, iridium, and platinum, and aluminum, zinc, vanadium, iron, copper, palladium, iridium, and platinum are particularly preferable.

In a case where $R^{27}$ and $R^{28}$ represent $-BR^{29}R^{30}$, $R^{29}$ and $R^{30}$ each independently represent a hydrogen atom, a halogen atom, an alkyl group, an alkenyl group, an aryl group, a heteroaryl group, an alkoxy group, an aryloxy group, or a heteroaryloxy group, a halogen atom, an alkyl group, an aryl group, or a heteroaryl group is preferable, a halogen atom, an alkyl group, or an aryl group is more preferable, and an aryl group is even more preferable. $R^{29}$ and $R^{30}$ may be bonded to each other to form a ring.

The halogen atom represented by $R^{29}$ and $R^{30}$ is preferably a fluorine atom, a chlorine atom, a bromine atom, and an iodine atom and particularly preferably a fluorine atom.

The number of carbon atoms of the alkyl group and the alkoxy group represented by $R^{29}$ and $R^{30}$ is preferably 1 to 40. For example, the lower limit is more preferably 3 or more. For example, the upper limit is more preferably 30 or less and even more preferably 25 or less. The alkyl group and the alkoxy group may be linear, branched, or cyclic, but is preferably linear or branched.

The number of carbon atoms of the alkenyl group represented by $R^{29}$ and $R^{30}$ is preferably 2 to 40. For example, the lower limit is more preferably 3 or more. For example, the upper limit is more preferably 30 or less and even more preferably 25 or less.

The number of carbon atoms of the aryl group and the aryloxy group represented by $R^{29}$ and $R^{30}$ is preferably 6 to 20 and more preferably 6 to 12. The aryl group and the aryloxy group may have a substituent and may be unsubstituted. Examples of the substituent include an alkyl group, an alkoxy group, and a halogen atom. Specific examples of these include those described above.

The heteroaryl group and the heteroaryloxy group represented by $R^{29}$ and $R^{30}$ may be monocyclic or polycyclic. The number of heteroatoms constituting the heteroaryl ring of the heteroaryl group and the heteroaryloxy group is preferably 1 to 3. The heteroatom constituting the heteroaryl ring is preferably a nitrogen atom, an oxygen atom, or a sulfur atom. The number of carbon atoms constituting the heteroaryl ring is preferably 3 to 30, more preferably 3 to 18, even more preferably 3 to 12, and particularly preferably 3 to 5. The heteroaryl ring is preferably a 5-membered ring or a 6-membered ring. The heteroaryl group and the heteroaryloxy group may have a substituent or may be unsubstituted. Examples of the substituent include an alkyl group, an alkoxy group, and a halogen atom. Specific examples of these include those described above.

$R^{29}$ and $R^{30}$ of $-BR^{29}R^{30}$ are bonded to each other to form a ring. Examples thereof include a structure represented by (B-1) to (B-4). Hereinafter, R represents a substituent, $R^{a1}$ to $R^{a4}$ each independently represent a hydrogen atom or a substituent, m1 to m3 each independently represent an integer of 0 to 4, and * represents a bonding position in Formula (PP). Examples of the substituent represented by R and $R^{a1}$ to $R^{a4}$ include a substituent described in the substituent T, and a halogen atom, an alkyl group, and an alkoxy group are preferable.

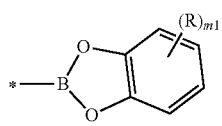

(B-1)

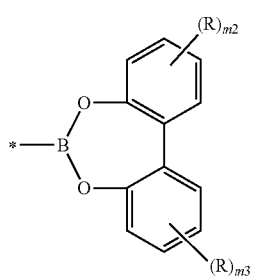

(B-2)

(B-3)

(B-4)

In Formula (PP), $R^{27}$ may form a covalent bond or a coordinate bond with $R^{21}$, $R^{23}$ or $R^{25}$, and $R^{28}$ may form a covalent bond or a coordinate bond with $R^{22}$, $R^{24}$ or $R^{26}$.

In Formula (PP), it is preferable that one or more of $R^{21}$ to $R^{28}$ is the same as the substituent included in the compound represented by Formula (1a), and it is more preferable that four or more are the same.

The pyrrolo pyrrole compound is preferably a compound represented by Formula (II) and a compound represented by Formula (III). According to this aspect, it is easy to manufacture a film having excellent near infrared shielding properties and excellent light resistance.

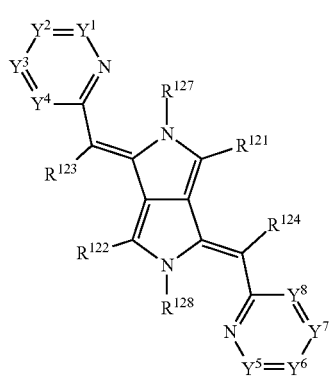

(II)

(III)

In Formula (II), $X^1$ and $X^2$ each independently represent O, S, $NR^{X1}$, or $CR^{X2}R^{X3}$, and $R^{X1}$ to $R^{X3}$ each independently represent a hydrogen atom or a substituent, $R^{a1}$ to $R^{a4}$ each independently represent a hydrogen atom or a substituent, and $R^{a1}$ and $R^{a2}$, or $R^{a1}$ and $R^{a4}$ are bonded to each other to form a ring, $R^{121}$ and $R^{122}$ each independently represent an alkyl group, an aryl group, or a heteroaryl group, $R^{123}$ and $R^{124}$ represent a cyano group, $R^{127}$ and $R^{128}$ each independently represent —$BR^{29}R^{30}$, and $R^{29}$ and $R^{30}$ each independently represent a hydrogen atom, a halogen atom, an alkyl group, an aryl group, a heteroaryl group, an alkoxy group, an aryloxy group, or a heteroaryloxy group, and $R^{29}$ and $R^{30}$ may be bonded to each other to form a ring.

$R^{121}$ and $R^{122}$ in Formula (II) are the same as $R^{21}$ and $R^{22}$ of Formula (PP), and the preferable ranges are also the same. $R^{127}$ and $R^{128}$ of Formula (II) are the same as —$BR^{29}R^{30}$ described in $R^{27}$ and $R^{28}$ of Formula (PP), and the preferable ranges are also the same. $X^1$, $X^2$, and $R^{a1}$ to $R^{a4}$ of Formula (II) are the same as $X^1$, $R^{a1}$, and $R^{a2}$ of Formula (A-1), and the preferable ranges are also the same.

In Formula (III), $Y^1$ to $Y^8$ each independently represent N or $CR^{Y1}$, at least two of $Y^1$, ..., or $Y^4$ are $CR^{Y1}$, at least two of $Y^5$, ..., or $Y^8$ are $CR^{Y1}$, $R^{Y1}$ represents a hydrogen atom or a substituent, adjacent $R^{Y1}$'s are bonded to each other to form a ring, $R^{121}$ and $R^{122}$ each independently represent an alkyl group, an aryl group, or a heteroaryl group, $R^{123}$ and $R^{124}$ represent a cyano group, $R^{127}$ and $R^{128}$ each independently represent —$BR^{29}R^{30}$, and $R^{29}$ and $R^{30}$ each independently represent a hydrogen atom, a halogen atom, an alkyl group, an aryl group, a heteroaryl group, an alkoxy group, an aryloxy group, or a heteroaryloxy group, and $R^{29}$ and $R^{30}$ may be bonded to each other to form a ring.

$R^{121}$ and $R^{122}$ of Formula (III) are the same as $R^{21}$ and $R^{22}$ of Formula (PP), and the preferable ranges are also the same. $R^{127}$ and $R^{128}$ of Formula (III) are the same as —$BR^{29}R^{30}$ described in $R^{27}$ and $R^{28}$ of Formula (PP), and the preferable ranges are also the same. $Y^1$ to $Y^8$ of Formula (III) are the same as $Y^1$ to $Y^4$ of Formula (A-2), and the preferable ranges are also the same.

Specific examples of the compound represented by Formula (PP) include compounds below. Paragraphs 0037 to 0052 ([0070] of corresponding US2011/0070407A) of JP2011-068731A can be referred to, and the content thereof is incorporated in the present specification. In the following structural formula, Me represents a methyl group, Bu represents a butyl group, and Ph represents a phenyl group.

TABLE 1

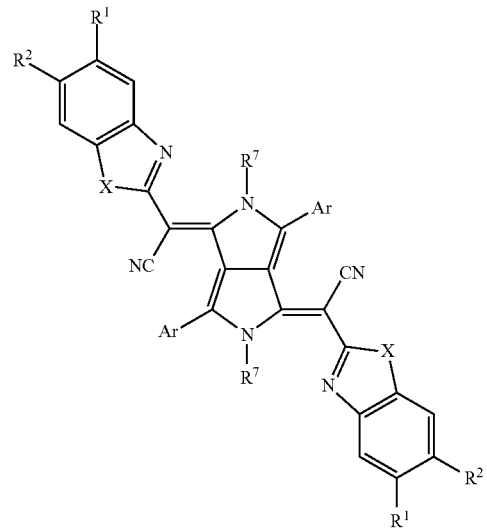

| | X | Ar | $R^1$ | $R^2$ | $R^7$ |
|---|---|---|---|---|---|
| A-1 | S | Ar-1 | H | H | R-1 |
| A-2 | S | Ar-1 | Cl | H | R-1 |
| A-3 | S | Ar-1 | H | Cl | R-1 |
| A-4 | S | Ar-1 | Me | H | R-1 |
| A-5 | S | Ar-1 | H | Me | R-1 |
| A-6 | S | Ar-1 | Me | Me | R-1 |
| A-7 | S | Ar-1 | OMe | H | R-1 |
| A-8 | S | Ar-1 | H | OMe | R-1 |
| A-9 | S | Ar-2 | H | H | R-1 |
| A-10 | S | Ar-2 | Cl | H | R-1 |
| A-11 | S | Ar-2 | H | Cl | R-1 |
| A-12 | S | Ar-2 | Me | H | R-1 |
| A-13 | S | Ar-2 | H | Me | R-1 |
| A-14 | S | Ar-2 | Me | Me | R-1 |
| A-15 | S | Ar-2 | OMe | H | R-1 |
| A-16 | S | Ar-2 | H | OMe | R-1 |
| A-17 | S | Ar-3 | H | H | R-1 |
| A-18 | S | Ar-3 | Cl | H | R-1 |
| A-19 | S | Ar-3 | H | Cl | R-1 |
| A-20 | S | Ar-3 | Me | H | R-1 |
| A-21 | S | Ar-3 | H | Me | R-1 |
| A-22 | S | Ar-3 | Me | Me | R-1 |
| A-23 | S | Ar-3 | OMe | H | R-1 |
| A-24 | S | Ar-3 | H | OMe | R-1 |
| A-25 | S | Ar-4 | H | H | R-1 |
| A-26 | S | Ar-4 | Cl | H | R-1 |
| A-27 | S | Ar-4 | H | Cl | R-1 |
| A-28 | S | Ar-4 | Me | H | R-1 |
| A-29 | S | Ar-4 | H | Me | R-1 |
| A-30 | S | Ar-4 | Me | Me | R-1 |
| A-31 | S | Ar-4 | OMe | H | R-1 |
| A-32 | S | Ar-4 | H | OMe | R-1 |
| A-33 | S | Ar-5 | H | H | R-1 |
| A-34 | S | Ar-5 | Cl | H | R-1 |
| A-35 | S | Ar-5 | H | Cl | R-1 |
| A-36 | S | Ar-5 | Me | H | R-1 |
| A-37 | S | Ar-5 | H | Me | R-1 |
| A-38 | S | Ar-5 | Me | Me | R-1 |
| A-39 | S | Ar-5 | OMe | H | R-1 |
| A-40 | S | Ar-5 | H | OMe | R-1 |
| A-41 | S | Ar-6 | H | H | R-1 |
| A-42 | S | Ar-6 | Cl | H | R-1 |
| A-43 | S | Ar-6 | H | Cl | R-1 |
| A-44 | S | Ar-6 | Me | H | R-1 |

TABLE 1-continued

|  | X | Ar | R¹ | R² | R⁷ |
|---|---|---|---|---|---|
| A-45 | S | Ar-6 | H | Me | R-1 |
| A-46 | S | Ar-6 | Me | Me | R-1 |
| A-47 | S | Ar-6 | OMe | H | R-1 |
| A-48 | S | Ar-6 | H | OMe | R-1 |
| A-49 | S | Ar-7 | H | H | R-1 |
| A-50 | S | Ar-7 | Cl | H | R-1 |
| A-51 | S | Ar-7 | H | Cl | R-1 |
| A-52 | S | Ar-7 | Me | H | R-1 |
| A-53 | S | Ar-7 | H | Me | R-1 |
| A-54 | S | Ar-7 | Me | Me | R-1 |
| A-55 | S | Ar-7 | OMe | H | R-1 |
| A-56 | S | Ar-7 | H | OMe | R-1 |
| A-57 | S | Ar-1 | H | H | R-2 |
| A-58 | S | Ar-1 | H | H | R-3 |
| A-59 | S | Ar-1 | H | H | R-4 |
| A-60 | S | Ar-1 | H | H | R-5 |
| A-61 | S | Ar-1 | H | H | R-6 |
| A-62 | S | Ar-1 | H | H | R-7 |
| A-71 | S | Ar-41 | H | H | R-1 |
| A-72 | S | Ar-42 | H | H | R-1 |
| A-73 | S | Ar-43 | H | H | R-1 |
| A-74 | S | Ar-44 | H | H | R-1 |
| A-75 | S | Ar-45 | H | H | R-1 |
| A-76 | S | Ar-41 | Cl | H | R-1 |
| A-77 | S | Ar-41 | H | Cl | R-1 |
| A-78 | S | Ar-41 | Me | H | R-1 |
| A-79 | S | Ar-41 | H | Me | R-1 |
| A-80 | S | Ar-41 | Me | Me | R-1 |
| A-81 | S | Ar-41 | OMe | H | R-1 |
| A-82 | S | Ar-41 | H | OMe | R-1 |

TABLE 2

|  | X | Ar | R¹ | R² | R⁷ |
|---|---|---|---|---|---|
| A-101 | O | Ar-1 | H | H | R-1 |
| A-102 | O | Ar-1 | Cl | H | R-1 |
| A-103 | O | Ar-1 | Me | H | R-1 |
| A-104 | O | Ar-1 | H | Me | R-1 |
| A-105 | O | Ar-1 | t-Bu | H | R-1 |
| A-106 | O | Ar-2 | H | H | R-1 |
| A-107 | O | Ar-2 | Cl | H | R-1 |
| A-108 | O | Ar-2 | Me | H | R-1 |
| A-109 | O | Ar-2 | H | Me | R-1 |
| A-110 | O | Ar-2 | t-Bu | H | R-1 |
| A-111 | O | Ar-3 | H | H | R-1 |
| A-112 | O | Ar-3 | Cl | H | R-1 |
| A-113 | O | Ar-3 | Me | H | R-1 |
| A-114 | O | Ar-3 | H | Me | R-1 |
| A-115 | O | Ar-3 | t-Bu | H | R-1 |
| A-116 | O | Ar-4 | H | H | R-1 |
| A-117 | O | Ar-4 | Cl | H | R-1 |
| A-118 | O | Ar-4 | Me | H | R-1 |
| A-119 | O | Ar-4 | H | Me | R-1 |
| A-120 | O | Ar-4 | t-Bu | H | R-1 |
| A-121 | O | Ar-5 | H | H | R-1 |
| A-122 | O | Ar-5 | Cl | H | R-1 |
| A-123 | O | Ar-5 | Me | H | R-1 |
| A-124 | O | Ar-5 | H | Me | R-1 |
| A-125 | O | Ar-5 | t-Bu | H | R-1 |
| A-126 | O | Ar-6 | H | H | R-1 |
| A-127 | O | Ar-6 | Cl | H | R-1 |
| A-128 | O | Ar-6 | Me | H | R-1 |
| A-129 | O | Ar-6 | H | Me | R-1 |
| A-130 | O | Ar-6 | t-Bu | H | R-1 |
| A-131 | O | A1-7 | H | H | R-1 |
| A-132 | O | Ar-7 | Cl | H | R-1 |
| A-133 | O | Ar-7 | Me | H | R-1 |
| A-134 | O | Ar-7 | H | Me | R-1 |
| A-135 | O | Ar-7 | t-Bu | H | R-1 |
| A-142 | O | Ar-1 | H | H | R-2 |
| A-143 | O | Ar-1 | H | H | R-3 |
| A-144 | O | Ar-1 | H | H | R-4 |
| A-145 | O | Ar-1 | H | H | R-5 |
| A-146 | O | Ar-1 | H | H | R-6 |
| A-147 | O | Ar-1 | H | H | R-7 |
| A-151 | O | Ar-41 | H | H | R-1 |
| A-152 | O | Ar-42 | H | H | R-1 |
| A-153 | O | Ar-43 | H | H | R-1 |
| A-154 | O | Ar-44 | H | H | R-1 |
| A-155 | O | Ar-45 | H | H | R-1 |
| A-156 | O | Ar-41 | Cl | H | R-1 |
| A-157 | O | Ar-41 | Me | H | R-1 |
| A-158 | O | Ar-41 | H | Me | R-1 |
| A-159 | O | Ar-41 | t-Bu | H | R-1 |

TABLE 3

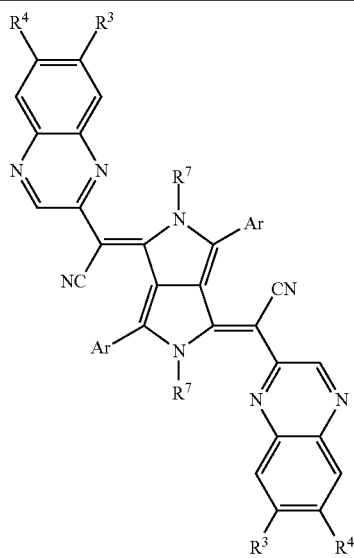

| | Ar | R³ | R⁴ | R⁷ |
|---|---|---|---|---|
| A-201 | Ar-1 | H | H | R-1 |
| A-202 | Ar-1 | H | Cl | R-1 |
| A-203 | Ar-1 | Cl | Cl | R-1 |
| A-204 | Ar-1 | H | Me | R-1 |
| A-205 | Ar-1 | Me | Me | R-1 |
| A-206 | Ar-1 | H | OMe | R-1 |
| A-207 | Ar-2 | H | H | R-1 |
| A-208 | Ar-2 | H | Cl | R-1 |
| A-209 | Ar-2 | Cl | Cl | R-1 |
| A-210 | Ar-2 | H | Me | R-1 |
| A-211 | Ar-2 | Me | Me | R-1 |
| A-212 | Ar-2 | H | OMe | R-1 |
| A-213 | Ar-3 | H | H | R-1 |
| A-214 | Ar-3 | H | Cl | R-1 |
| A-215 | Ar-3 | Cl | Cl | R-1 |
| A-216 | Ar-3 | H | Me | R-1 |
| A-217 | Ar-3 | Me | Me | R-1 |
| A-218 | Ar-3 | H | OMe | R-1 |
| A-219 | Ar-4 | H | H | R-1 |
| A-220 | Ar-4 | H | Cl | R-1 |
| A-221 | Ar-4 | Cl | Cl | R-1 |
| A-222 | Ar-4 | H | Me | R-1 |
| A-223 | Ar-4 | Me | Me | R-1 |
| A-224 | Ar-4 | H | OMe | R-1 |
| A-225 | Ar-5 | H | H | R-1 |
| A-226 | Ar-5 | H | Cl | R-1 |
| A-227 | Ar-5 | Cl | Cl | R-1 |
| A-228 | Ar-5 | H | Me | R-1 |
| A-229 | Ar-5 | Me | Me | R-1 |
| A-230 | Ar-5 | H | OMe | R-1 |
| A-231 | Ar-6 | H | H | R-1 |
| A-232 | Ar-6 | H | Cl | R-1 |
| A-233 | Ar-6 | Cl | Cl | R-1 |
| A-234 | Ar-6 | H | Me | R-1 |
| A-235 | Ar-6 | Me | Me | R-1 |
| A-236 | Ar-6 | H | OMe | R-1 |
| A-237 | Ar-7 | H | H | R-1 |
| A-238 | Ar-7 | H | Cl | R-1 |
| A-239 | Ar-7 | Cl | Cl | R-1 |
| A-240 | Ar-7 | H | Me | R-1 |
| A-241 | Ar-7 | Me | Me | R-1 |
| A-242 | Ar-7 | H | OMe | R-1 |
| A-243 | Ar-1 | H | H | R-2 |
| A-244 | Ar-1 | H | H | R-3 |
| A-245 | Ar-1 | H | H | R-4 |
| A-246 | Ar-1 | H | H | R-5 |
| A-247 | Ar-1 | H | H | R-6 |
| A-248 | Ar-1 | H | H | R-7 |
| A-251 | Ar-41 | H | H | R-1 |
| A-252 | Ar-42 | H | H | R-1 |
| A-253 | Ar-43 | H | H | R-1 |

TABLE 3-continued

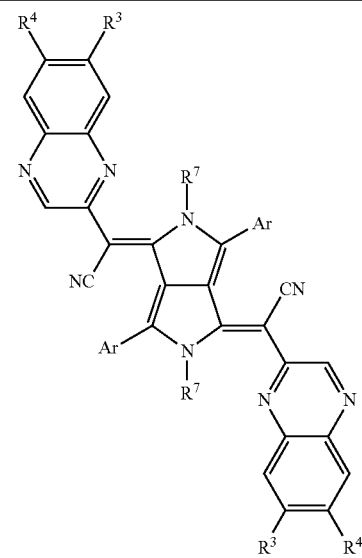

| | Ar | R³ | R⁴ | R⁷ |
|---|---|---|---|---|
| A-254 | Ar-44 | H | H | R-1 |
| A-255 | Ar-45 | H | H | R-1 |
| A-256 | Ar-41 | H | Cl | R-1 |
| A-257 | Ar-41 | Cl | Cl | R-1 |
| A-258 | Ar-41 | H | Me | R-1 |
| A-259 | Ar-41 | Me | Me | R-1 |
| A-260 | Ar-41 | H | OMe | R-1 |

TABLE 4

| | Ar | R⁵ | R⁶ | R⁷ |
|---|---|---|---|---|
| A-301 | Ar-1 | H | H | R-1 |
| A-302 | Ar-1 | H | t-Bu | R-1 |
| A-303 | Ar-2 | H | H | R-1 |
| A-304 | Ar-2 | H | t-Bu | R-1 |
| A-305 | Ar-3 | H | H | R-1 |
| A-306 | Ar-3 | H | t-Bu | R-1 |
| A-307 | Ar-4 | H | H | R-1 |
| A-308 | Ar-4 | H | t-Bu | R-1 |
| A-309 | Ar-5 | H | H | R-1 |
| A-310 | Ar-5 | H | t-Bu | R-1 |

TABLE 4-continued

| | Ar | R⁵ | R⁶ | R⁷ |
|---|---|---|---|---|
| A-311 | Ar-6 | H | H | R-1 |
| A-312 | Ar-6 | H | t-Bu | R-1 |
| A-313 | Ar-7 | H | H | R-1 |
| A-314 | Ar-7 | H | t-Bu | R-1 |
| A-315 | Ar-1 | H | H | R-2 |
| A-316 | Ar-1 | H | H | R-3 |
| A-317 | Ar-1 | H | H | R-4 |
| A-318 | Ar-1 | H | H | R-5 |
| A-319 | Ar-1 | H | H | R-6 |
| A-320 | Ar-1 | H | H | R-7 |
| A-321 | Ar-41 | H | H | R-1 |
| A-322 | Ar-42 | H | H | R-1 |
| A-323 | Ar-43 | H | H | R-1 |
| A-324 | Ar-44 | H | H | R-1 |
| A-325 | Ar-45 | H | H | R-1 |
| A-326 | Ar-41 | H | t-Bu | R-1 |

Ar-1 to Ar-7, AR-41 to Ar-45, and R-1 to R-7 in the above tables are as below. "*" in the structure provided below is a linking hand.

-continued

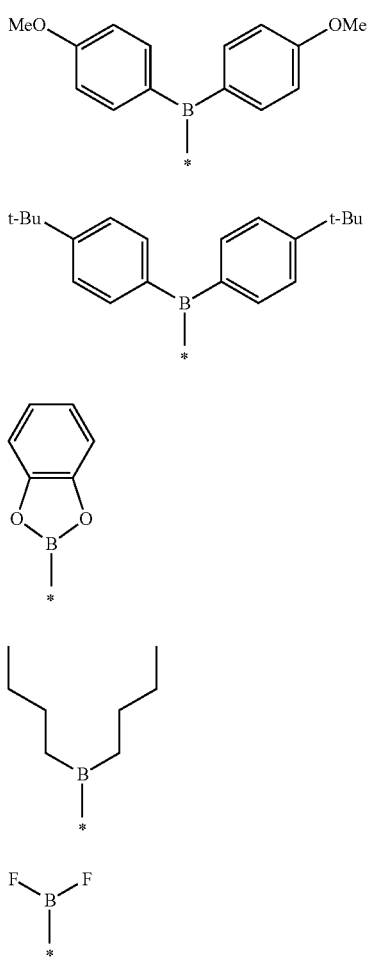

R-3

R-4

R-5

R-6

R-7

The squarylium compound is preferably a compound represented by Formula (SQ).

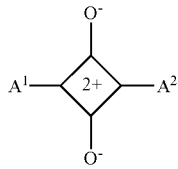

(SQ)

In Formula (SQ), $A^1$ and $A^2$ each independently represent an aryl group, a heteroaryl group, or a group represented by Formula (A-1); and

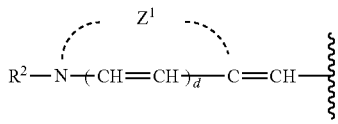

(A-1)

in Formula (A-1), $Z^1$ represents a nonmetallic atomic group forming a nitrogen-containing heterocyclic ring, $R^2$ represents an alkyl group, an alkenyl group, or an aralkyl group, d represents 0 or 1, and a wavy line represents a linking hand.

With respect to the details of Formula (SQ), the disclosure of paragraphs 0020 to 0049 of JP2011-208101A can be referred to, and the content thereof is incorporated in the present specification.

In the formula (SQ), cations are present in a delocalized manner as below.

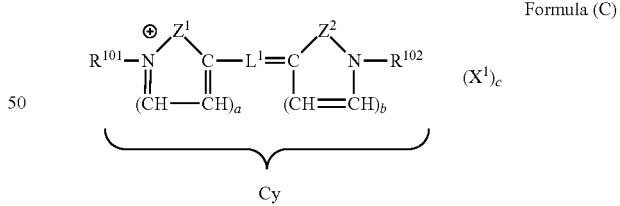

Specific examples of the squarylium compound include the following compounds. Examples of the squarylium compound include compounds disclosed in paragraphs 0044 to 0049 of JP2011-208101A, and the content thereof is incorporated in the present specification.

The cyanine compound is preferably a compound represented by Formula (C).

Formula (C)

In the formula, $Z^1$ and $Z^2$ are each independently a nonmetallic atomic group forming a 5-membered or 6-membered nitrogen-containing heterocyclic ring that may be fused.

$R^{101}$ and $R^{102}$ each independently represent an alkyl group, an alkenyl group, an alkynyl group, an aralkyl group, or an aryl group, $L^1$ represents a methine chain having an odd number of methine groups, a and b are each independently 0 or 1, in a case where a is 0, a carbon atom and a nitrogen atom are bonded to each other by a double bond, and in a case where b is 0, a carbon atom and a nitrogen atom are bonded to each other by a single bond, and in a case where a moiety represented by Cy in the formula is a cation moiety, $X^1$ represents an anion, and c represents the number necessary for balancing the charge, in a case where the moiety represented by Cy in the formula is an anion moiety, $X^1$ represents a cation, c represents a number necessary for balancing the charge, and in a case where the moiety represented by Cy in the formula is neutralized in the molecule, c is 0.

Examples of the cyanine compound include compounds disclosed in paragraphs 0044 and 0045 of JP2009-108267A, compounds disclosed in paragraphs 0026 to 0030 of JP2002-194040A, compounds disclosed in JP2015-172004A, and compounds disclosed in JP2015-172102A, and the content thereof is incorporated in the present specification.

<<Pigment Derivative>>

The pigment dispersion liquid according to the embodiment of the present invention includes two or more kinds of pigment derivatives having different structures. Examples of the pigment derivative include a compound having a structure in which a portion of the pigment is substituted with an acid group, a basic group, a group having a salt structure, or a phthalimide group, and a compound in which a portion of the pigment is substituted with an acid group is preferable. That is, the pigment derivative is preferably a compound having an acid group.

The pigment derivative according to the present invention is preferably a compound having a coloring agent structure derived from a coloring agent compound having a π conjugate plane including a monocyclic or fused aromatic ring. Details of the coloring agent compound having a π conjugate plane including a monocyclic or fused aromatic ring are the same as the contents described in the section of the near infrared absorbing organic pigment, and the preferable ranges are also the same.

The pigment derivative according to the present invention is preferably a compound having a coloring agent structure derived from a coloring agent compound having an maximum absorption wavelength in the wavelength range of 600 to 1,200 nm (preferably in the wavelength range of 700 to 1,000 nm).

The pigment derivative according to the present invention is preferably a compound having a coloring agent structure selected from a pyrrolo pyrrole coloring agent structure, a squarylium coloring agent structure, a cyanine compound, a phthalocyanine compound, a naphthalocyanine compound, and a diiminium compound, more preferably a compound having a pyrrolo pyrrole coloring agent structure or a squarylium coloring agent structure, and even more preferably a compound having a pyrrolo pyrrole coloring agent structure. Since the pigment derivative having a pyrrolo pyrrole coloring agent structure has excellent visible transparency, the dispersibility of the near infrared absorbing organic pigment can be improved without affecting the visible transparency of the near infrared absorbing organic pigment.

According to the present invention, the pigment derivative is preferably a compound having a coloring agent structure having a skeleton common to the near infrared absorbing organic pigment. According to this aspect, the pigment derivative is easily adsorbed by the near infrared absorbing organic pigment, and the dispersibility of the near infrared absorbing organic pigment in the pigment dispersion liquid can be increased. An effect of suppressing thixotropy can be expected. The skeleton in the coloring agent structure is a mother nucleus in the coloring agent structure. For example, in Formula (1a), a moiety excluding $R^1$ to $R^8$ is a skeleton of a coloring agent structure in the compound represented by Formula (1a).

According to the present invention, it is preferable that at least two kinds of two or more kinds of the pigment derivatives having different structures included in the pigment dispersion liquid each are a compound having a coloring agent structure having a common skeleton. For example, it is preferable that in at least two kinds of two or more kinds of the pigment derivatives having different structures included in the pigment dispersion liquid, P in Formula (1) has a common skeleton. In a case where the pigment dispersion liquid according to the embodiment of the present invention includes three or more kinds of pigment derivatives, it is preferable that two kinds among three or more kinds of the pigment derivatives each are a compound having a coloring agent structure having a common skeleton, and it is more preferable that all of the pigment derivatives each are a compound having a coloring agent structure having a common skeleton. The compounds have satisfactory compatibility and thus crystallinity can be further decreased. Therefore, by using the pigment derivative, a film in which a foreign matters is suppressed is easily manufactured.

According to the present invention, a case where the pigment derivatives have a coloring agent structure having a common skeleton means that the pigment derivatives have a coloring agent structure derived from a coloring agent compound including a common skeleton. Here, the coloring agent compound including a common skeleton means a compound having the same skeleton, and compounds in which the kinds of the substituents bonded to the skeleton are the same or different from each other. For example, the coloring agent compound means compounds in which P in Formula (1) has a common skeleton. In the coloring agent compound including a common skeleton, the kinds of the substituents bonded to the skeleton may be identical to or different from each other, but it is preferable that at least some of the substituents are identical to each other.

According to the present invention, the pigment derivative is preferably a compound represented by Formula (1).

$$P\text{-}(\text{-}L\text{-}(X)_n)_m \qquad (1)$$

In Formula (1), P represents a coloring agent structure, L represents a single bond or a linking group, X represents an acid group, a basic group, a group having a salt structure, or a phthalimide group, m represents an integer of 1 or more, n represents an integer of 1 or more, in a case where m is 2 or more, a plurality of L's and X's may be different from each other, and in a case where n is 2 or more, a plurality of X's may be different from each other.

The coloring agent structure represented by P in Formula (1) is preferably a coloring agent structure derived from a coloring agent compound having a π conjugate plane including a monocyclic or fused aromatic ring. Details of the coloring agent compound having a π conjugate plane including a monocyclic or fused aromatic ring are the same as the contents described in the section of the near infrared absorbing organic pigment, and the preferable ranges are also the same.

The coloring agent structure represented by P in Formula (1) is preferably a coloring agent structure derived from a coloring agent compound having an maximum absorption wavelength in the wavelength range of 600 to 1,200 nm (preferably in the wavelength range of 700 to 1,000 nm).

The coloring agent structure represented by P in Formula (1) is preferably a coloring agent structure selected from a pyrrolo pyrrole coloring agent structure, a squarylium coloring agent structure, a cyanine compound, a phthalocyanine compound, a naphthalocyanine compound, and a diiminium compound, more preferably a pyrrolo pyrrole coloring agent structure or a squarylium coloring agent structure, and even more preferably a pyrrolo pyrrole coloring agent structure.

The coloring agent structure represented by P in Formula (1) preferably has a skeleton common to the near infrared absorbing organic pigment. According to this aspect, the pigment derivative is easily adsorbed by the near infrared absorbing organic pigment, and the dispersibility of the near infrared absorbing organic pigment in the pigment dispersion liquid can be increased. An effect of suppressing thixotropy can be expected.

In a case where the coloring agent structure represented by P in Formula (1) has a skeleton common to the near infrared absorbing organic pigment, with respect to the structure of the near infrared absorbing organic pigment, the kinds of the substituent bonded to a structure (also referred to as a coloring agent skeleton) that becomes a skeleton in the coloring agent structure represented by P may be identical to or different from those in Formula (1) excluding the moiety represented by "(-L-(X)$_n$)$_m$" of Formula (1), but it is preferable that at least a portion of the substituents are identical to each other. For example, the near infrared absorbing organic pigment is a compound represented by Formula (PP), and in a case where the pigment derivative is a combination of the compound represented by Formula (1a), all of $R^{21}$ to $R^{28}$ in Formula (1a) may be different from or a portion thereof are identical to $R^{21}$ to $R^{28}$ in Formula (PP). Among these, it is preferable that at least one condition of the following <1> to <6> is satisfied, it is more preferable that all conditions of <1> to <4> are satisfied, and it is even more preferable that all conditions of <1> to <6> are satisfied.

<1> Formula (PP)$R^{23}$ and Formula (1a)$R^3$ are identical to each other.
<2> Formula (PP)$R^{24}$ and Formula (1a)$R^4$ are identical to each other.
<3> Formula (PP)$R^{27}$ and Formula (1a)$R^7$ are identical to each other.
<4> Formula (PP)$R^{28}$ and Formula (1a)$R^8$ are identical to each other.
<5> Formula (PP)$R^{25}$ and Formula (1a)$R^5$ are identical to each other.
<6> Formula (PP)$R^{26}$ and Formula (1a)$R^6$ are identical to each other.

For example, a near infrared absorbing organic pigment (A-1) and pigment derivatives (B-1) to (B-3) and a near infrared absorbing organic pigment (A-2) and pigment derivatives (B-1) to (B-3) provided below correspond to compounds having coloring agent structures having the common skeletons which are respectively identical to each other.

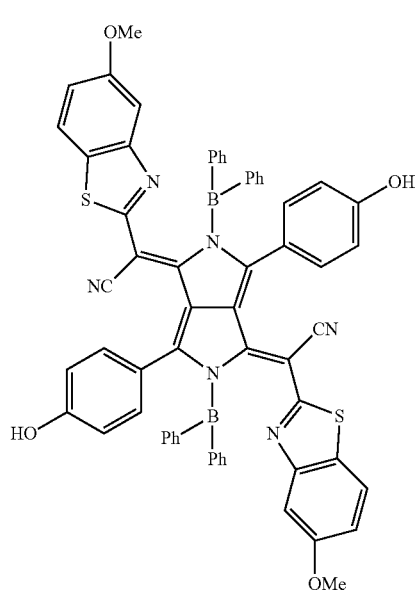

(A-1)

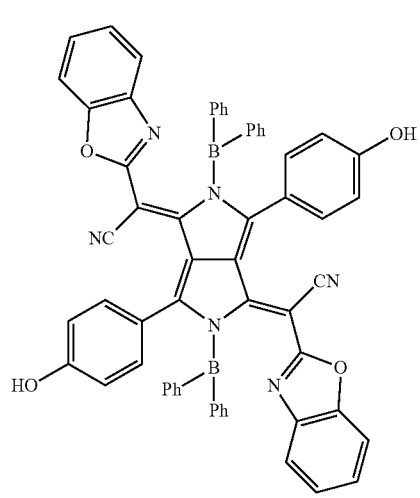

(A-2)

-continued
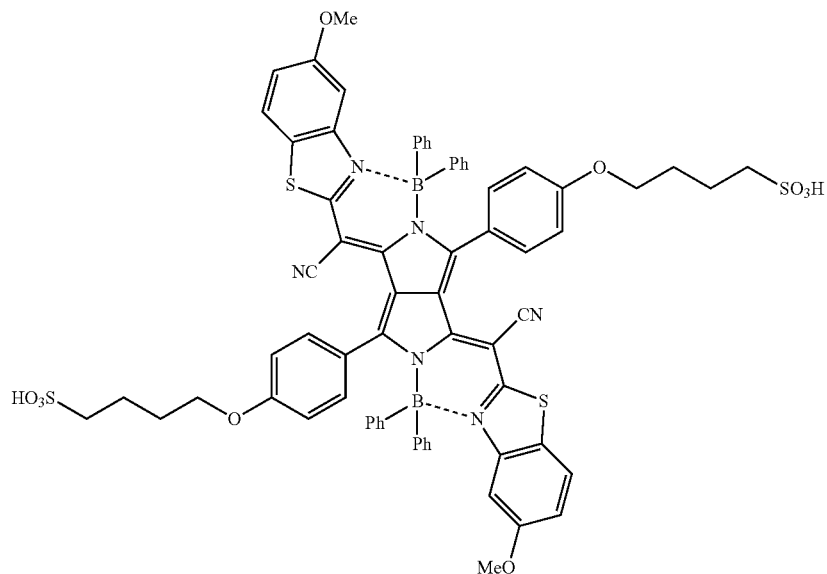
(B-1)
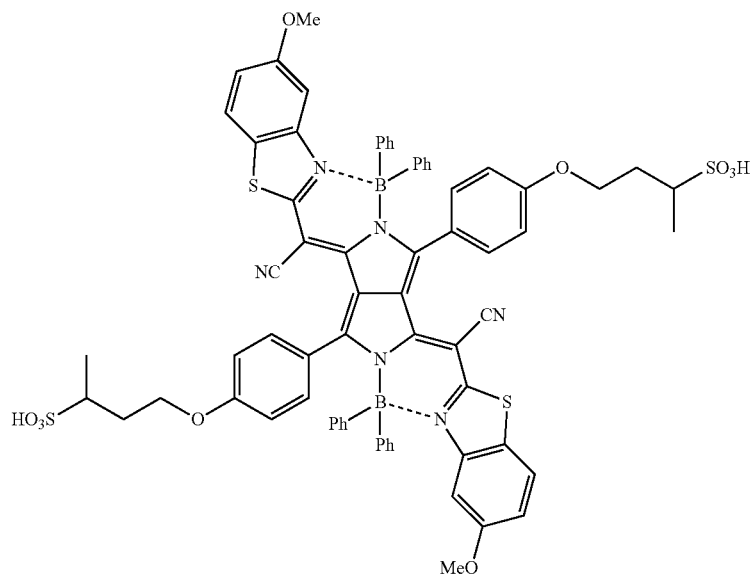
(B-2)
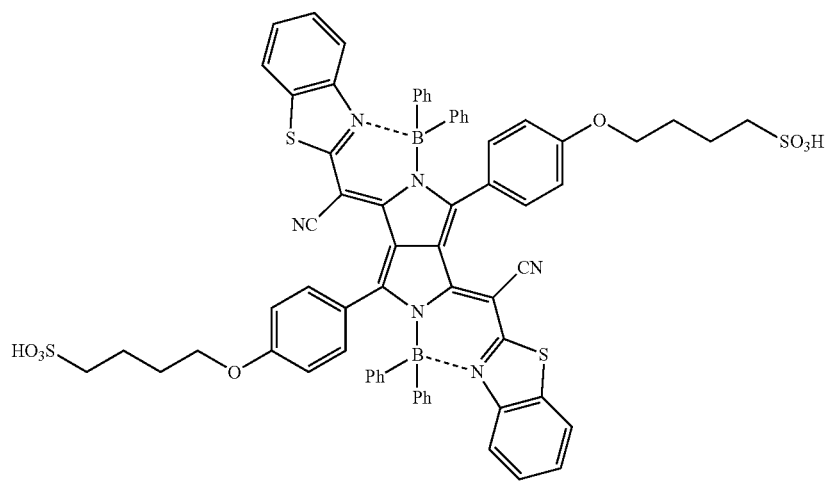
(B-3)

In Formula (1), L represents a single bond or a linking group and preferably represents a linking group. Examples of the linking group include an alkylene group, an arylene group, a nitrogen-containing heterocyclic group, —O—, —S—, —NR'—, —CO—, —COO—, —OCO—, —SO$_2$—, or a group obtained by combining these, and a group including an alkylene group or an alkylene group is preferable. R' represents a hydrogen atom, an alkyl group, or an aryl group.

The number of carbon atoms of the alkylene group is preferably 1 to 30, more preferably 1 to 15, and even more preferably 1 to 10. The alkylene group may have a substituent. The alkylene group may be linear, branched, or cyclic. The cyclic alkylene group may be monocyclic or polycyclic.

The number of carbon atoms of the arylene group is preferably 6 to 18, more preferably 6 to 14, and even more preferably 6 to 10.

The nitrogen-containing heterocyclic group is preferably a 5-membered ring or a 6-membered ring. The nitrogen-containing heterocyclic group is preferably a monocyclic ring or a fused ring, more preferably a monocyclic ring or a fused ring having a fused number of 2 to 8, and even more preferably a monocyclic ring or a fused ring having a fused number of 2 to 4. The number of nitrogen atoms included in the nitrogen-containing heterocyclic group is preferably 1 to 3 and more preferably 1 to 2. The nitrogen-containing heterocyclic group may include a heteroatom other than a nitrogen atom. Examples of the heteroatom other than a nitrogen atom include an oxygen atom or a sulfur atom. The number of heteroatoms other than a nitrogen atom is preferably 0 to 3 or more preferably 0 to 1. Examples of the nitrogen-containing heterocyclic group include a piperazine ring group, a pyrrolidine ring group, a pyrrole ring group, a piperidine ring group, a pyridine ring group, an imidazole ring group, a pyrazole ring group, an oxazole ring group, a thiazole ring group, a pyrazine ring group, a morpholine ring group, a thiazine ring group, an indole ring group, an isoindole ring group, a benzimidazole ring group, a purine ring group, a quinoline ring group, an isoquinoline ring group, a quinoxaline ring group, a cinnoline ring group, a carbazole ring group, and a group represented by Formulae (1-1) to (1-7).

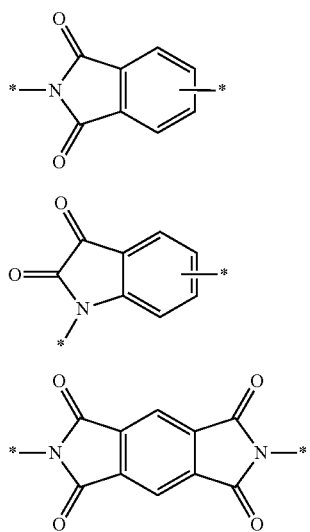

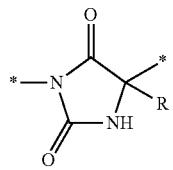

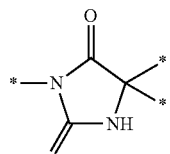

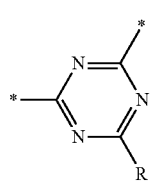

In the formula, * represents a linking hand. R represents a hydrogen atom or a substituent. Examples of the substituent include the above-mentioned substituent T.

In Formula (1), X represents an acid group, a basic group, a group having a salt structure, or a phthalimide group.

Examples of the acid group include a carboxyl group and a sulfo group.

Examples of the basic group include groups represented by Formulae (X-3) to (X-9).

Examples of a group having a salt structure include a salt of the acid group and a salt of the basic group. Examples of an atom or an atomic group constituting a salt include a metal atom and tetrabutylammonium. The metal atom is preferably an alkali metal atom or an alkaline earth metal atom. Examples of the alkali metal atom include lithium, sodium, and potassium. Examples of the alkaline earth metal atom include calcium, magnesium and the like.

The phthalimide group may be unsubstituted or may have a substituent. Examples of the substituent include the acid groups, the basic groups, and the groups having a salt structure. The substituent may be the substituent T. The substituent T may be further substituted with another substituent.

X is preferably at least one selected from a carboxyl group, a sulfo group, a phthalimide group, or a group represented by Formulae (X-1) to (X-9), more preferably a carboxyl group, a sulfo group, and a group represented by Formula (X-3), even more preferably a sulfo group and a group represented by Formula (X-3), and particularly preferably a sulfo group. In the compound in which X is a sulfo group, the dispersibility of the near infrared absorbing organic pigment can be effectively improved. The compound in which X is a group represented by Formula (X-3) has higher basicity than other basic groups and improved interaction with a resin and the like, and thus the dispersibility of the near infrared absorbing organic pigment can be improved.

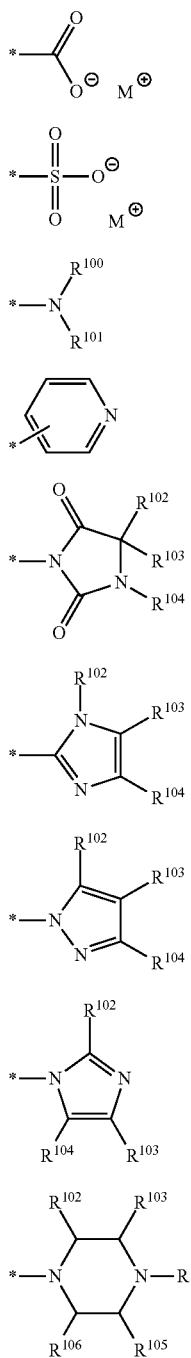

(X-1)
(X-2)
(X-3)
(X-4)
(X-5)
(X-6)
(X-7)
(X-8)
(X-9)

In Formulae (X-1) to (X-9), * represents a linking hand, $R^{100}$ to $R^{106}$ each independently represent a hydrogen atom, an alkyl group, an alkenyl group, or an aryl group, $R^{100}$ and $R^{101}$ may be linked to each other to form a ring, and M represents an anion and an atom or an atomic group constituting a salt.

The alkyl group represented by $R^{100}$ to $R^{106}$ may be linear, branched, or cyclic. The number of carbon atoms of the linear alkyl group is preferably 1 to 20, more preferably 1 to 12, and even more preferably 1 to 8. The number of carbon atoms of the branched alkyl group is preferably 3 to 20, more preferably 3 to 12, and even more preferably 3 to 8. The cyclic alkyl group may be monocyclic or polycyclic. The number of carbon atoms of the cyclic alkyl group is preferably 3 to 20, more preferably 4 to 10, and even more preferably 6 to 10.

The number of carbon atoms of the alkenyl group represented by $R^{100}$ to $R^{106}$ is preferably 2 to 10, more preferably 2 to 8, and even more preferably 2 to 4.

The number of carbon atoms of the aryl group represented by $R^{100}$ to $R^{106}$ is preferably 6 to 18, more preferably 6 to 14, and even more preferably 6 to 10.

$R^{100}$ and $R^{101}$ may be linked to each other to form a ring. The ring may be an alicyclic ring or an aromatic ring. The ring may be a monocyclic ring or a fused ring. A linking group in a case where $R^{100}$ and $R^{101}$ are bonded to each other to form a ring include a divalent linking group selected from —CO—, —O—, —NH—, a divalent aliphatic group, a divalent aromatic group, and a group obtained by combining these. Specific examples of the ring include a piperazine ring, a pyrrolidine ring, a pyrrole ring, a piperidine ring, a pyridine ring, an imidazole ring, a pyrazole ring, an oxazole ring, a thiazole ring, a pyrazine ring, a morpholine ring, a thiazine ring, an indole ring, an isoindole ring, a benzimidazole ring, a purine ring, a quinoline ring, an isoquinoline ring, a quinoxaline ring, a cinnoline ring, and a carbazole ring. It is preferable that $R^{100}$ and $R^{101}$ do not form a ring.

M represents an anion and an atom or atomic group constituting a salt. Examples thereof include those described above, and the preferable ranges are also the same.

$R^{100}$ and $R^{101}$ each independently and preferably represent an alkyl group or an aryl group, and an alkyl group is more preferable. The alkyl group is preferably a linear or branched alkyl group, and a linear alkyl group is more preferable.

In Formula (1), m represents an integer of 1 to 10, preferably 1 to 4, more preferably 1 to 3, even more preferably 1 to 2, and particularly preferably 2.

In Formula (1), n represents an integer of 1 to 10, preferably 1 to 4, more preferably 1 to 3, even more preferably 1 to 2, and particularly preferably 1.

According to the present invention, at least two kinds of two or more kinds of the pigment derivatives having different structures included in the pigment dispersion liquid preferably has a skeleton in which P of Formula (1) is common. In a case where three or more kinds of pigment derivatives represented by Formula (1) are included, it is preferable that three or more kinds of the pigment derivatives have a skeleton in which P of Formula (1) is common, and it is more preferable that all of the pigment derivatives have a skeleton in which P of Formula (1) is common.

It is preferable that at least two kinds of two or more kinds of the pigment derivative having different structures included in the pigment dispersion liquid each are a compound in which L in Formula (1) is a linking group of a structural isomer. According to this aspect, the crystallinity of the pigment derivative is easily lowered, and a film having fewer foreign matters can be manufactured. A case of a compound in which L in Formula (1) is a linking group of a structural isomer means a relationship of compounds in which relational formulae of the moieties corresponding to L in each compound are identical to each other, but bond relations between atoms in the same moieties are different from each other. For example, the pigment derivative (B-1) and the pigment derivative (B-2) satisfy the relationship of the compound in which L in Formula (1) is a linking group of a structural isomer.

With respect to at least two kinds of two or more kinds of the pigment derivatives having different structures that are included in the pigment dispersion liquid, it is preferable that a difference between the numbers of carbon atoms of L's in Formula (1) is 6 or less. The difference between the numbers of carbon atoms in L's is preferably 1 to 6, more preferably 1 to 4, even more preferably 1 to 3, and particularly preferably 1 to 2. With respect to the pigment derivatives in which a difference between the numbers of carbon atoms in L's in Formula (1) is 6 or less, the compatibility is satisfactory, the crystallinity of the pigment derivative is easily decreased, and thus it is possible to manufacture a film having fewer foreign matters.

At least two kinds of two or more kinds of the pigment derivatives having different structures included in the pigment dispersion liquid may be compounds in which X's in Formula (1) are identical to each other, and may be different compounds. According to the aspect, with respect to each compound, L in Formula (1) may be a linking group of a structural isomer. The difference in the numbers of carbon atoms between L's of Formula (1) may be 6 or less. Further, each compound may be a compound in which only X's in Formula (1) are different from each other. It is more preferable that each compound is a compound in which only X's in Formula (1) are different from each other. According to this aspect, an effect of suppressing foreign matters and improving moisture resistance can be expected. In this case, it is preferable that X's in each pigment derivative are acid groups, and the kinds of the acid group are different from each other, or X's in each pigment derivative are basic groups and the kinds of the basic group are different from each other, and it is more preferable that X's in each pigment derivative are acid groups, and the kinds of the acid group are different from each other.

The compound represented by Formula (1) is preferably a compound represented by Formula (1a). The compound represented by Formula (1a) is a pigment derivative having a pyrrolo pyrrole coloring agent structure, and a portion of the pyrrolo pyrrole coloring agent structure interacts with the near infrared absorbing organic pigment and is easily adsorbed on the surface of the near infrared absorbing organic pigment. Therefore, it is possible to improve the dispersibility of the near infrared absorbing organic pigment in the pigment dispersion liquid. In the pigment dispersion liquid, other components (for example, in a case of including a resin, a resin or the like) and a terminal portion X of the pigment derivative interact with each other, the dispersibility of the near infrared absorbing organic pigment can be further improved. The compound represented by Formula (1a) has excellent visible transparency and thus the dispersibility of the near infrared absorbing organic pigment can be improved without affecting the visible transparency of the near infrared absorbing organic pigment.

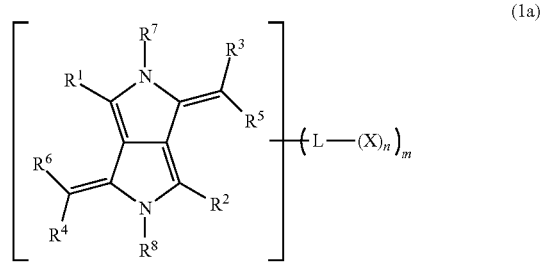

(1a)

In Formula (1a), $R^1$ and $R^2$ each independently represent an alkyl group, an aryl group, or a heteroaryl group, $R^3$, $R^4$, $R^5$, and $R^6$ each independently represent a cyano group, an acyl group, an alkoxycarbonyl group, an alkylsulfinyl group, an arylsulfinyl group, or a heteroaryl group, $R^7$ and $R^8$ each independently represent a hydrogen atom, an alkyl group, an aryl group, a heteroaryl group, —$BR^9R^{10}$, or a metal atom, $R^7$ may form a covalent bond or a coordinate bond with $R^1$, $R^3$, or $R^5$, $R^8$ may form a covalent bond or a coordinate bond with $R^2$, $R^4$, or $R^6$, $R^9$ and $R^{10}$ each independently represent a hydrogen atom, a halogen atom, an alkyl group, an alkenyl group, an aryl group, a heteroaryl group, an alkoxy group, an aryloxy group, or a heteroaryloxy group, and $R^9$ and $R^{10}$ are bonded to each other to form a ring, L represents a single bond or a linking group, X represents an acidic group, a basic group, a group having a salt structure, or a phthalimide group, and m represents an integer of 1 to 10, n represents an integer of 1 to 10, in a case where m is 2 or more, a plurality of L's and X's may be different from each other, and in a case where n is 2 or more, a plurality of X's may be different from each other.

In Formula (1a), $R^1$ and $R^2$ each independently represent an alkyl group, an aryl group or a heteroaryl group, is preferably an aryl group or a heteroaryl group, and is more preferably an aryl group.

The number of carbon atoms of the alkyl group represented by $R^1$ and $R^2$ is preferably 1 to 30, more preferably 1 to 20, and even more preferably 1 to 10.

The number of carbon atoms of the aryl group represented by $R^1$ and $R^2$ is preferably 6 to 30, more preferably 6 to 20, and is even more preferably 6 to 12.

The number of the carbon atoms constituting the heteroaryl group represented by $R^1$ and $R^2$ is preferably 1 to 30 and more preferably 1 to 12. Examples of the kinds of the heteroatom constituting a heteroaryl group include a nitrogen atom, an oxygen atom, and a sulfur atom. The number of the heteroatoms constituting a heteroaryl group is preferably 1 to 3 and more preferably 1 to 2. The heteroaryl group is preferably a monocyclic ring or a fused ring, more preferably a monocyclic ring or a fused ring having a fused number of 2 to 8, and even more preferably a monocyclic ring or a fused ring having a fused number of 2 to 4.

The alkyl group, the aryl group, and the heteroaryl group represented by $R^1$ and $R^2$ may be unsubstituted or may have a substituent. Examples of the substituent include the groups described as the substituent T. -L-$(X)_n$ of Formula (1a) may be bonded to $R^1$ and/or $R^2$, and it is preferable that -L-$(X)_n$ of Formula (1a) is bonded thereto.

In Formula (1a), $R^3$, $R^4$, $R^5$, and $R^6$ each independently represent a cyano group, an acyl group, an alkoxycarbonyl group, an alkyl sulfinyl group, an arylsulfinyl group, or a heteroaryl group.

It is preferable that one of $R^3$ and $R^5$ represents a cyano group, an acyl group, an alkoxycarbonyl group, an alkylsulfinyl group, or an arylsulfinyl group and the other represents a heteroaryl group, and it is more preferable that one of $R^3$ and $R^5$ represents a cyano group and the other represents a heteroaryl group.

It is preferable that one of $R^4$ and $R^6$ represents a cyano group, an acyl group, an alkoxycarbonyl group, an alkylsulfinyl group, or an arylsulfinyl group and the other represents a heteroaryl group, and it is more preferable that one of $R^4$ and $R^6$ represents a cyano group and the other represents a heteroaryl group.

Examples of the heteroaryl group represented by $R^3$ to $R^6$ include the heteroaryl group described in $R^{23}$ to $R^{26}$ of the pyrrolo pyrrole compound, and the preferable ranges are also the same. The heteroaryl group may be unsubstituted or may have a substituent. Examples of the substituent include the groups described as the substituent T. -L-(X)$_n$ of Formula (1a) may be bonded to the heteroaryl group represented by $R^3$ to $R^6$.

The kinds of the heteroaryl group represented by $R^3$ to $R^6$ are preferably selected according to the kinds of the near infrared absorbing organic pigment used together. For example, in a case where the pyrrolo pyrrole compound (preferably a pyrrolo pyrrole compound represented by Formula (PP)) is used as the near infrared absorbing organic pigment, the heteroaryl group represented by $R^3$ to $R^6$ is preferably a heteroaryl group having a structure common to the heteroaryl group having the pyrrolo pyrrole compound as the near infrared absorbing organic pigment, and more preferably the heteroaryl group having the same structure. According to this aspect, the dispersibility of the near infrared absorbing organic pigment can be further improved. With respect to the heteroaryl group having a common structure, a case where the substituent is bonded to a heteroaryl group means a case where a structure (structure of a heteroaryl ring) of a portion excluding the substituent is the same.

In Formula (1a), $R^7$ and $R^8$ each independently represent a hydrogen atom, an alkyl group, an aryl group, a heteroaryl group, —$BR^9R^{10}$, or a metal atom, and —$BR^9R^{10}$ is preferable. In a case where $R^9$ and $R^{10}$ each independently represent a hydrogen atom, a halogen atom, an alkyl group, an alkenyl group, an aryl group, a heteroaryl group, an alkoxy group, an aryloxy group, or a heteroaryloxy group, a halogen atom, an alkyl group, an aryl group, or a heteroaryl group is preferable, a halogen atom, an alkyl group, or an aryl group is more preferable, and an aryl group is even more preferable. $R^9$ and $R^{10}$ may be bonded to each other to form a ring. The details of $R^7$ to $R^8$ are the same as the range described in $R^{27}$ to $R^{28}$ of the pyrrolo pyrrole compound represented by Formula (PP), and the preferable ranges are also the same.

In Formula (1a), L represents a single bond or a linking group and preferably represents a linking group. Details of the linking group are the same as the range described in Formula (1).

Specific examples of the linking group include the following. R' below represents a hydrogen atom, an alkyl group, or an aryl group.
 (1) an alkylene group;
 (2) —COO—;
 (3) —OCO—;
 (4) —NR'—;
 (5) a group (—O-alkylene group- or the like) obtained by combining —O— and an alkylene group;
 (6) a group (—O-arylene group- or the like) obtained by combining —O— and an arylene group;
 (7) a group (—O-alkylene group-S— or the like) obtained by combining —O—, an alkylene group, and —S—;
 (8) a group (—O-arylene group-S— or the like) obtained by combining —O—, an arylene group, and —S—;
 (9) a group (—COO-alkylene group- or the like) obtained by combining —COO— and an alkylene group;
 (10) a group (—COO-arylene group- or the like) obtained by combining —COO— and an arylene group;
 (11) a group (—COO-arylene group-alkylene group-, —COO-alkylene group-arylene group-, or the like) obtained by combining —COO—, an arylene group, and an alkylene group;
 (12) a group (—OCO-alkylene group- or the like) obtained by combining —OCO— and an alkylene group;
 (13) a group (—OCO-arylene group- or the like) obtained by combining —OCO— and an arylene group;
 (14) a group (—OCO-arylene group-alkylene group-, —OCO-alkylene group-arylene group-, or the like) obtained by combining —OCO—, an arylene group, and an alkylene group;
 (15) a group (—NR'-alkylene group- or the like) obtained by combining —NR'— and an alkylene group;
 (16) a group (—NR'-arylene group- or the like) obtained by combining —NR'— and an arylene group;
 (17) a group (—NR'-arylene group-alkylene group-, —NR'-alkylene group-arylene group-, or the like) obtained by combining —NR'—, an arylene group, and an alkylene group;
 (18) a group (—NR'—CO—, —NR'—CO—NR'—, or the like) obtained by combining —NR'— and —CO—;
 (19) a group (—NR'—CO-alkylene group- or the like) obtained by combining —NR'—, —CO—, and an alkylene group;
 (20) a group (—NR'—CO-arylene group- or the like) obtained by combining —NR'—, —CO—, and an arylene group;
 (21) a group (—NR'—CO-alkylene group-arylene group- or the like) obtained by combining —NR'—, —CO—, an alkylene group, and an arylene group;
 (22) —$SO_2$—;
 (23) the group represented by (L-1);
 (24) the group represented by (L-5);
 (25) a group (—NR'—$SO_2$— or the like) obtained by combining NR'— and —$SO_2$—;
 (26) a group (—NR'—$SO_2$-alkylene group- or the like) obtained by combining NR'—, —$SO_2$—, and an alkylene group;
 (27) a group (—NR'—$SO_2$— arylene group- or the like) obtained by combining NR'—, —$SO_2$—, and an arylene group;
 (28) a group (—NR'—$SO_2$-alkylene group-arylene group-, —NR'—$SO_2$-arylene group-alkylene group-, or the like) obtained by combining NR'—, —$SO_2$—, an alkylene group, and an arylene group;
 (29) a group obtained by combining the group represented by (L-1) and an alkylene group;
 (30) a group obtained by combining the group represented by (L-1) and an arylene group;
 (31) a group obtained by combining the group represented by (L-1), —$SO_2$—, and an alkylene group;
 (32) a group obtained by combining the group represented by (L-1), —S—, and an alkylene group;
 (33) a group obtained by combining the group represented by (L-1), —O—, and an arylene group;
 (34) a group obtained by combining the group represented by (L-1), —NR'—, —CO—, and an arylene group; and
 (35) a group obtained by combining the group represented by (L-3) and an arylene group.

The linking group represented by L is preferably (1) to (21), more preferably (2), (3), and (5) to (14), even more preferably (5) to (14), particularly preferably (5) and (14), and most preferably (5). With respect to the compound in which L is (5) to (14), the dispersibility of the near infrared absorbing organic pigment is particularly excellent. Particularly, in a case where X is a sulfo group, L is preferably a linking group of (5). In a case where X is a group represented by Formula (X-3), L is preferably a linking group of (14).

In Formula (1a), X represents an acidic group, a basic group, a group having a salt structure, or a phthalimide group. Details of X are the same as the range described in Formula (1).

In Formula (1a), it is preferable that at least one of $R^1, \ldots$, or $R^8$ includes a structure represented by "-L-(X)$_n$", it is more preferable that at least one of $R^1$ or $R^8$ includes a structure represented by "-L-(X)$_n$", and it is even more preferable that $R^1$ and $R^8$ are a structure represented by "-L-(X)$_n$".

The solubility of the compound represented by Formula (1a) with respect to the solvent (25° C.) included in the pigment dispersion liquid is preferably 0 to 0.1 g/L and more preferably 0 to 0.01 g/L. According to this aspect, the dispersibility of the near infrared absorbing organic pigment can be further improved.

The compound represented by Formula (1a) is preferably a compound having a maximum absorption wavelength in a range of 700 to 1,200 nm. The ratio A1/A2 of the absorbance A1 at a wavelength of 500 nm to the absorbance A2 at a maximum absorption wavelength is preferably 0.1 or less and more preferably 0.05 or less. The absorbance of the compound is a value obtained from the absorption spectrum of the compound in the solution. Examples of the measurement solvent used for measuring the absorption spectrum of the compound represented by Formula (1a) include chloroform, dimethylsulfoxide, and tetrahydrofuran. In a case where the compound represented by Formula (1a) is dissolved in chloroform, chloroform is used as a measurement solvent. In a case where the compound is not soluble in chloroform, and is dissolved in dimethylsulfoxide or tetrahydrofuran, dimethylsulfoxide or tetrahydrofuran is used as a measuring solvent.

The compound represented by Formula (1a) is preferably a compound represented by Formula (1a-1).

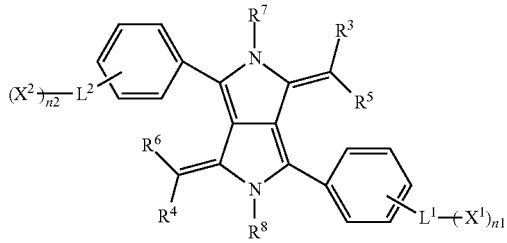

(1a-1)

In Formula (1a-1), $R^3$, $R^4$, $R^5$, and $R^6$ each independently represent a cyano group, an acyl group, an alkoxycarbonyl group, an alkylsulfinyl group, an arylsulfinyl group, or a heteroaryl group, $R^7$ and $R^8$ each independently represent a hydrogen atom, an alkyl group, an aryl group, a heteroaryl group, —BR$^9$R$^{10}$, or a metal atom, $R^7$ may form a covalent bond or a coordinate bond with $R^3$ or $R^5$, $R^8$ may form a covalent bond or a coordinate bond with $R^4$ or $R^6$, $R^9$ and $R^{10}$ each independently represent a hydrogen atom, a halogen atom, an alkyl group, an alkenyl group, an aryl group, a heteroaryl group, an alkoxy group, an aryloxy group, or a heteroaryloxy group, and $R^9$ and $R^{10}$ are bonded to each other to form a ring, $L^1$ and $L^2$ each independently represent a single bond, an alkylene group, an arylene group, a nitrogen-containing heterocyclic group, —O—, —S—, —NR'—, —CO—, —SO$_2$—, a linking group obtained by combining these, and R' represents a hydrogen atom, an alkyl group, or an aryl group, $X^1$ and $X^2$ each independently represent an acidic group, a basic group, a group having a salt structure, or a phthalimide group, and n1 and n2 each independently represent 0 to 4, and at least one of n1 or n2 is 1 or more.

$R^3$ to $R^8$ of Formula (1a-1) are the same as $R^3$ to $R^8$ of Formula (1a), and the preferable ranges are also the same.

$X^1$ and $X^2$ of Formula (1a-1) are the same as X of Formula (1a), and the preferable ranges are also the same.

In Formula (1a-1), $L^1$ and $L^2$ each independently represent a single bond, an alkylene group, an arylene group, a nitrogen-containing heterocyclic group, —O—, —S—, —NR'—, —CO—, —SO$_2$—, a linking group obtained by combining these, and R' represents a hydrogen atom, an alkyl group, or an aryl group. It is preferable that $L^1$ and $L^2$ each independently represent a linking group. Specific examples of the linking group include (1) to (35) exemplified as the linking group L of Formula (1a), (1) to (21) are preferable, (2), (3), and (5) to (14) are more preferable, (5) to (14) are even more preferable, (5) and (14) are particularly preferable, and (5) is most preferable.

With respect to L', the number of atoms constituting the chain connecting the benzene ring directly connected to the pyrrolo pyrrole structure which is the mother nucleus structure of the pigment derivative to $X^2$ is preferably 1 to 20. The lower limit is preferably 2 or more and more preferably 3 or more. The upper limit is preferably 15 or less and more preferably 10 or less. With respect to $L^2$, the number of atoms constituting the chain connecting the benzene ring directly connected to the pyrrolo pyrrole structure which is the mother nucleus structure of the pigment derivative to X' is preferably 1 to 20. The lower limit is preferably 2 or more and more preferably 3 or more. The upper limit is preferably 15 or less and more preferably 10 or less. According to this aspect, the dispersibility of the near infrared absorbing organic pigment can be further improved. Although the detailed reason is unknown, it is assumed that by increasing the distance between the pyrrolo pyrrole structure which is the mother nucleus structure of the pigment derivative and X' and $X^2$, $X^1$ and $X^2$ hardly receive steric hindrance, interaction with resins and the like tends to work easily, and as a result, the dispersibility of the near infrared absorbing organic pigment can be improved.

In Formula (1a-1), n1 and n2 each independently represent 0 to 4, and at least one of n1 or n2 is 1 or more. n1 and n2 each independently and preferably represent 1 to 4, more preferably 1 or 2, and even more preferably 1.

Specific examples of the pigment derivative include the following compounds. In the following structural formula, Me represents a methyl group, Bu represents a butyl group, and Ph represents a phenyl group. Ar-11 to Ar-34, and R-1 to R-7 in the table are as below. "*" in the structure provided below is a linking hand. Among the following specific examples, the carboxyl group and the sulfo group may form a salt. Examples of an atom or an atomic group constituting a salt include a metal atom (Na, K, and the like) and tetrabutylammonium.

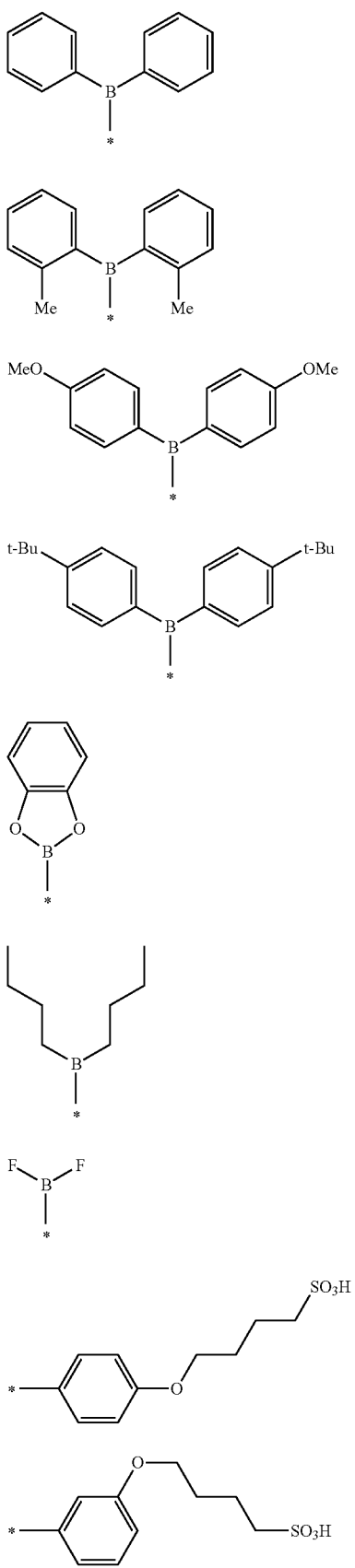
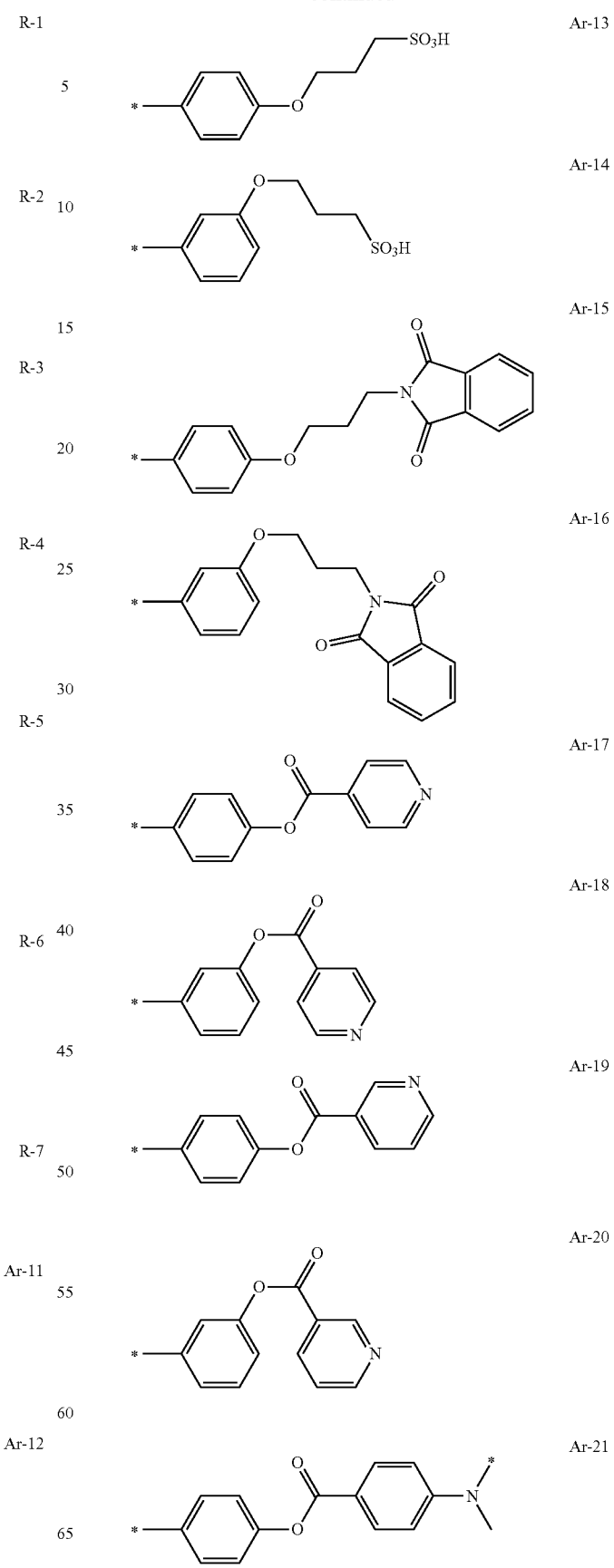

Ar-22
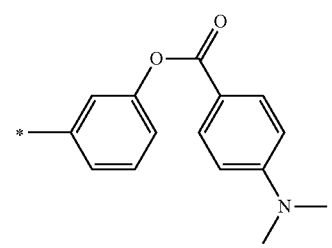
Ar-23
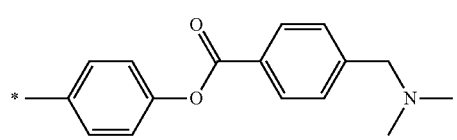
Ar-24
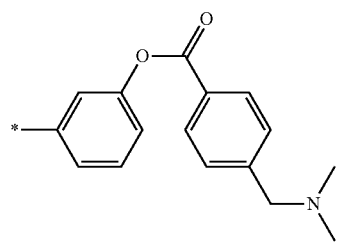
Ar-25
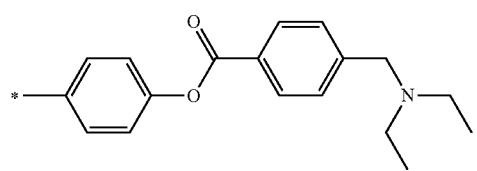
Ar-26
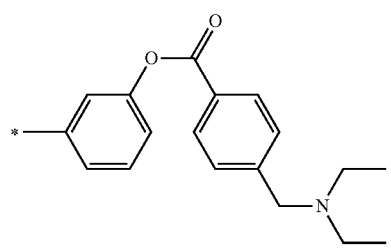
Ar-27
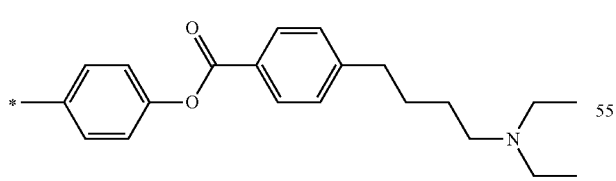
Ar-28
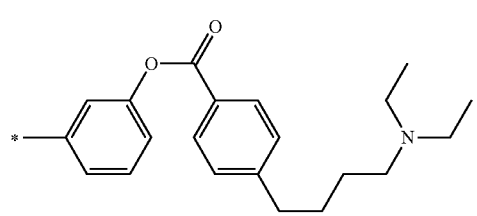
Ar-29
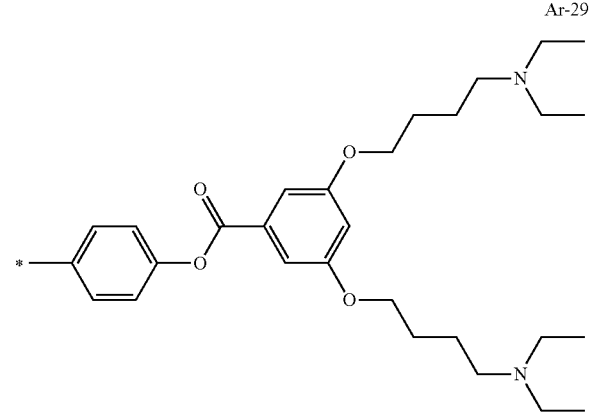
Ar-30
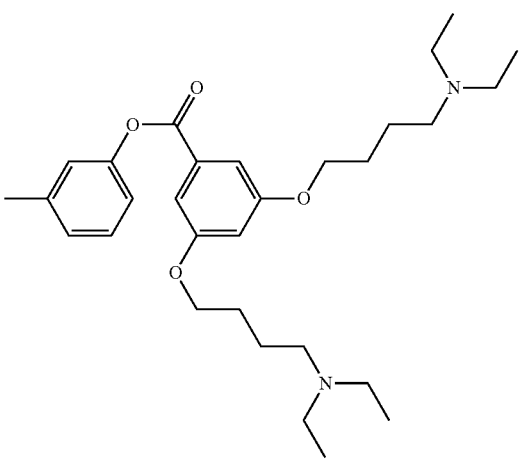
Ar-31
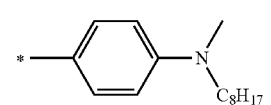
Ar-32
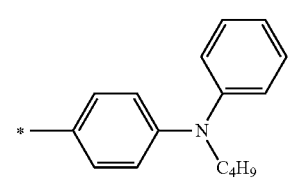
Ar-33
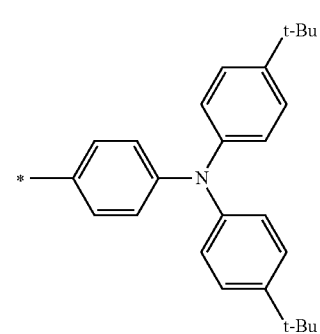

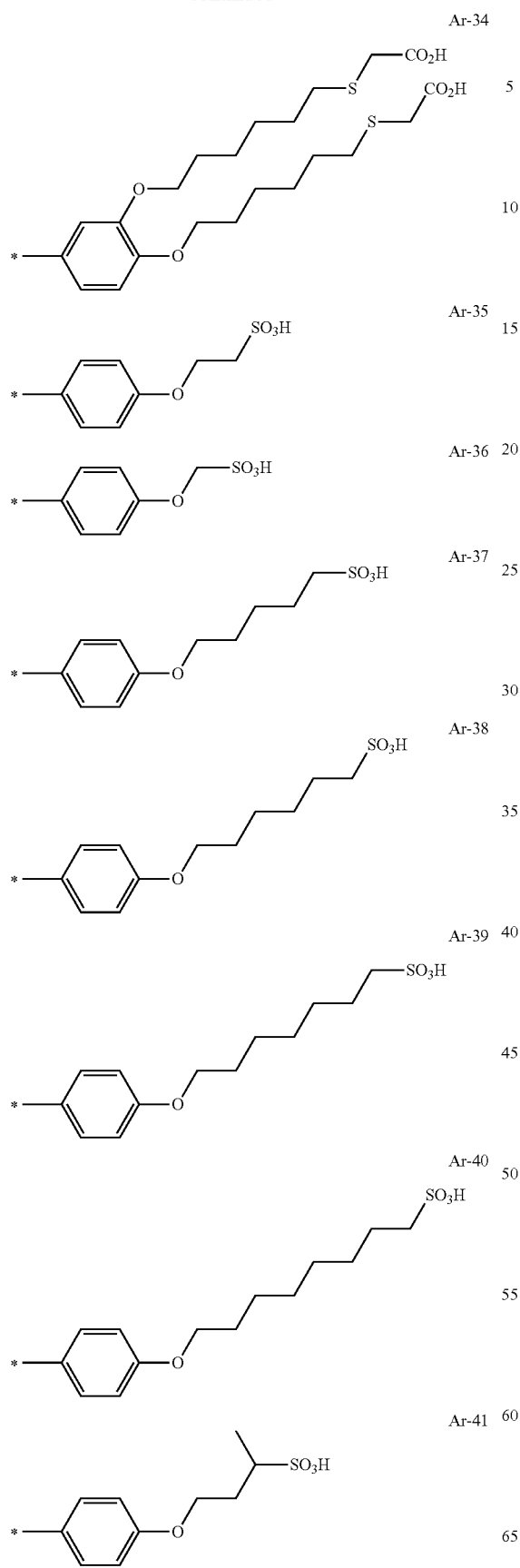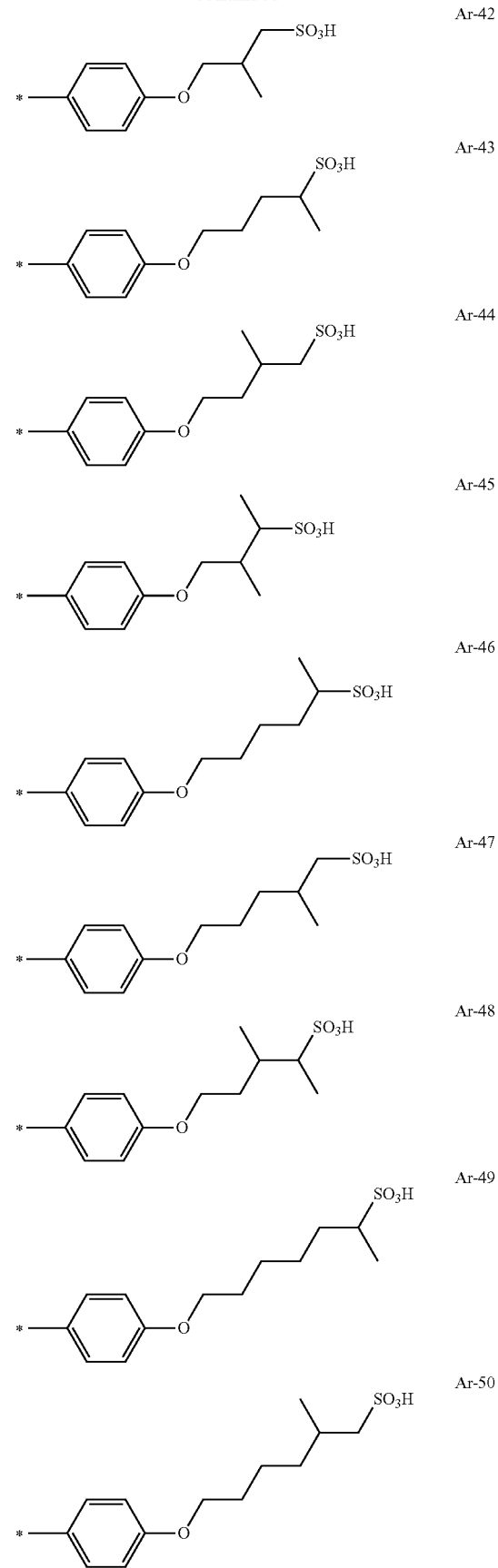

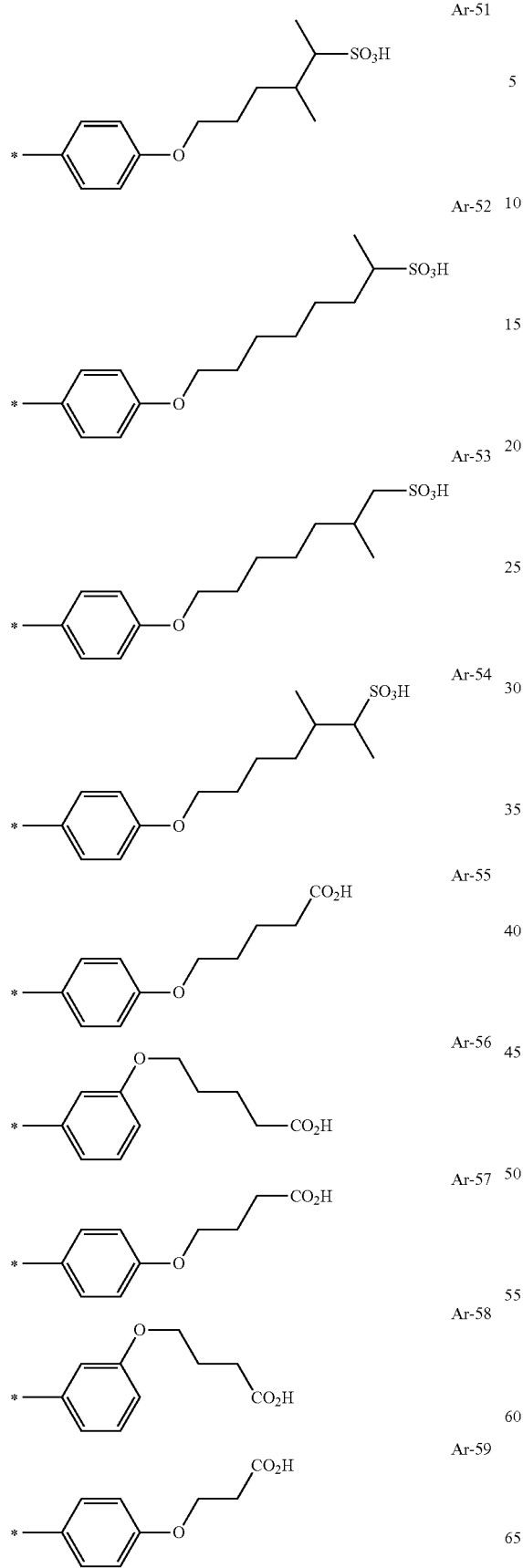
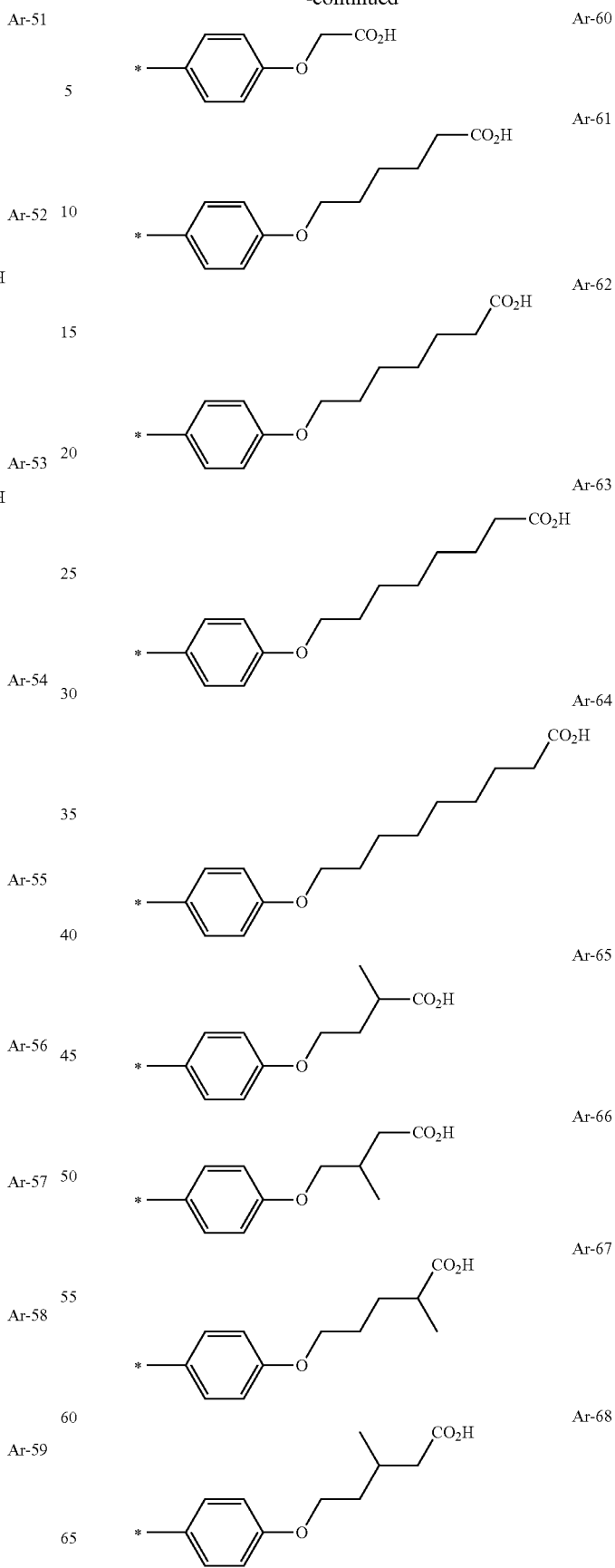

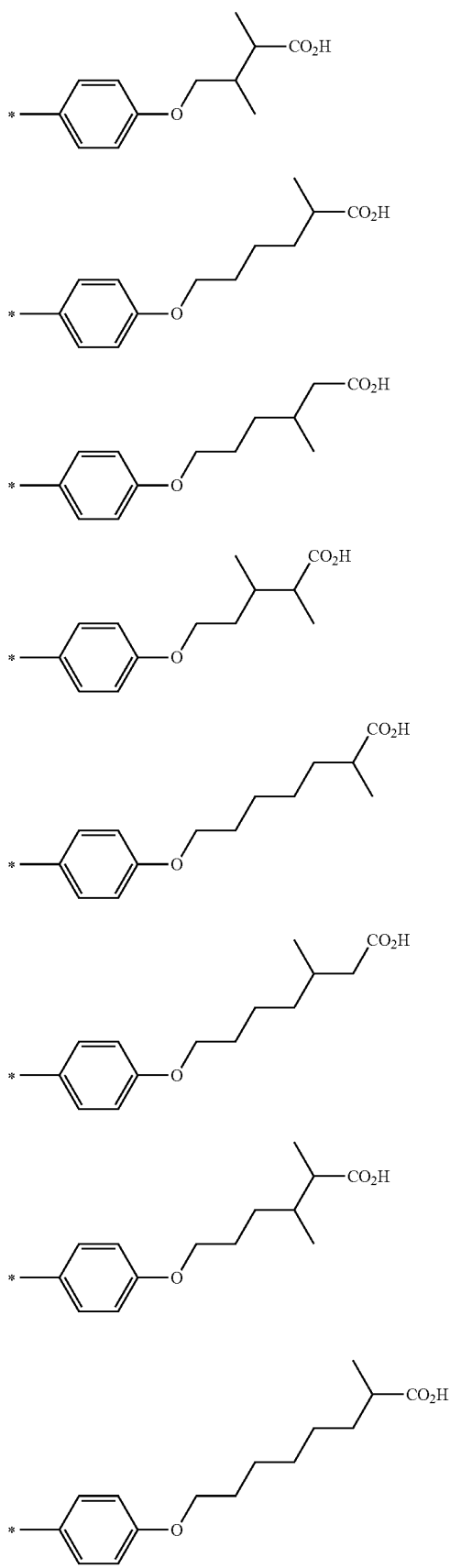
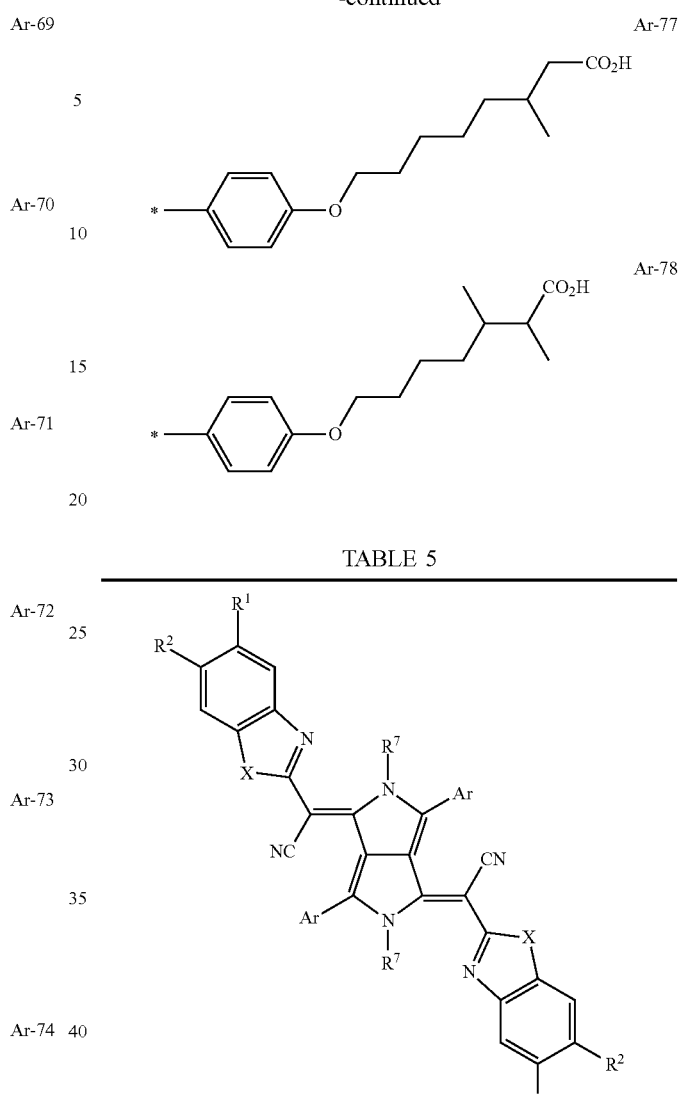
TABLE 5
| | X | Ar | R¹ | R² | R⁷ |
|---|---|---|---|---|---|
| B-1 | S | Ar-11 | H | H | R-1 |
| B-2 | S | Ar-11 | Cl | H | R-1 |
| B-3 | S | Ar-11 | H | Cl | R-1 |
| B-4 | S | Ar-11 | Me | H | R-1 |
| B-5 | S | Ar-11 | H | Me | R-1 |
| B-6 | S | Ar-11 | Me | Me | R-1 |
| B-7 | S | Ar-11 | OMe | H | R-1 |
| B-8 | S | Ar-11 | H | OMe | R-1 |
| B-9 | S | Ar-12 | H | H | R-1 |
| B-10 | S | Ar-13 | H | H | R-1 |
| B-11 | S | Ar-14 | H | H | R-1 |
| B-12 | S | Ar-15 | H | H | R-1 |
| B-13 | S | Ar-16 | H | H | R-1 |
| B-14 | S | Ar-17 | H | H | R-1 |
| B-15 | S | Ar-18 | H | H | R-1 |
| B-16 | S | Ar-19 | H | H | R-1 |
| B-17 | S | Ar-20 | H | H | R-1 |
| B-18 | S | Ar-21 | H | H | R-1 |
| B-19 | S | Ar-22 | H | H | R-1 |
| B-20 | S | Ar-23 | H | H | R-1 |
| B-21 | S | Ar-24 | H | H | R-1 |
| B-22 | S | Ar-25 | H | H | R-1 |
| B-23 | S | Ar-26 | H | H | R-1 |
| B-24 | S | Ar-27 | H | H | R-1 |
| B-25 | S | Ar-28 | H | H | R-1 |
| B-26 | S | Ar-29 | H | H | R-1 |

TABLE 5-continued

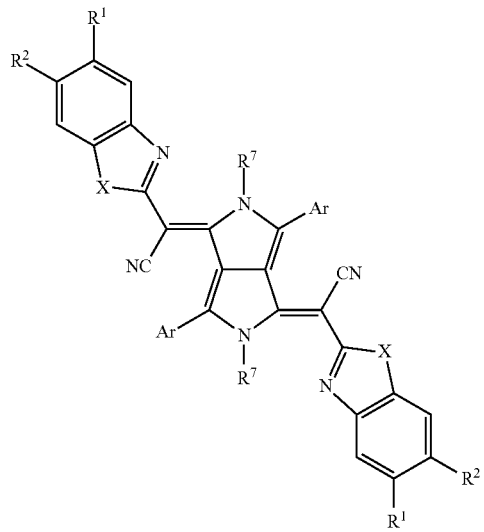

| | X | Ar | $R^1$ | $R^2$ | $R^7$ |
|---|---|---|---|---|---|
| B-27 | S | Ar-30 | H | H | R-1 |
| B-28 | S | Ar-31 | H | t-Bu | R-1 |
| B-29 | S | Ar-32 | H | t-Bu | R-1 |
| B-30 | S | Ar-33 | H | t-Bu | R-1 |
| B-31 | S | Ar-34 | H | t-Bu | R-1 |
| B-32 | S | Ar-11 | H | H | R-2 |
| B-33 | S | Ar-11 | H | H | R-3 |
| B-34 | S | Ar-11 | H | H | R-4 |
| B-35 | S | Ar-11 | H | H | R-5 |
| B-36 | S | Ar-11 | H | H | R-6 |
| B-37 | S | Ar-11 | H | H | R-7 |
| B-101 | O | Ar-11 | H | H | R-1 |
| B-102 | O | Ar-11 | Cl | H | R-1 |
| B-103 | O | Ar-11 | Me | H | R-1 |
| B-104 | O | Ar-11 | H | Me | R-1 |
| B-105 | O | Ar-11 | t-Bu | H | R-1 |
| B-106 | O | Ar-12 | H | H | R-1 |
| B-107 | O | Ar-13 | H | H | R-1 |
| B-108 | O | Ar-14 | H | H | R-1 |
| B-109 | O | Ar-15 | H | H | R-1 |
| B-110 | O | Ar-16 | H | H | R-1 |
| B-111 | O | Ar-17 | H | H | R-1 |
| B-112 | O | Ar-18 | H | H | R-1 |
| B-113 | O | Ar-19 | H | H | R-1 |
| B-114 | O | Ar-20 | H | H | R-1 |
| B-115 | O | Ar-21 | H | H | R-1 |
| B-116 | O | Ar-22 | H | H | R-1 |
| B-117 | O | Ar-23 | H | H | R-1 |
| B-118 | O | Ar-24 | H | H | R-1 |
| B-119 | O | Ar-25 | H | H | R-1 |
| B-120 | O | Ar-26 | H | H | R-1 |
| B-121 | O | Ar-27 | H | H | R-1 |
| B-122 | O | Ar-28 | H | H | R-1 |
| B-123 | O | Ar-29 | H | H | R-1 |
| B-124 | O | Ar-30 | H | H | R-1 |
| B-125 | O | Ar-31 | H | H | R-1 |
| B-126 | O | Ar-32 | H | H | R-1 |
| B-127 | O | Ar-33 | H | H | R-1 |
| B-128 | O | Ar-34 | H | H | R-1 |
| B-129 | O | Ar-11 | H | H | R-2 |
| B-130 | O | Ar-11 | H | H | R-3 |
| B-131 | O | Ar-11 | H | H | R-4 |
| B-132 | O | Ar-11 | H | H | R-5 |
| B-133 | O | Ar-11 | H | H | R-6 |
| B-134 | O | Ar-11 | H | H | R-7 |
| B-135 | S | Ar-35 | OMe | H | R-1 |
| B-136 | S | Ar-36 | OMe | H | R-1 |
| B-137 | S | Ar-37 | OMe | H | R-1 |
| B-138 | S | Ar-38 | OMe | H | R-1 |
| B-139 | S | Ar-39 | OMe | H | R-1 |
| B-140 | S | Ar-40 | OMe | H | R-1 |
| B-141 | S | Ar-41 | OMe | H | R-1 |

TABLE 5-continued

| | X | Ar | $R^1$ | $R^2$ | $R^7$ |
|---|---|---|---|---|---|
| B-142 | S | Ar-42 | OMe | H | R-1 |
| B-143 | S | Ar-43 | OMe | H | R-1 |
| B-144 | S | Ar-44 | OMe | H | R-1 |
| B-145 | S | Ar-45 | OMe | H | R-1 |
| B-146 | S | Ar-46 | OMe | H | R-1 |
| B-147 | S | Ar-47 | OMe | H | R-1 |
| B-148 | S | Ar-48 | OMe | H | R-1 |
| B-149 | S | Ar-49 | OMe | H | R-1 |
| B-150 | S | Ar-50 | OMe | H | R-1 |
| B-151 | S | Ar-51 | OMe | H | R-1 |
| B-152 | S | Ar-52 | OMe | H | R-1 |
| B-153 | S | Ar-53 | OMe | H | R-1 |
| B-154 | S | Ar-54 | OMe | H | R-1 |
| B-155 | S | Ar-55 | OMe | H | R-1 |
| B-156 | S | Ar-56 | OMe | H | R-1 |
| B-157 | S | Ar-57 | OMe | H | R-1 |
| B-158 | S | Ar-58 | OMe | H | R-1 |
| B-159 | S | Ar-59 | OMe | H | R-1 |
| B-160 | S | Ar-60 | OMe | H | R-1 |
| B-161 | S | Ar-61 | OMe | H | R-1 |
| B-162 | S | Ar-62 | OMe | H | R-1 |
| B-163 | S | Ar-63 | OMe | H | R-1 |
| B-164 | S | Ar-64 | OMe | H | R-1 |
| B-165 | S | Ar-65 | OMe | H | R-1 |
| B-166 | S | Ar-66 | OMe | H | R-1 |
| B-167 | S | Ar-67 | OMe | H | R-1 |
| B-168 | S | Ar-68 | OMe | H | R-1 |
| B-169 | S | Ar-69 | OMe | H | R-1 |
| B-170 | S | Ar-70 | OMe | H | R-1 |
| B-171 | S | Ar-71 | OMe | H | R-1 |
| B-172 | S | Ar-72 | OMe | H | R-1 |
| B-173 | S | Ar-73 | OMe | H | R-1 |
| B-174 | S | Ar-74 | OMe | H | R-1 |
| B-175 | S | Ar-75 | OMe | H | R-1 |
| B-176 | S | Ar-76 | OMe | H | R-1 |
| B-177 | S | Ar-77 | OMe | H | R-1 |
| B-178 | S | Ar-78 | OMe | H | R-1 |

TABLE 6

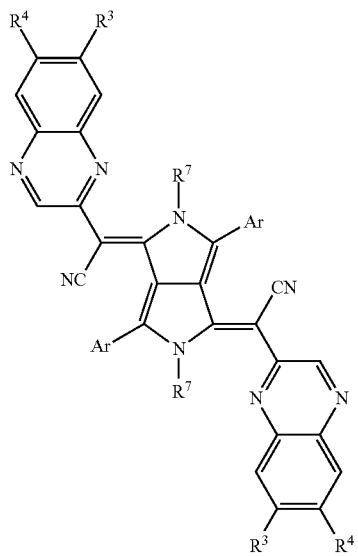

|       | Ar    | R³ | R⁴  | R⁷  |
|-------|-------|----|-----|-----|
| B-201 | Ar-11 | H  | H   | R-1 |
| B-202 | Ar-11 | H  | Cl  | R-1 |
| B-203 | Ar-11 | Cl | Cl  | R-1 |
| B-204 | Ar-11 | H  | Me  | R-1 |
| B-205 | Ar-11 | Me | Me  | R-1 |
| B-206 | Ar-11 | H  | OMe | R-1 |
| B-207 | Ar-12 | H  | H   | R-1 |
| B-208 | Ar-13 | H  | H   | R-1 |
| B-209 | Ar-14 | H  | H   | R-1 |
| B-210 | Ar-15 | H  | H   | R-1 |
| B-211 | Ar-16 | H  | H   | R-1 |
| B-212 | Ar-17 | H  | H   | R-1 |
| B-213 | Ar-18 | H  | H   | R-1 |
| B-214 | Ar-19 | H  | H   | R-1 |
| B-215 | Ar-20 | H  | H   | R-1 |
| B-216 | Ar-21 | H  | H   | R-1 |
| B-217 | Ar-22 | H  | H   | R-1 |
| B-218 | Ar-23 | H  | H   | R-1 |
| B-219 | Ar-24 | H  | H   | R-1 |
| B-220 | Ar-25 | H  | H   | R-1 |
| B-221 | Ar-26 | H  | H   | R-1 |
| B-222 | Ar-27 | H  | H   | R-1 |
| B-223 | Ar-28 | H  | H   | R-1 |
| B-224 | Ar-29 | H  | H   | R-1 |
| B-225 | Ar-30 | H  | H   | R-1 |
| B-226 | Ar-31 | H  | H   | R-1 |
| B-227 | Ar-32 | H  | H   | R-1 |
| B-228 | Ar-33 | H  | H   | R-1 |
| B-229 | Ar-34 | H  | H   | R-1 |
| B-230 | Ar-11 | H  | H   | R-2 |
| B-231 | Ar-11 | H  | H   | R-3 |
| B-232 | Ar-11 | H  | H   | R-4 |
| B-233 | Ar-11 | H  | H   | R-5 |
| B-234 | Ar-11 | H  | H   | R-6 |
| B-235 | Ar-11 | H  | H   | R-7 |

TABLE 7

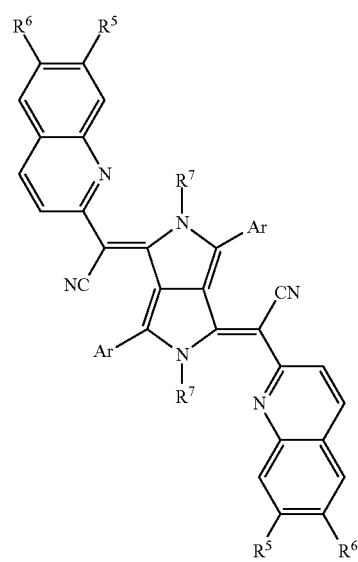

|       | Ar    | R⁵ | R⁶   | R⁷  |
|-------|-------|----|------|-----|
| B-301 | Ar-11 | H  | H    | R-1 |
| B-302 | Ar-11 | H  | t-Bu | R-1 |
| B-303 | Ar-12 | H  | H    | R-1 |
| B-304 | Ar-13 | H  | H    | R-1 |
| B-305 | Ar-14 | H  | H    | R-1 |
| B-306 | Ar-15 | H  | H    | R-1 |
| B-307 | Ar-16 | H  | H    | R-1 |
| B-308 | Ar-17 | H  | H    | R-1 |
| B-309 | Ar-18 | H  | H    | R-1 |
| B-310 | Ar-19 | H  | H    | R-1 |
| B-311 | Ar-20 | H  | H    | R-1 |
| B-312 | Ar-21 | H  | H    | R-1 |
| B-313 | Ar-22 | H  | H    | R-1 |
| B-314 | Ar-23 | H  | H    | R-1 |
| B-315 | Ar-24 | H  | H    | R-1 |
| B-316 | Ar-25 | H  | H    | R-1 |
| B-317 | Ar-26 | H  | H    | R-1 |
| B-318 | Ar-27 | H  | H    | R-1 |
| B-319 | Ar-28 | H  | H    | R-1 |
| B-320 | Ar-29 | H  | H    | R-1 |
| B-321 | Ar-30 | H  | H    | R-1 |
| B-322 | Ar-31 | H  | t-Bu | R-1 |
| B-323 | Ar-32 | H  | t-Bu | R-1 |
| B-324 | Ar-33 | H  | t-Bu | R-1 |
| B-325 | Ar-34 | H  | t-Bu | R-1 |
| B-326 | Ar-11 | H  | H    | R-2 |
| B-327 | Ar-11 | H  | H    | R-3 |
| B-328 | Ar-11 | H  | H    | R-4 |
| B-329 | Ar-11 | H  | H    | R-5 |
| B-330 | Ar-11 | H  | H    | R-6 |
| B-331 | Ar-11 | H  | H    | R-7 |

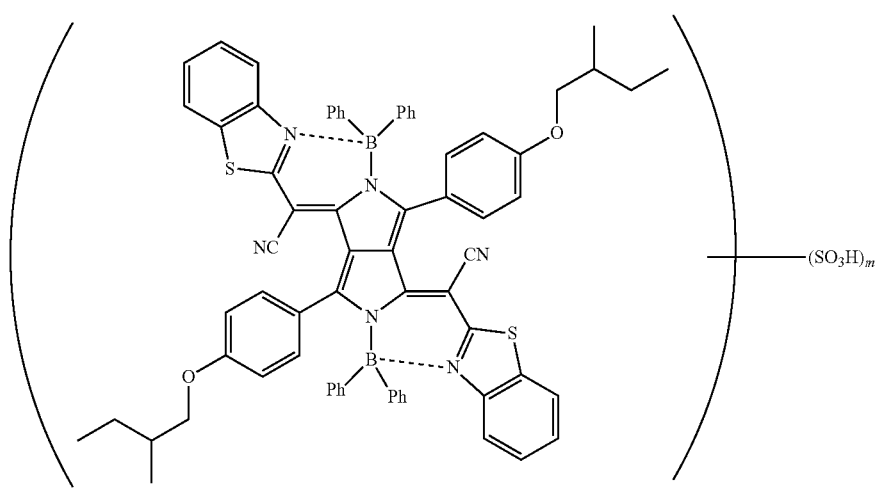
(B-dr-1)
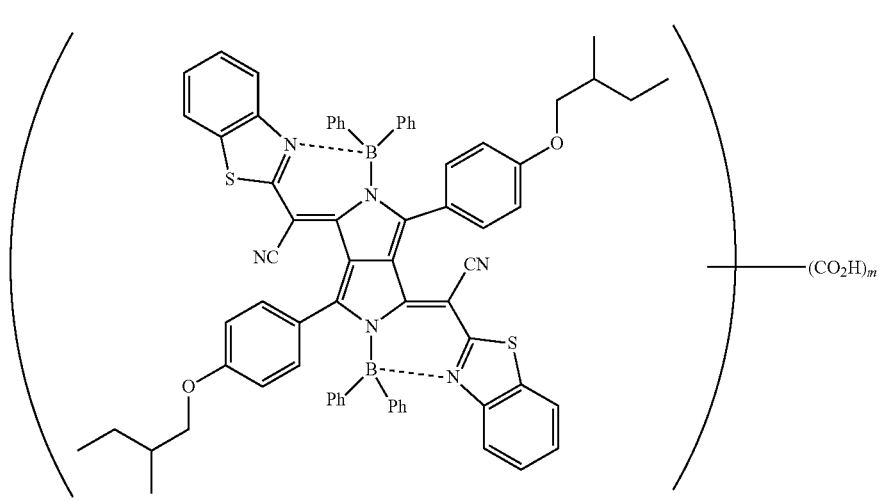
(B-dr-2)
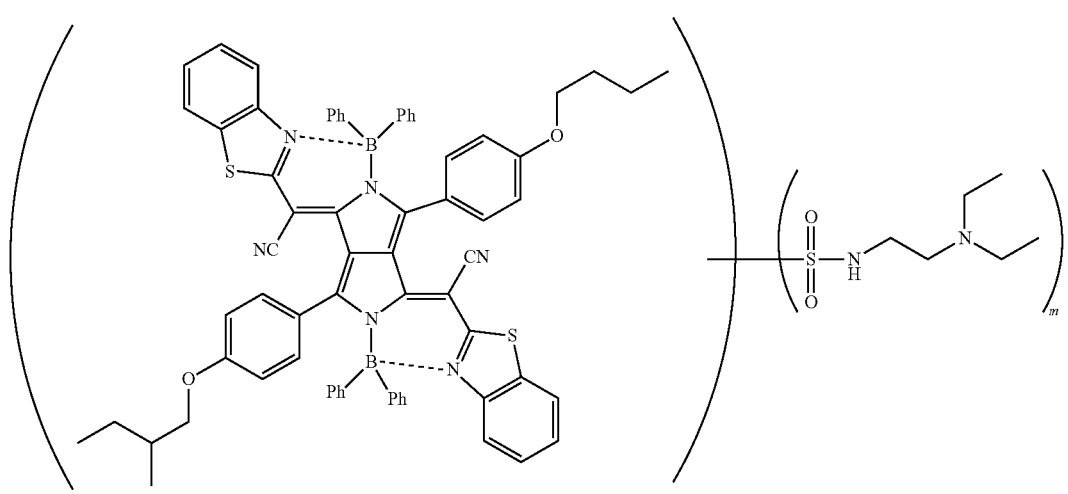
(B-dr-3)

(B-dr-4)
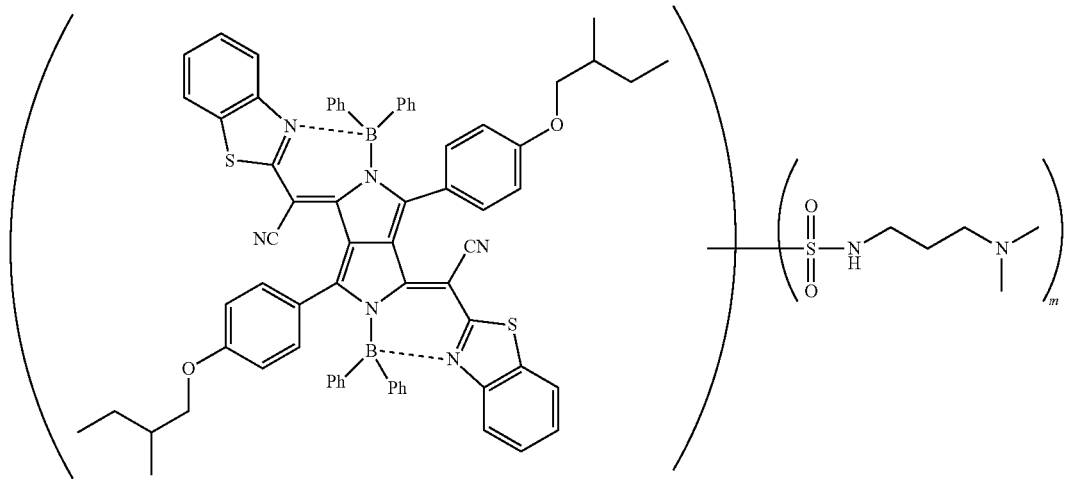
(B-dr-5)
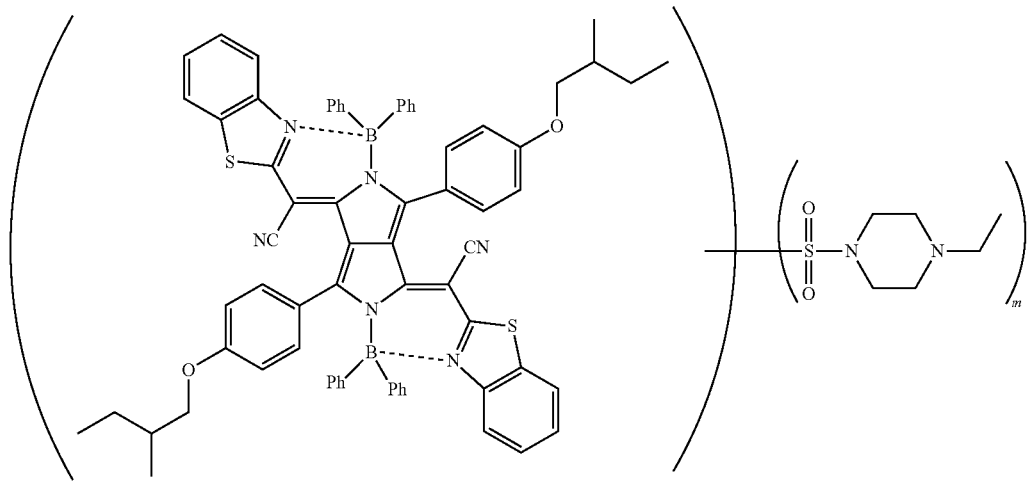
(B-dr-6)
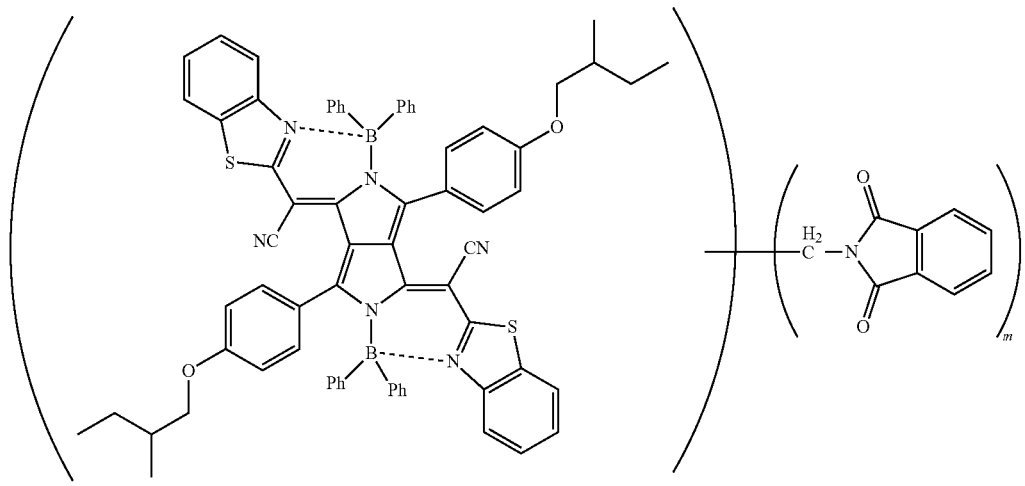

(B-dr-7)
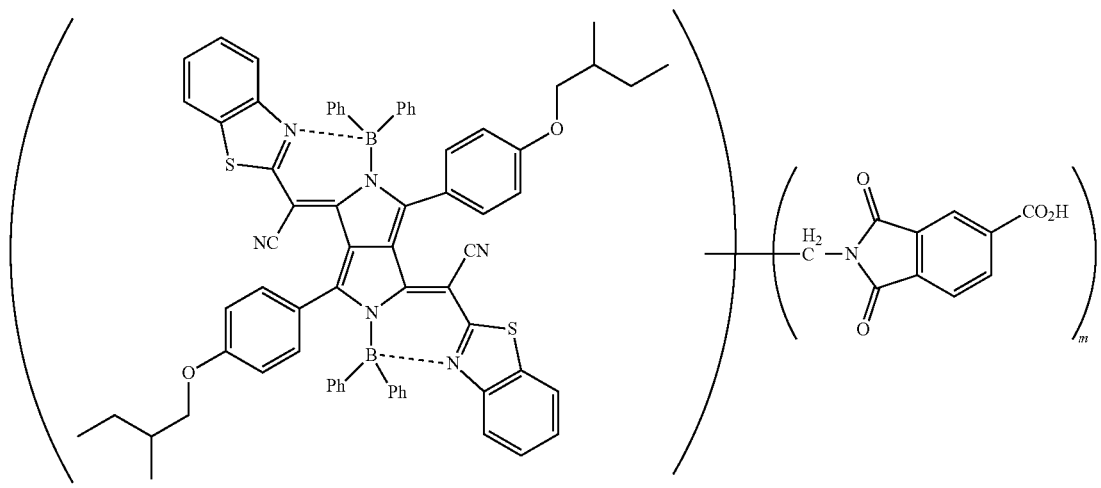
(B-dr-8)
(B-dr-9)
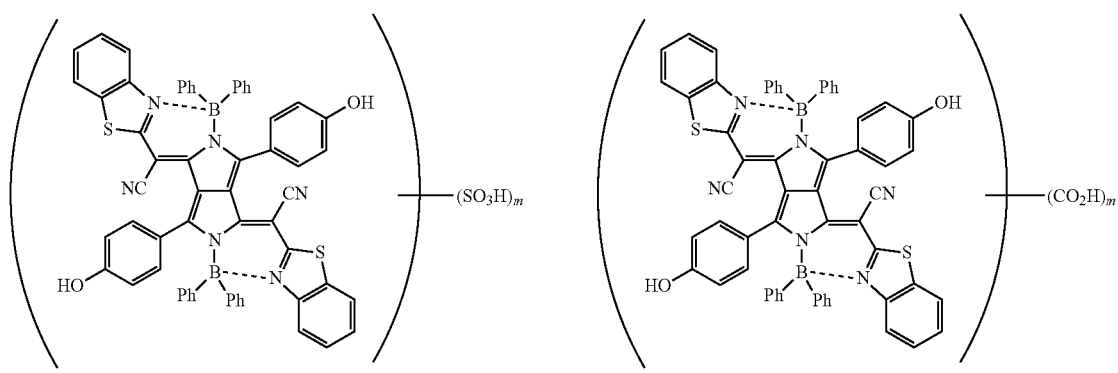
(B-dr-10)
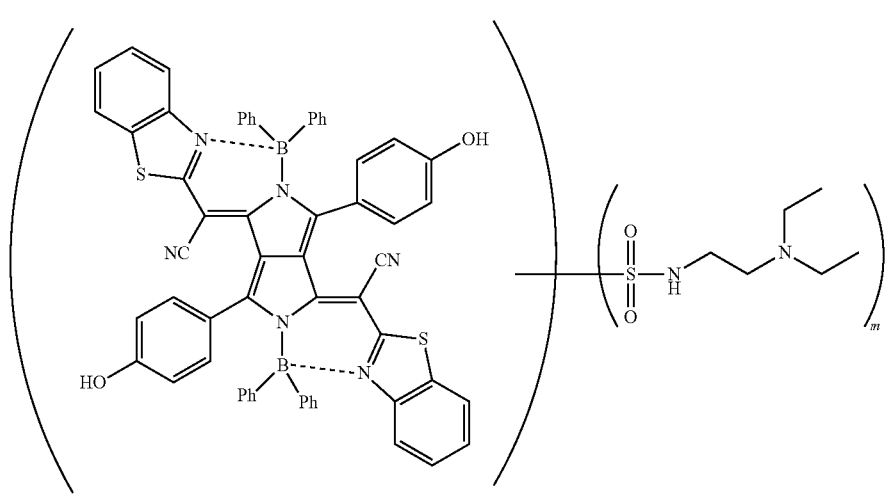

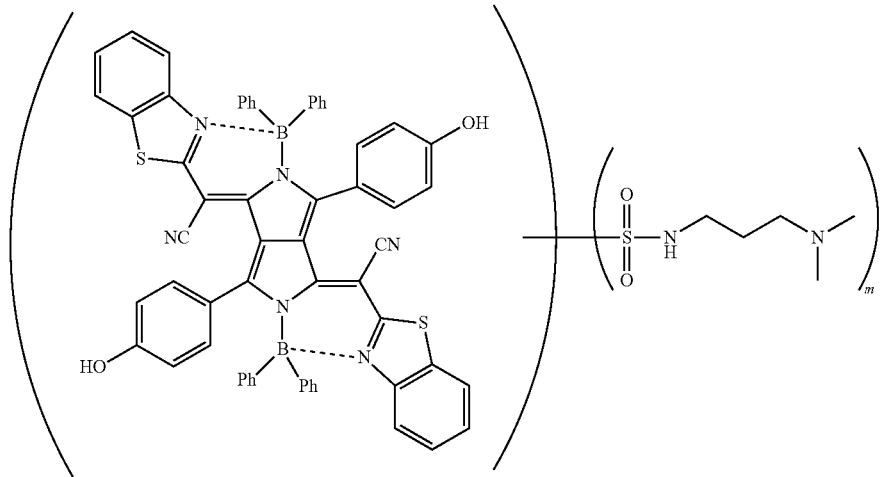
(B-dr-11)
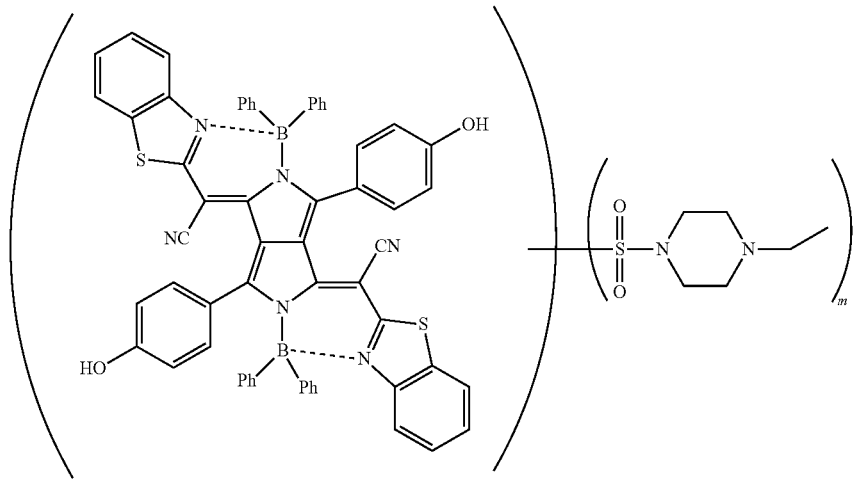
(B-dr-12)
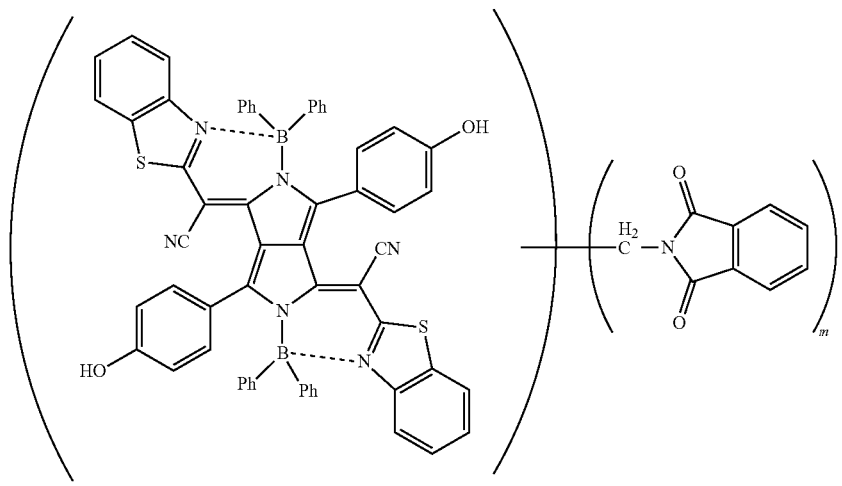
(B-dr-13)

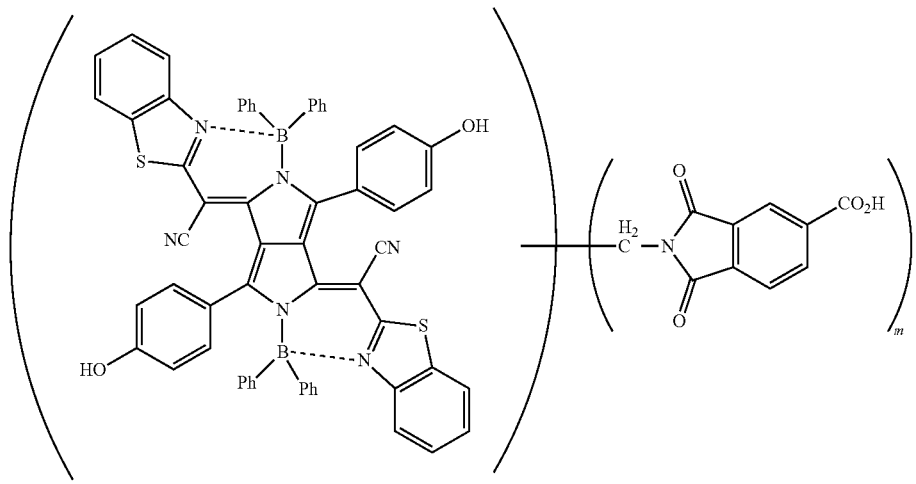

(B-dr-14)

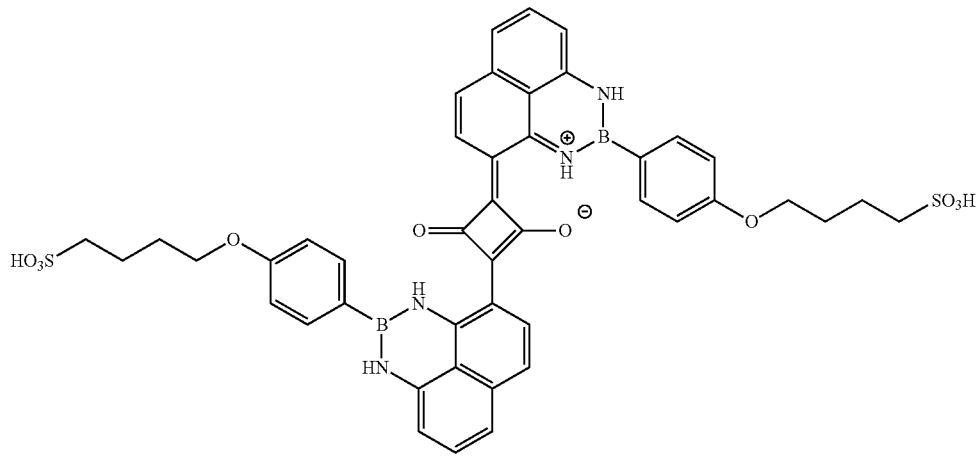

(B-sq-1)

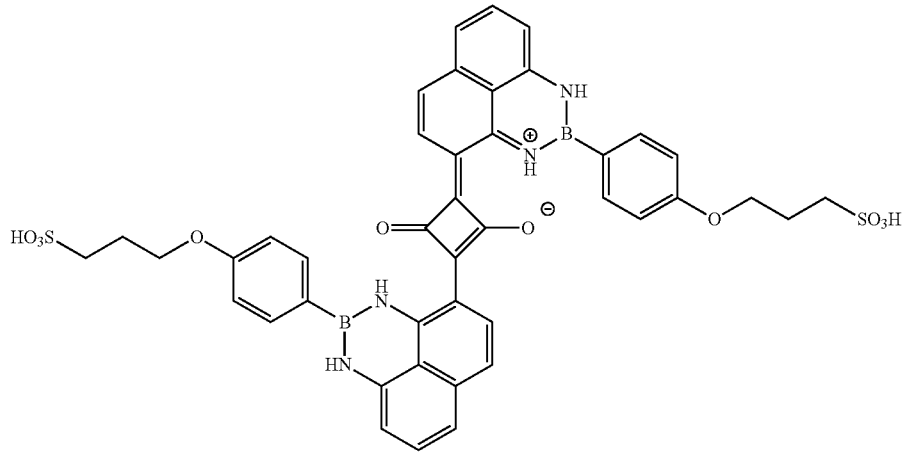

(B-sq-2)

The pigment dispersion liquid according to the embodiment of the present invention includes two or more kinds of pigment derivatives having different structures. The pigment dispersion liquid according to the embodiment of the present invention may include three or more pigment derivatives having different structures. The content of one kind of the pigment derivatives in the total mass of two or more kinds of the pigment derivative having different structures is preferably 99 mass % or less, more preferably 90 mass % or less, and even more preferably 80 mass % or less. According to this aspect, the crystallinity of the pigment derivative is easily lowered, and a film having fewer foreign matters can be manufactured.

With respect to the pigment dispersion liquid according to the embodiment of the present invention, a total content of the pigment derivatives is preferably 1 to 50 parts by mass with respect to 100 parts by mass of the pigment. The lower limit is more preferably 3 parts by mass or more and even more preferably 5 parts by mass or more. The upper limit is more preferably 40 parts by mass or less and even more preferably 30 parts by mass or less.

<<Solvent>>

The pigment dispersion liquid according to the embodiment of the present invention includes a solvent. Examples of the solvent include an organic solvent. Basically, the solvent is not particularly limited as long as it satisfies the solubility of each component and the like, but it is preferable that the solvent is selected considering safety and the like.

Examples of the organic solvent include the following organic solvents. Examples of esters include ethyl acetate, n-butyl acetate, isobutyl acetate, cyclohexyl acetate, amyl formate, isoamyl acetate, butyl propionate, isopropyl butyrate, ethyl butyrate, butyl butyrate, methyl lactate, ethyl lactate, alkyloxyoxyacetate (for example, methyl alkyloxyacetate, ethyloxyalkyl acetate, butyl alkyloxyacetate (for example, methyl methoxyacetate, ethyl methoxyacetate, butyl methoxyacetate, methyl ethoxyacetate, and ethyl ethoxyacetate)), 3-alkyloxypropionic acid alkyl esters (for example, methyl 3-alkyloxypropionate, and ethyl 3-alkyloxypropionate (for example, methyl 3-methoxypropionate, ethyl 3-methoxypropionate, methyl 3-ethoxypropionate, and ethyl 3-ethoxypropionate)), 2-alkyloxypropionic acid alkyl esters (for example, methyl 2-alkyloxypropionate, ethyl 2-alkyloxypropionate, and propyl 2-alkyloxypropionate (for example, methyl 2-methoxypropionate, ethyl 2-methoxypropionate, propyl 2-methoxypropionate, methyl 2-ethoxypropionate, and ethyl 2-ethoxypropionate)), methyl 2-alkyloxy-2-methylpropionate, and ethyl 2-alkyloxy-2-methylpropionate (for example, methyl 2-methoxy-2-methylpropionate, and ethyl 2-ethoxy-2-methylpropionate), methyl pyruvate, ethyl pyruvate, propyl pyruvate, methyl acetoacetate, ethyl acetoacetate, methyl 2-oxobutanoate, and ethyl 2-oxobutanoate. Examples of ethers include diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, diethylene glycol monobutyl ether acetate, propylene glycol monomethyl ether, propylene glycol monomethyl ether acetate, propylene glycol monoethyl ether acetate, and propylene glycol monopropyl ether acetate. Examples of ketones include methyl ethyl ketone, cyclohexanone, cyclopentanone, 2-heptanone, and 3-heptanone. Examples of the aromatic hydrocarbons include toluene and xylene. However, it is better to reduce aromatic hydrocarbons (benzene, toluene, xylene, ethylbenzene, and the like) as an organic solvent for environmental reasons or the like in some cases (for example, may be 50 mass ppm (parts per million) or less, may be 10 mass ppm or less, and may be 1 mass ppm or less with respect to the total mass of the organic solvent).

The organic solvent may be used singly or two or more kinds thereof may be used in combination. In a case where two or more kinds of the organic solvent may be used in combination, Among these, a mixed solution including two or more selected from methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, ethyl carbitol acetate, butyl carbitol acetate, propylene glycol methyl ether, and propylene glycol methyl ether acetate is preferable.

According to the present invention, it is preferable to use an organic solvent with a less metal content, and the metal content of the organic solvent is preferably 10 mass ppb (parts per billion) or less. If necessary, the organic solvent having a mass ppt (parts per trillion) level may be used, and the high purity organic solvent is, for example, provided by Toyo Gosei Co., Ltd. (Japan Chemical Daily, Nov. 13, 2015).

Examples of the method for removing impurities such as metals from an organic solvent include distillation (molecular distillation, thin film distillation, and the like) filtered using a filter. The pore diameter of the filter used for filtration is preferably 10 nm or less, more preferably 5 nm or less, and even more preferably 3 nm or less. The material of the filter is preferably polytetrafluoroethylene, polyethylene, or nylon.

The organic solvent may include an isomer (a compound having the same number of atoms and different structures). Only one kind of isomers may be included, or a plurality of kinds of isomers may be included.

According to the present invention, it is preferable that the content of peroxide in the organic solvent preferably is 0.8 mmol/L or less, and it is more preferable that the organic solvent does not substantially include peroxide.

The content of the solvent is preferably an amount in which the total solid content of the pigment dispersion liquid becomes 5 to 60 mass % and preferably an amount in which the total solid content becomes 10 to 40 mass %. The solvent may be used singly or two or more kinds thereof may be used. In a case where two or more kinds of the solvents are used, the total amount thereof is preferably in the above range.

<<Resin>>

It is preferable that the pigment dispersion liquid according to the embodiment of the present invention further includes a resin. For example, the resin is formulated for use of dispersing a pigment or the like in a pigment dispersion liquid or use of a binder. A resin that is mainly used in order to disperse a pigment or the like is referred to as a dispersing agent. These applications of the resin are provided as examples, and the resin can be used for the purpose other than these applications.

According to the present invention, it is preferable to use a resin having an acid group, as the resin. Examples of the acid group include a carboxyl group, a phosphoric acid group, a sulfo group, and a phenolic hydroxy group, and a carboxyl group is preferable.

The weight-average molecular weight (Mw) of the resin is preferably 2,000 to 2,000,000. The upper limit is more preferably 1,000,000 or less and even more preferably 500,000 or less. The lower limit is more preferably 3,000 or more and even more preferably 5,000 or more.

The resin working as a dispersing agent is preferably an acid-type resin and/or a base-type resin. Here, the acid-type resin refers to a resin in which an amount of an acid group is an amount of a basic group. The acid-type resin is preferably a resin in which an amount of the acid group occupies 70 mol % or more in a case where a total amount of the acid group and the basic group in the resin is 100 mol % and more preferably a resin substantially includes the acid group only. The acid group having an acid-type resin is preferably a carboxyl group. The acid value of the acid-type resin is preferably 40 to 105 mgKOH/g, more preferably 50 to 105 mgKOH/g, and even more preferably 60 to 105 mgKOH/g. The base-type resin refers to a resin in which an amount of the basic group is more than an amount of the acid group. The base-type resin is preferably a resin in which an amount of the basic group is 50 mol % in a case where a total amount of the amount of the acid group and the amount of the basic group in the resin is 100 mol %. The basic group having a base-type resin is preferably amine.

Examples of the dispersing agent include polymer dispersing agents [for example, a resin having an amine group (polyamidoamine and a salt thereof), an oligoimine-based resin, polycarboxylic acid and a salt thereof, high molecular weight unsaturated acid ester, modified polyurethane, modified polyester, modified poly(meth)acrylate, a (meth)acrylic copolymer, and a naphthalene sulfonic acid formalin condensate]. From the structure thereof, the polymer dispersing agent can be classified into a linear polymer, a terminal-modified polymer, a graft-type polymer, and a block-type polymer.

Examples of the terminal-modified polymer include polymers having a phosphoric acid group at a terminal disclosed in JP1991-112992A (JP-H03-112992A) and JP2003-533455A, polymers having a sulfo group at a terminal disclosed in JP2002-273191A, and polymers having a partial skeleton or a heterocyclic ring of an organic coloring agent disclosed in JP1997-077994A (JP-H09-077994A). A polymer having an anchor moiety (an acid group, a basic group, a partial skeleton of an organic coloring agent, a heterocyclic ring, and the like) introduced to two or more pigment surfaces at the polymer terminal disclosed in JP2007-277514A is preferable because of excellent dispersion stability.

Examples of the block-type polymer include block-type polymers disclosed in JP2003-049110A and JP2009-052010A.

Examples of the graft-type polymer include reaction products of poly(lower alkylene imine) and polyester disclosed in JP1979-037082A (JP-S54-037082A), JP1996-507960A (JP-H08-507960A), and JP2009-258668A, reaction products of polyallylamine and polyester disclosed in JP1997-169821A (JP-H09-169821), copolymers of macromonomers and a monomer having a nitrogen atom-containing group disclosed in JP1998-339949A (JP-H10-339949A) and JP2004-037986A, graft-type polymers having a partial skeleton of an organic coloring agent or a heterocyclic ring disclosed in JP2003-238837A, JP2008-009426A, and JP2008-081732A, and copolymers of a macromonomer and an acid group-containing monomer disclosed in JP2010-106268A.

According to the present invention, a graft copolymer can also be used as the resin as a dispersing agent. The graft copolymer is preferably a resin having a graft chain in which the number of atoms excluding a hydrogen atom is in the range of 40 to 10,000. The number of atoms excluding hydrogen atoms per graft chain is preferably 40 to 10,000, more preferably 50 to 2,000, and even more preferably 60 to 500.

Examples of the main chain structure of the graft copolymer include a (meth)acrylic resin, a polyester resin, a polyurethane resin, a polyurea resin, a polyamide resin, and a polyether resin. A (meth)acrylic resin is preferable. In order to improve the interaction between the graft moiety and the solvent and thereby improve the dispersibility, the graft chain of the graft copolymer is preferably a graft chain having poly(meth)acryl, polyester, or polyether and more preferably a graft chain having a polyester or polyether. The graft copolymer preferably contains a repeating unit represented by any one of Formulae (11) to (14).

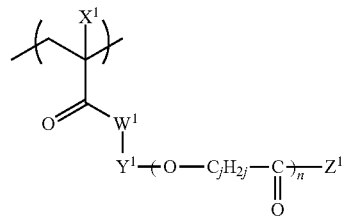

(11)

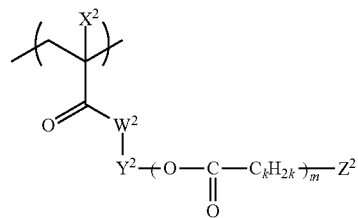

(12)

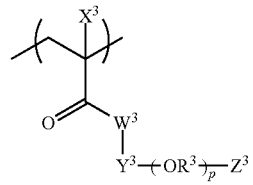

(13)

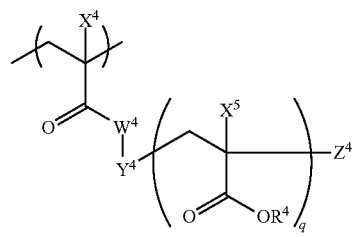

(14)

In Formulae (11) to (14), $W^1$, $W^2$, $W^3$, and $W^4$ each independently represent an oxygen atom or NH, $X^1$, $X^2$, $X^3$, $X^4$, and $X^5$ each independently represent a hydrogen atom or a monovalent group, $Y^1$, $Y^2$, $Y^3$, and $Y^4$ each independently represent a divalent linking group, $Z^1$, $Z^2$, $Z^3$, and $Z^4$ each independently represent a monovalent group, $R^3$ represents an alkylene group, $R^4$ represents a hydrogen atom or a monovalent group, n, m, p, and q each independently represent an integer of 1 to 500, and j and k each independently represent an integer of 2 to 8. In Formula (13), in a case where p is 2 to 500, the plurality of $R^3$'s may be identical to or different from each other, and, in Formula (14), in a case where q is 2 to 500, the plurality of $X^5$'s and $R^4$'s may be identical to or different from each other.

With respect to the graft copolymer, the description of paragraphs 0025 to 0094 of JP2012-255128A is referred to, and the contents thereof are incorporated in the present specification. Specific examples of the graft copolymer include resins disclosed paragraphs 0072 to 0094 of JP2012-255128A, and the contents thereof are incorporated in the present specification.

According to the present invention, an oligoimine-based resin including a nitrogen atom in at least one of the main chain or the side chain can also be used as the resin as a dispersing agent. As the oligoimine-based dispersing agent, a resin having a side chain including a repeating unit having a partial structure X having a functional group having pKa of 14 or less and an oligomer chain or a polymer chain Y having atoms of 40 to 10,000 and having basic nitrogen atoms in at least one of a main chain or a side chain is preferable.

Here, the "basic nitrogen atom" is not particularly limited, as long as the basic nitrogen atom is a basic nitrogen atom, and the resin preferably contains a structure having a nitrogen atom having pKb of 14 or less, and more preferably contains a structure having a nitrogen atom having pKb of 10 or less. "pKb (base strength)" according to the present invention refers to pKb at a water temperature of 25° C. and is one of the indexes for quantitatively expressing the base strength, and the basicity constant is also the same. The base strength pKb and the acid strength pKa have a relationship of pKb=14-pKa.

Examples of the oligoimine-based dispersing agent include a resin including at least one of a repeating unit represented by Formula (I-1), a repeating unit represented by Formula (I-2), or a repeating unit represented by Formula (I-2a) and the like.

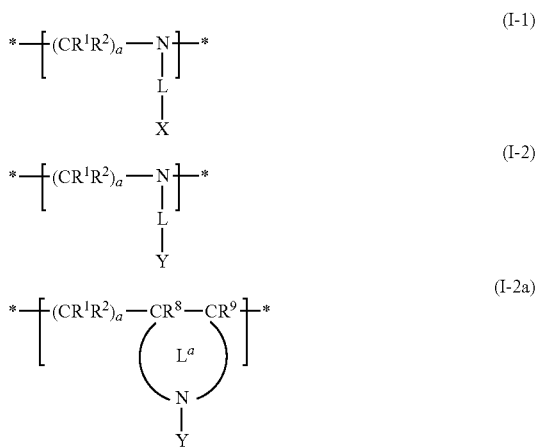

$R^1$, $R^2$, $R^8$, and $R^9$ each independently represent a hydrogen atom, a halogen atom, or an alkyl group (preferably having 1 to 6 carbon atoms).

a's each independently represent an integer of 1 to 5.

\* represents a linking site between repeating units.

L is a single bond, an alkylene group (preferably having 1 to 6 carbon atoms), an alkenylene group (preferably having 2 to 6 carbon atoms), an arylene group (preferably having 6 to 24 carbon atoms), a heteroarylene group (preferably having 1 to 6 carbon atoms), an imino group (preferably having 0 to 6 carbon atoms), an ether group, a thioether group, a carbonyl group, or a linking group relating to a combination thereof. L is preferably a single bond or —$CR^5R^6$—$NR^7$— (the imino group becomes any one of X and Y). Here, $R^5$ and $R^6$ each independently represent a hydrogen atom, a halogen atom, an alkyl group (the number of carbon atoms is preferably 1 to 6), and $R^7$ represents a hydrogen atom or an alkyl group having 1 to 6 carbon atoms.

$L^a$ is a structural moiety that forms a ring structure together with $CR^8CR^9$ and N and is preferably a structural moiety that forms a nonaromatic heterocyclic ring having 3 to 7 carbon atoms together with the carbon atoms of $CR^8CR^9$.

X represents a group having a functional group having pKa of 14 or less.

Y represents an oligomer chain or polymer chain having 40 to 10,000 atoms.

The dispersing agent (oligoimine-based dispersing agent) may further contain one or more kinds selected from the repeating units represented by Formulae (I-3), (I-4), and (I-5), as copolymer components. In a case where the dispersing agent includes the repeating unit, it is possible to further improve the dispersibility of the particles.

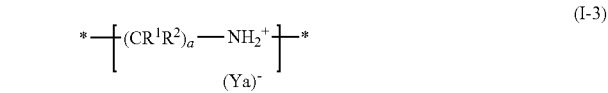

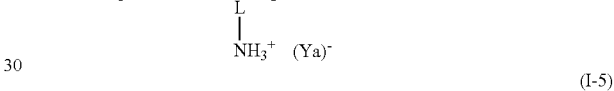

$R^1$, $R^2$, $R^8$, $R^9$, L, $L^a$, a, and \* are the same as $R^1$, $R^2$, $R^8$, $R^9$, L, $L^a$, a, and \* in Formulae (I-1), (I-2), and (I-2a). Ya represents a side chain having an anionic group and having 40 to 10,000 atoms.

With respect to the oligoimine-based dispersing agent, the descriptions of paragraphs 0102 to 0166 of JP2012-255128A can be referred to, and the contents are incorporated in the present specification. Specific examples of the oligoimine-based resin include the following. The resin disclosure of paragraphs 0168 to 0174 of JP2012-255128A can be used.

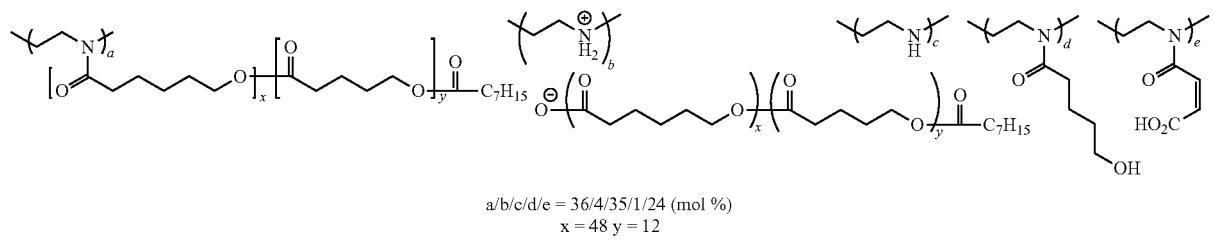

a/b/c/d/e = 36/4/35/1/24 (mol %)
x = 48 y = 12

The dispersing agent can be obtained as a commercially available product, and specific examples thereof include DISPERBYK-111 (manufactured by BYK-Chemie GmbH). The pigment dispersing agent disclosed in paragraphs 0041 to 0130 of JP2014-130338A can be used, and the contents thereof are incorporated in the present specification. The aforementioned resin having an acid group and the like can be used as the dispersing agent.

The resin described in the section of the curable compound of the curable composition described below can be used as the resin.

The content of the resin in the pigment dispersion liquid according to the embodiment of the present invention is preferably 0.1 to 100 parts by mass with respect to 100 parts by mass of the near infrared absorbing organic pigment. The upper limit thereof is more preferably 80 parts by mass or less, even more preferably 60 parts by mass or less, and still even more preferably 40 parts by mass or less. The lower limit is more preferably 0.5 parts by mass or more and even more preferably 1 part by mass or more. In a case where the content of the resin is in the above range, the dispersibility of the near infrared absorbing organic pigment is satisfactory.

<Preparation of Pigment Dispersion Liquid>

The pigment dispersion liquid according to the embodiment of the present invention can be prepared by mixing the respective components. In a case of preparing the pigment dispersion liquid, the respective components constituting the pigment dispersion liquid may be collectively formulated and may be sequentially formulated after the respective components are dissolved or dispersed in an organic solvent. The order of introduction and the working conditions for formulation are not particularly limited. In the step of dispersing the near infrared absorbing organic pigment, examples of the mechanical force used for dispersing the near infrared absorbing organic pigment include compression, squeezing, impact, shearing, and cavitation. Specific examples of the step include a bead mill, a sand mill, a roll mill, a high speed impeller, a sand grinder, a flow jet mixer, high pressure wet atomization, and ultrasonic dispersion. Processes and dispersing machines disclosed in "Complete work on dispersion technology, Johokiko Co., Ltd., Jul. 15, 2005" or "Actual comprehensive data collection on dispersion technology and industrial application centered on suspension (solid/liquid dispersion system), Publishing department of Management Development Center, Oct. 10, 1978", can be appropriately used. In the step of dispersing the near infrared absorbing organic pigment, fine processing of the near infrared absorbing organic pigment by the salt milling process may be performed. For materials, equipment, processing conditions and the like used in the salt milling process, those disclosed in, for example, JP2015-194521A and JP2012-046629A can be used.

In the preparation of the pigment dispersion liquid according to the embodiment of the present invention, it is preferable to include a step (dispersion step) of dispersing the near infrared absorbing organic pigment in the presence of at least the pigment derivative and the solvent (preferably further in the presence of a resin).

In the preparation of the pigment dispersion liquid, it is preferable to filtrate the pigment dispersion liquid with a filter for the purpose of removing foreign matters and reducing defects. The filter can be used without any particular limitation as long as the filter is used in the related art for filtration purposes or the like. Examples thereof include a filter using a material such as a fluororesin such as polytetrafluoroethylene (PTFE), a polyamide-based resin such as nylon (for example, nylon-6 and nylon-6,6), and a polyolefin resin such as polyethylene and polypropylene (PP) (including a polyolefin resin with high density and ultra high molecular weight). Among these materials, polypropylene (including high density polypropylene) and nylon are preferable. The pore diameter of the filter is appropriately about 0.01 to 7.0 preferably about 0.01 to 3.0 µm, and more preferably about 0.05 to 0.5 µm. In a case where the pore diameter of the filter is in the above range, fine foreign matters can be securely removed. It is also preferable to use a fibrous filter medium. Examples of the fibrous filter medium include a polypropylene fiber, a nylon fiber, and a glass fiber. Specific examples thereof include filter cartridges of SBP type series (SBP008 and the like), TPR type series (TPR002, TPR005, and the like), and SHPX type series (SHPX003 and the like) manufactured by Rok Techno Co., Ltd. In a case of using the filter, different filters (for example, the first filter and the second filter) may be combined. At that time, filtration with each filter may be performed only once or may be performed twice or more times. It is also possible to combine filters having different pore diameters within the above range. Here, as the pore diameters, nominal values of the filter manufacturer can be referred to. As commercially available filters, for example, a filter can be selected from various filters provided by Nihon Pall Ltd. (DFA 4201 NXEY, and the like), Advantec Toyo Kaisha, Ltd., Entegris Japan Co., Ltd. (formerly Japan Mykrolis Corporation), or Kitz Micro Filter Corporation. As the second filter, a filter formed of the same material as the first filter described above can be used.

<Curable Composition>

Subsequently, the curable composition according to the embodiment of the present invention is specifically described. The curable composition according to the embodiment of the present invention includes the pigment dispersion liquid according to the embodiment of the present invention and a curable compound.

In the curable composition according to the embodiment of the present invention, the content of the near infrared absorbing organic pigment can be adjusted. The content thereof is preferably 0.01 to 50 mass % with respect to the total solid content of the curable composition. The lower limit is more preferably 0.1 mass % or more and even more preferably 0.5 mass % or more. The upper limit is more preferably 30 mass % or less and even more preferably 15 mass % or less. In a case where the curable composition according to the embodiment of the present invention includes two or more near infrared absorbing organic pigments, the total amount is preferably in the above range.

In the curable composition according to the embodiment of the present invention, a total content of the pigment derivative is preferably 0.1 to 10 mass % in the total solid content of the curable composition. The lower limit is more preferably 0.3 mass % or more and even more preferably 0.5 mass % or more. The upper limit is preferably 5 mass % or less and more preferably 3 mass % or less.

<<Curable Compound>>

The curable composition according to the embodiment of the present invention contains a curable compound. Examples of the curable compound include a crosslinkable compound and a resin. The resin may be a non-crosslinkable resin (a resin not having a crosslinkable group) or a crosslinkable resin (a resin having a crosslinkable group). Examples of the curable group include a group having an ethylenically unsaturated bond, an epoxy group, and an alkoxysilyl group. Examples of the group having an ethylenically unsaturated bond include a vinyl group, a (meth) allyl group, and a (meth)acryloyl group. The crosslinkable resin (a resin having a crosslinkable group) is a crosslinkable compound.

In the curable composition according to the embodiment of the present invention, the content of the curable compound is preferably 1 to 90 mass % with respect to the total solid content of the curable composition. The lower limit thereof is more preferably 5 mass % or more, even more preferably 10 mass % or more, and still even more preferably 20 mass % or more. The upper limit is more preferably 80 mass % or less and even more preferably 75 mass % or less. The curable compound may be used singly or two or more kinds thereof may be used. In a case where two or more kinds are used, it is preferable that the sum thereof is in the above range.

(Crosslinking Compound)

Examples of the crosslinking compound include a compound having a group having an ethylenically unsaturated bond, a compound having an epoxy group, and a compound having an alkoxysilyl group. Examples of the group having an ethylenically unsaturated bond include a vinyl group, a (meth)allyl group, and a (meth)acryloyl group. Examples of the alkoxysilyl group include a monoalkoxysilyl group, a dialkoxysilyl group, a trialkoxysilyl group, and a tetraalkoxysilyl group. The crosslinkable compound may be a monomer or a resin. A monomer-type compound having a group having an ethylenically unsaturated bond can be preferably used as a radical polymerizable compound.

The molecular weight of the monomer-type crosslinkable compound is preferably less than 2,000, more preferably 100 or more and less than 2,000, and even more preferably 200 or more and less than 2,000. The upper limit is preferably 1,500 or less. The weight-average molecular weight (Mw) of the resin-type crosslinkable compound is preferably 2,000 to 2,000,000. The upper limit is preferably 1,000,000 or less and more preferably 500,000 or less. The lower limit is preferably 3,000 or more and more preferably 5,000 or more.

Examples of the resin-type crosslinkable compound include an epoxy resin or a resin including a repeating unit having a crosslinkable group. Examples of the repeating unit having a crosslinkable group include (A2-1) to (A2-4).

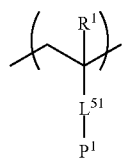
(A2-1)

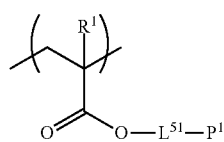
(A2-2)

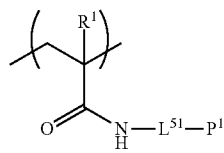
(A2-3)

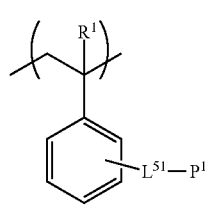
(A2-4)

$R^1$ represents a hydrogen atom or an alkyl group. The number of carbon atoms of the alkyl group is preferably 1 to 5, more preferably 1 to 3, and particularly preferably 1. $R^1$ is preferably a hydrogen atom or a methyl group.

$L^{51}$ represents a single bond or a divalent linking group. Examples of the divalent linking group include an alkylene group, an arylene group, —O—, —S—, —CO—, —COO—, —OCO—, —SO$_2$—, —NR$^{10}$— ($R^{10}$ represents a hydrogen atom or an alkyl group and preferably a hydrogen atom), or a group obtained by combining these, or a group obtained by combining at least one of the alkylene group, the arylene group, or the alkylene group and —O— is preferable. The number of carbon atoms of the alkylene group is preferably 1 to 30, more preferably 1 to 15, and even more preferably 1 to 10. The alkylene group may have a substituent is preferably unsubstituted. The alkylene group may be linear, branched, or cyclic. The cyclic alkylene group may be monocyclic or polycyclic. The number of carbon atoms of the arylene group is preferably 6 to 18, more preferably 6 to 14, and even more preferably 6 to 10.

$P^1$ represents a crosslinking group. Examples of the curable group include a group having an ethylenically unsaturated bond, an epoxy group, and an alkoxysilyl group.

The compound having an ethylenically unsaturated bond is preferably a trifunctional to pentadecafunctional (meth)acrylate compound and more preferably a trifunctional to hexafunctional (meth)acrylate compound. As an example of the compound having an ethylenically unsaturated bond, the description disclosed in paragraphs 0033 to 0034 of JP2013-253224A can be referred to, and the contents thereof are incorporated in the present specification. Specific examples thereof preferably include ethyleneoxy-modified pentaerythritol tetraacrylate (as a commercially available product, NK Ester ATM-35E; Shin-Nakamura Chemical Co., Ltd.), dipentaerythritol triacrylate (as a commercially available product, KAYARAD D-330; manufactured by Nippon Kayaku Co., Ltd.), dipentaerythritol tetraacrylate (as a commercially available product, KAYARAD D-320; manufactured by Nippon Kayaku Co., Ltd.), dipentaerythritol penta(meth)acrylate (as a commercially available product, KAYARAD D-310; manufactured by Nippon Kayaku Co., Ltd.), dipentaerythritol hexa(meth)acrylate (as a commercially available product, KAYARAD DPHA; manufactured by Nippon Kayaku Co., Ltd. and A-DPH-12E; manufactured by Shin-Nakamura Chemical Co., Ltd.), and a structure in which these (meth)acryloyl groups are bonded to each other via an ethylene glycol, propylene glycol residues. Oligomer types thereof may be used. Disclosures in paragraphs 0034 to 0038 of JP2013-253224A and paragraph 0477 (paragraph 0585 of US2012/0235099A) of JP2012-208494A can be referred to, and the content thereof is incorporated in the present specification. As specific examples of the compound having an ethylenically unsaturated bond, diglycerol ethylene oxide (EO)-modified (meth)acrylate (as a commercially available product, M-460; manufactured by Toagosei Co., Ltd.), pentaerythritol tetraacrylate (manufactured by Shin-Nakamura Chemical Co., Ltd., A-TMMT), and 1,6-hexanediol diacrylate (manufactured by Nippon Kayaku Co., Ltd., KAYARAD HDDA) can be used. Oligomer types thereof may be used. Examples thereof include RP-1040 (manufactured by Nippon Kayaku Co., Ltd.).

The compound having an ethylenically unsaturated bond may also have an acid group such as a carboxyl group, a sulfo group, and a phosphoric acid group. Examples of commercially available products include ARONIX series manufactured by Toagosei Co., Ltd. (for example, M-305, M-510, and M-520).

A compound having a caprolactone structure is also a preferable aspect of the compound including a group having an ethylenically unsaturated bond. As the compound having a caprolactone structure, the description disclosed in paragraphs 0042 to 0045 of JP2013-253224A can be referred to, and the contents thereof are incorporated in the present specification. Examples of the commercially available products of the polymerizable compounds include SR-494 which is tetrafunctional acrylate having four ethyleneoxy chains manufactured by Sartomer, DPCA-60 which is a hexafunctional acrylate having six pentyleneoxy chains manufactured by Nippon Kayaku Co., Ltd., and TPA-330 which is a trifunctional acrylate having three isobutylene oxy chains.

In a case where the present invention contains a compound including a group having an ethylenically unsaturated bond, the content of the compound including a group having an ethylenically unsaturated bond is preferably 0.1 mass % or more, more preferably 0.5 mass % or more, even more preferably 3 mass % or more, and particularly preferably 10 mass % or more with respect to the total solid content of the curable composition. The upper limit is preferably 95 mass % or less, more preferably 80 mass % or less, and even more preferably 70 mass % or less.

Examples of the compound having an epoxy group include a monofunctional or polyfunctional glycidyl ether compound and a polyfunctional aliphatic glycidyl ether compound. As the compound having an epoxy group, a compound having an alicyclic epoxy group can be used.

Examples of the compound having an epoxy group include a compound having one or more epoxy groups in one molecule. It is preferable that the epoxy group has 1 to 100 epoxy groups in one molecule. For example, the upper limit can be 10 or less and can be 5 or less. The lower limit is preferably 2 or more.

The compound having an epoxy group may be a low molecule compound (for example, having molecular weight of less than 1,000) or may be a polymer compound (macromolecule) (for example, having a molecular weight of 1,000 or more, in a case of a polymer, having a weight-average molecular weight of 1,000 or more). The weight-average molecular weight of the compound having an epoxy group is preferably 2,000 to 100,000. The upper limit of the weight-average molecular weight is preferably 10,000 or less, more preferably 5,000 or less, and even more preferably 3,000 or less. The epoxy compound is preferably an aliphatic epoxy resin in view of the solvent resistance.

The compound having an epoxy group is preferably a compound having an aromatic ring and/or an aliphatic ring, and more preferably a compound having an aliphatic ring. It is preferable that the epoxy group is bonded to the aromatic ring and/or the aliphatic ring via a single bond or a linking group. Examples of the linking group include an alkylene group, an arylene group, —O—, —NR'— (R' represents a hydrogen atom, an alkyl group, or an aryl group, and a hydrogen atom is preferable), —SO$_2$, CO, —O—, —S—, and a group obtained by combining these. The compound having an epoxy group is more preferably a compound obtained by directly bonding (single bond) an epoxy group to an aliphatic group.

Examples of the commercially available products of the compound having an epoxy group include EHPE3150 (Daicel Corporation), EPICLON N-695 (DIC Corporation), MARPROOF G-0150M, G-0105SA, G-0130SP, G-0250SP, G-1005S, G-1005SA, G-1010S, G-2050M, G-01100, and G-01758 (manufactured by NOF Corporation, epoxy group-containing polymer). As the compound having an epoxy group, compounds disclosed in paragraphs 0034 to 0036 of JP2013-011869A, paragraphs 0147 to 0156 of JP2014-043556A, and paragraphs 0085 to 0092 of JP2014-089408A can be used. The contents thereof are incorporated in the present specification.

In a case where the present invention contains a compound having an epoxy group, the content of the compound having an epoxy group is preferably 0.1 mass % or more, more preferably 0.5 mass % or more, even more preferably 1 mass % or more, and particularly preferably 2 mass % or more with respect to the total solid content of the curable composition. The upper limit is preferably 40 mass % or less, more preferably 30 mass % or less, and even more preferably 20 mass % or less.

Examples of the compound having an alkoxysilyl group include tetraethoxysilane. Examples thereof include compounds disclosed in paragraph 0044 of JP2014-203044A and compounds disclosed in paragraphs 0044 to 0047 JP2015-125710A, and the content thereof is incorporated in the present specification.

(Resin)

The curable composition according to the embodiment of the present invention can contain a resin as a curable compound. The curable compound according to the embodiment of the present invention preferably at least includes a resin.

The weight-average molecular weight (Mw) of the resin is preferably 2,000 to 2,000,000. The upper limit is preferably 1,000,000 or less and more preferably 500,000 or less. The lower limit is preferably 3,000 or more and more preferably 5,000 or more.

Examples of the resin include a (meth)acrylic resin, an epoxy resin, an enethiol resin, a polycarbonate resin, a polyether resin, a polyarylate resin, a polysulfone resin, a polyethersulfone resin, a polyphenylene resin, a polyarylene ether phosphine oxide resin, a polyimide resin, a polyamide imide resin, a polyolefin resin, a cyclic olefin resin, a polyester resin, and a styrene resin. These resins may be used singly or two or more kinds thereof may be used in a mixture. In view of improving heat resistance, a norbornene resin can be preferably used as the cyclic olefin resin. Examples of a commercially available product of the norbornene resin include ARTON series (for example, ARTON F 4520) manufactured by JSR Corporation. As the epoxy resin, compounds exemplified as the compound having an epoxy group can be used. For example, MARPROOF G-0150M, G-0105SA, G-0130SP, G-0250SP, G-1005S, G-1005SA, G-1010S, G-2050M, G-01100, and G-01758 (manufactured by NOF Corporation, epoxy group-containing polymer) are can be used. As the resin, the resins described in the pigment dispersion liquid can be used. As the resin, resins disclosed in the examples of WO2016/088645A can be used.

The resin used in the present invention may have an acid group. Examples of the acid group include a carboxyl group, a phosphoric acid group, a sulfo group, and a phenolic hydroxy group. These acid groups may be used singly or two or more kinds thereof may be used in combination. The resin having an acid group can be preferably used as an alkali-soluble resin. In a case where the curable composition according to the embodiment of the present invention contains an alkali-soluble resin, a desired pattern can be used by alkali development.

The resin having an acid group is preferably a polymer having a carboxyl group at a side chain. Specific examples thereof include an alkali-soluble phenolic resin as a methacrylic acid copolymer, an acrylic acid copolymer, an itaconic acid copolymer, a crotonic acid copolymer, a maleic acid copolymer, a partially esterified maleic acid copolymer, and a novolak resin, an acidic cellulose derivative having a carboxyl group in a side chain, and a resin obtained by adding an acid anhydride to a polymer having a hydroxy group. Particularly, a copolymer of (meth)acrylic acid and another monomer copolymerizable with this is preferable as an alkali-soluble resin. Examples of the other monomer copolymerizable with (meth)acrylic acid include alkyl (meth)acrylate, aryl (meth)acrylate, and a vinyl compound. Examples of the alkyl (meth)acrylate and the aryl (meth) acrylate include methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, phenyl (meth)acrylate, benzyl (meth) acrylate, tolyl (meth)acrylate, naphthyl (meth)acrylate, and cyclohexyl (meth)acrylate, and examples of the vinyl compound include styrene, α-methylstyrene, vinyl toluene, glycidyl methacrylate, acrylonitrile, vinyl acetate, N-vinyl pyrrolidone, tetrahydrofurfuryl methacrylate, a polystyrene macromonomer, and a polymethyl methacrylate macromonomer. As other monomers, an N-substituted maleimide monomer disclosed in JP1998-300922A (JP-H10-300922A), for example, N-phenylmaleimide, N-cyclohexylmaleimide, and the like, can also be used. These monomers copolymerizable with (meth)acrylic acid may be used singly or two or more kinds thereof may be used in combination. Specific examples of the resin having an acid group include a resin having the following structure.

The resin having an acid group may further contain a repeating unit having a crosslinkable group. In a case where the resin having an acid group further contains the repeating unit having a crosslinkable group, the content of the repeating unit having a crosslinkable group in the total repeating units is preferably 10 to 90 mol %, more preferably 20 to 90 mol %, and even more preferably 20 to 85 mol %. The content of the repeating unit having an acid group in the total repeating units is preferably 1 to 50 mol %, more preferably 5 to 40 mol %, and even more preferably 5 to 30 mol %. Specific examples thereof include the following resin.

copolymerizing 2-hydroxyethyl (meth)acrylate and disclosed in JP1995-140654A (JP-H7-140654A) can be preferably used.

It is also preferable that the resin having an acid group includes a polymer obtained by polymerizing a monomer component including a compound represented by Formula (ED1) and/or a compound represented by Formula (ED2) (hereinafter, also referred to as an "ether dimer").

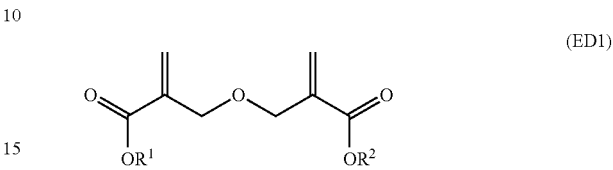

(ED1)

In Formula (ED1), $R^1$ and $R^2$ each independently represent a hydrogen atom or a hydrocarbon group having 1 to 25 carbon atoms which may have a substituent.

(ED2)

In Formula (ED2), R represents a hydrogen atom or an organic group having 1 to 30 carbon atoms. As a specific example of Formula (ED2), the description of JP2010-168539A can be referred to.

As a specific example of the ether dimer, for example, paragraph 0317 of JP2013-029760A can be referred to, and the content thereof is incorporated in the present specification. The ether dimer may be used singly or two or more kinds thereof may be used in combination.

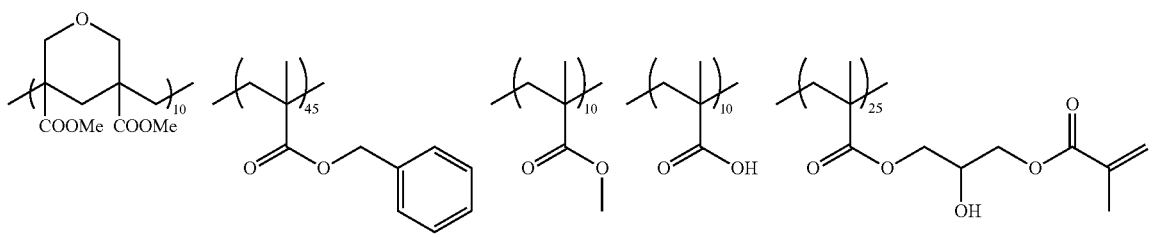

The resin having an acid group, a benzyl (meth)acrylate/ (meth)acrylic acid copolymer, a benzyl (meth)acrylate/ (meth) acrylic acid/2-hydroxyethyl (meth)acrylate copolymer, and a multi-copolymer consisting of a benzyl (meth) acrylate/(meth)acrylic acid/other monomer can also be preferably used. A 2-hydroxypropyl (meth) acrylate/polystyrene macromonomer/benzyl methacrylate/methacrylic acid copolymer, a 2-hydroxy-3-phenoxypropyl acrylate/ polymethyl methacrylate macromonomer/benzyl methacrylate/methacrylic acid copolymer, a 2-hydroxyethyl methacrylate/polystyrene macromonomer/methyl methacrylate/ methacrylic acid copolymer, and a 2-hydroxyethyl methacrylate/polystyrene macromonomer/benzyl methacrylate/methacrylic acid copolymer which are obtained by The resin having an acid group may include a repeating unit derived from a compound represented by Formula (X).

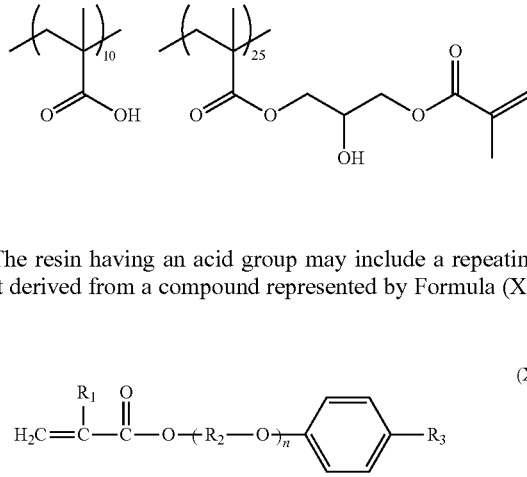

(X)

In Formula (X), $R_1$ represents a hydrogen atom or a methyl group, $R_2$ represents an alkylene group having 2 to 10 carbon atoms, and $R_3$ represents a hydrogen atom or an alkyl group having 1 to 20 carbon atoms which may contain a benzene ring. n represents an integer of 1 to 15.

As the resin having an acid group, the description of paragraphs 0558 to 0571 (corresponding to paragraph 0685 to 0700 of US2012/0235099A) of JP2012-208494A and the description in paragraphs 0076 to 0099 of 2012-198408 can be referred to, and the contents thereof are incorporated in the present specification. As the resin having an acid group, a commercially available product can also be used.

The acid value of the resin having an acid group is preferably 30 to 500 mg KOH/g. The lower limit is more preferably 50 mgKOH/g or more and even more preferably 70 mgKOH/g or more. The upper limit is more preferably 400 mgKOH/g or less, even more preferably 200 mgKOH/g or less, particularly preferably 150 mgKOH/g or less, and even more preferably 120 mgKOH/g or less.

In the curable composition according to the embodiment of the present invention, the content of the resin is preferably 0.1 mass % or more, more preferably 1 mass % or more, even more preferably 10 mass % or more, and particularly preferably 20 mass % or more with respect to the total solid content of the curable composition. The upper limit is preferably 90 mass % or less, more preferably 70 mass % or less, and even more preferably 50 mass % or less.

In a case where the curable composition according to the embodiment of the present invention includes a resin having an acid group, the content of the resin having an acid group is preferably 0.1 mass % or more, more preferably 1 mass % or more, even more preferably 10 mass % or more, and particularly preferably 20 mass % or more with respect to the total solid content of the curable composition. The upper limit is preferably 90 mass % or less, more preferably 70 mass % or less, and even more preferably 50 mass % or less.

In a case where the curable composition according to the embodiment of the present invention includes a monomer-type compound having a group having an ethylenically unsaturated bond and a resin, a mass ratio of a monomer-type compound and a resin having a group having an ethylenically unsaturated bond is preferably a ratio of the monomer-type compound and the resin having a group having an ethylenically unsaturated bond to the resin of 0.3 to 0.7. The lower limit having a mass ratio is more preferably 0.35 or more and even more preferably 0.4 or more. The upper limit of the mass ratio is more preferably 0.65 or less and even more preferably 0.6 or less. In a case where the mass ratio is in the above range, a pattern having excellent rectangularity can be formed.

The mass ratio of a monomer-type compound having a group having an ethylenically unsaturated bond and a resin having an acid group is preferably a ratio of the monomer-type compound having the group having an ethylenically unsaturated bond to the resin having an acid group of 0.3 to 0.7. The lower limit having a mass ratio is more preferably 0.35 or more and even more preferably 0.4 or more. The upper limit of the mass ratio is more preferably 0.65 or less and even more preferably 0.6 or less. In a case where the mass ratio is in the above range, a pattern having excellent rectangularity can be formed.

<<Photopolymerization Initiator>>

The curable composition according to the embodiment of the present invention preferably contains a photopolymerization initiator. The photopolymerization initiator is not particularly limited, and the photopolymerization initiator can be selected from well-known photopolymerization initiators. For example, a photopolymerization initiator having photosensitivity to light from the ultraviolet region to the visible region is preferable. The photopolymerization initiator is preferably a photo radical polymerization initiator. The photopolymerization initiator preferably contains at least one compound having a molar light absorption coefficient of at least about 50 in the range of about 300 nm to 800 nm (330 nm to 500 nm).

Examples of the photopolymerization initiator include a halogenated hydrocarbon derivative (for example, a derivative having a triazine skeleton or a derivative having an oxadiazole skeleton), an acylphosphine compound such as acylphosphine oxide, an oxime derivative such as hexaaryl-biimidazole, an oxime compound, organic peroxide, a thio compound, a ketone compound, aromatic onium salt, keto oxime ether, an aminoacetophenone compound, and hydroxyacetophenone. In view of exposure sensitivity, the photopolymerization initiator is preferably a compound selected from the group consisting of a trihalomethyl triazine compound, a benzyl dimethyl ketal compound, an α-hydroxy ketone compound, an α-aminoketone compound, an acylphosphine compound, a phosphine oxide compound, a metallocene compound, an oxime compound, a triaryl imidazole dimer, an onium compound, a benzothiazole compound, a benzophenone compound, an acetophenone compound, a cyclopentadiene-benzene-iron complex, a halomethyl oxadiazole compound, and a 3-aryl substituted coumarin compound, is more preferably an compound selected from an oxime compound, an α-hydroxy ketone compound, an α-aminoketone compound, and an acylphosphine compound, is even more preferably an oxime compound. As the photopolymerization initiator, the disclosure in paragraphs 0065 to 0111 of JP2014-130173A can be referred to, and the content thereof is incorporated in the present specification.

Specific examples of the α-aminoketone compound include 2-methyl-1-phenyl-2-morpholinopropane-1-one, 2-methyl-1-[4-(hexyl)phenyl]-2-morpholinopropane-1-one, 2-ethyl-2-dimethyl amino-1-(4-morpholinophenyl)-butanone-1, 2-benzyl-2-dimethylamino-1-(4-morpholinophenyl)-butanone-1, and 2-(dimethylamino)-2-[(4-methylphenyl)methyl]-1-[4-(4-morpholinyl)phenyl]-1-butanone.

Examples of the commercially available products of the α-aminoketone compound include IRGACURE 907, IRGACURE 369, and IRGACURE 379 (product name: all are manufactured by BASF SE).

Examples of the commercially available products of the α-hydroxyketone compound include IRGACURE 184, DAROCUR 1173, IRGACURE 500, IRGACURE 2959, and IRGACURE 127 (above are manufactured by BASF SE).

Examples of the commercially available products of the acylphosphine compound include IRGACURE 819 and IRGACURE TPO (above are manufactured by BASF SE).

As the oxime compound, compounds disclosed in JP2001-233842A, compounds disclosed in JP2000-080068A, compounds disclosed in JP2006-342166A, and compounds disclosed in JP2016-021012A can be used.

According to the present invention, examples of the oxime compound that can be preferably used include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropane-1-one, 2-benzoyloxyimino-1-phenylpropan-1-one, 3-(4-toluenesulfonyloxy)iminobutan-2-one, and 2-ethoxycarbonyloxyimino-1-phenylpropan-1-one. Examples thereof also include compounds disclosed in J. C. S. Perkin II (1979) pp. 1653 to 1660, J. C. S. Perkin II (1979) pp. 156 to 162, and Journal of Photopolymer Science and Technology (1995) pp. 202 to 232 and compounds disclosed in JP2000-066385A, JP2000-080068A, JP2004-534797A, and JP2006-342166A. Examples of the commercially available products thereof include IRGACURE OXE01, IRGACURE OXE02, IRGA- CURE-OXE03, IRGACURE-OXE04 (above are manufactured by BASF SE), TR-PBG-304 (manufactured by Changzhou Tronly New Electronic Material Co., Ltd.), and ADEKA ARKLES NCI-930 (manufactured by ADEKA Corporation).

According to the present invention, as the photopolymerization initiator, an oxime compound having a fluorene ring can also be used. Specific examples of the oxime compound having a fluorene ring include compounds disclosed in JP2014-137466A. The contents thereof are incorporated in the present specification.

According to the present invention, as the photopolymerization initiator, an oxime compound having a fluorine atom can also be used. Specific examples of the oxime compound having a fluorine atom include compounds disclosed in JP2010-262028A, compounds 24 and 36 to 40 disclosed in JP2014-500852A, and Compound (C-3) of JP2013-164471A. The contents thereof are incorporated in the present specification.

According to the present invention, as the photopolymerization initiator, an oxime compound having a nitro group can be used. The oxime compound having a nitro group is also preferably a dimer. Specific examples of the oxime compound having a nitro group include compounds disclosed in paragraphs 0031 to 0047 JP2013-114249A and paragraphs 0008 to 0012 and 0070 to 0079 of JP2014-137466A, compounds disclosed in paragraphs 0007 to 0025 JP4223071B, and ADEKA ARKLES NCI-831 (manufactured by ADEKA Corporation).

Specific examples of the oxime compound that is preferably used in the present invention are provided below, and the present invention is not particularly limited.

(C-1)

(C-2)

(C-3)

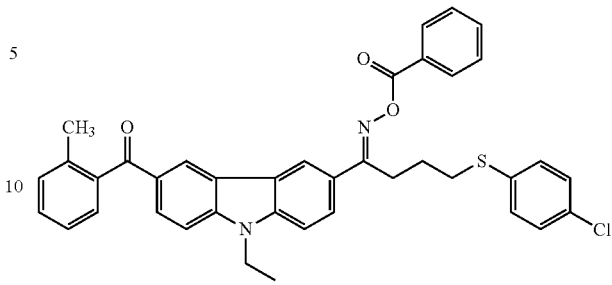
(C-4)

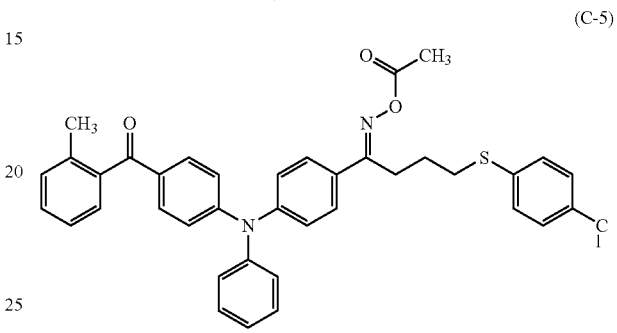
(C-5)

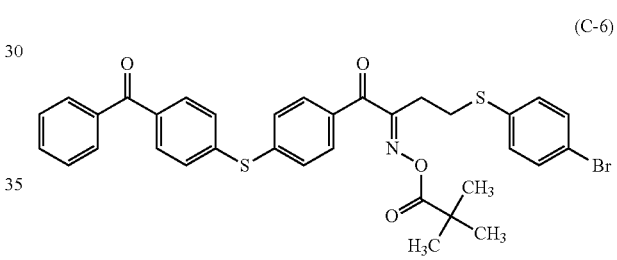
(C-6)

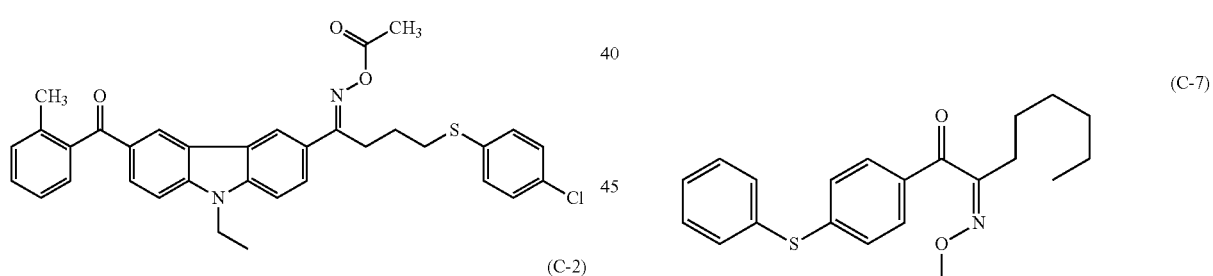
(C-7)

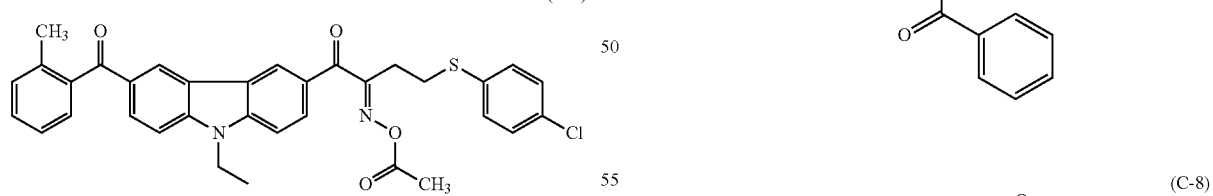
(C-8)

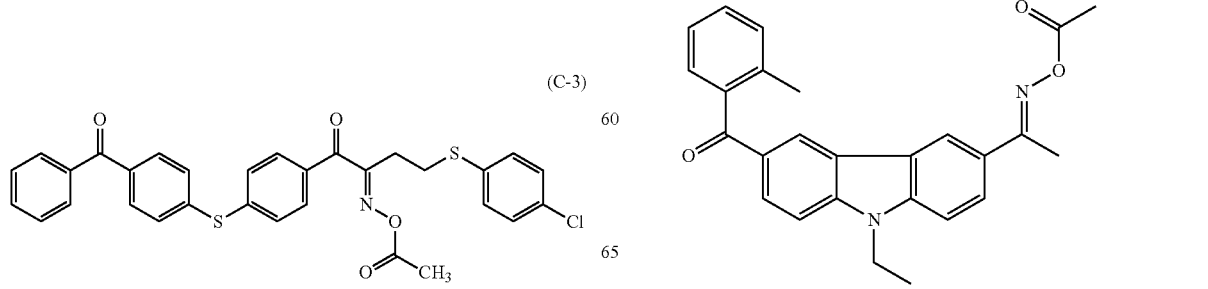

(C-9)
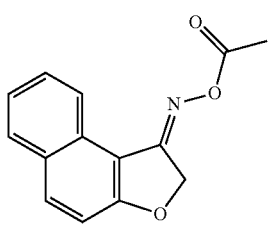

(C-10)
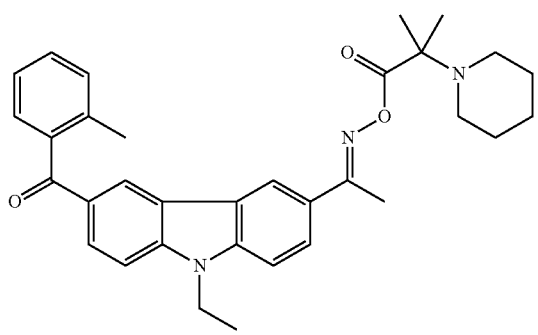

(C-11)
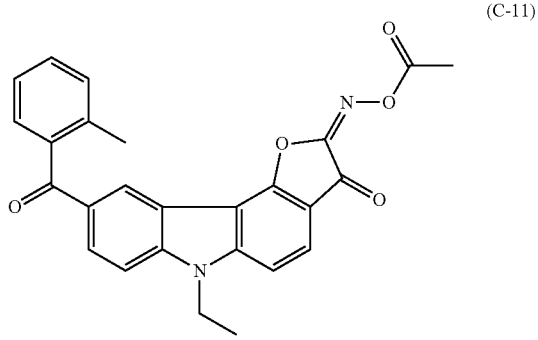

(C-12)
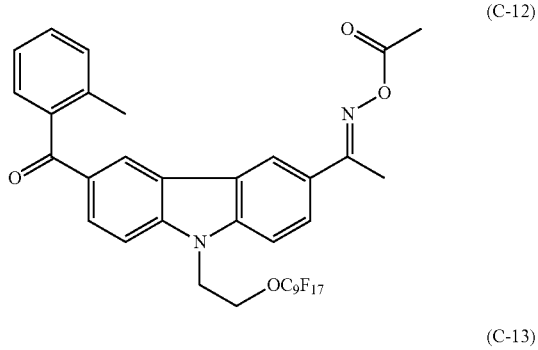

(C-13)
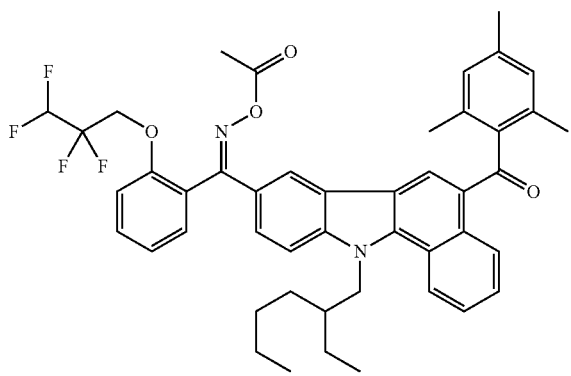

(C-14)
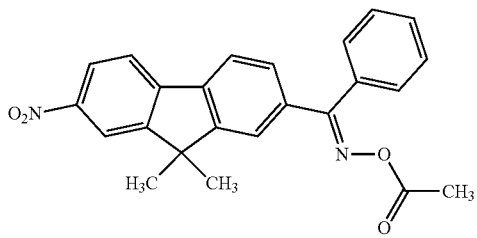

The oxime compound is preferably a compound having an maximum absorption in a wavelength range of 350 nm to 500 nm and more preferably a compound having an maximum absorption in a wavelength range of 360 nm to 480 nm. The oxime compound is preferably a compound having a high absorbance at 365 nm and 405 nm.

In view of sensitivity, with respect to the oxime compound, a molar light absorption coefficient at 365 nm or 405 nm is preferably 1,000 to 300,000, more preferably 2,000 to 300,000, and particularly preferably 5,000 to 200,000.

The molar light absorption coefficient of the compound can be measured using a well-known method. For example, it is preferable to measure the molar light absorption coefficient with an ultraviolet-visible spectrophotometer (Cary-5 spectrophotometer manufactured by Varian, Inc.) by using an ethyl acetate solvent at a concentration of 0.01 g/L.

The photopolymerization initiator preferably includes an oxime compound and an α-aminoketone compound. By using the both in combination, developability is improved and a pattern having excellent rectangularity is easily formed. In a case where the oxime compound and the α-aminoketone compound are used in combination, the content of the α-aminoketone compound is preferably 50 to 600 parts by mass and more preferably 150 to 400 parts by mass with respect to 100 parts by mass of the oxime compound.

The content of the photopolymerization initiator is preferably 0.1 to 50 mass %, more preferably 0.5 to 30 mass %, and even more preferably 1 to 20 mass % with respect to the total solid content of the curable composition according to the embodiment of the present invention. In a case where the content of the photopolymerization initiator is within the above range, it is possible to obtain satisfactory sensitivity and excellent pattern formability. The curable composition according to the embodiment of the present invention may include the photopolymerization initiator singly or may include two or more kinds thereof. In a case where two or more kinds thereof are contained, the total amount thereof is preferably in the above range.

<<Chromatic Colorant>>

The curable composition according to the embodiment of the present invention can preferably contain a chromatic colorant. According to the present invention, the chromatic colorant means a colorant other than the white colorant and the black colorant. The chromatic colorant may be a pigment or a dye. The pigment is preferably an organic pigment, and examples thereof include the followings.

Color Index (C. I.) Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214, and the like (above are yellow pigments), C. I. Pigment Orange 2, 5, 13, 16, 17:1, 31, 34, 36, 38, 43, 46, 48, 49, 51, 52, 55, 59, 60, 61, 62, 64, 71, 73, and the like (above are orange pigments), C. I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, 279, and the like (above are red pigments), C. I. Pigment Green 7, 10, 36, 37, 58, 59, and the like (above are green pigments), C. I. Pigment Violet 1, 19, 23, 27, 32, 37, 42, and the like (above are violet pigments), C. I. Pigment Blue 1, 2, 15, 15:1, 15:2, 15:3, 15:4, 15:6, 16, 22, 60, 64, 66, 79, 80, and the like (above are blue pigments), and these organic pigments can be used alone or in various combinations.

The dye is not particularly limited, and well-known dyes can be used. Examples thereof include pyrazole azo-based, anilinoazo-based, triarylmethane-based, anthraquinone-based, anthrapyridone-based, benzylidene-based, oxonol-based, pyrazolotriazole azo-based, pyridoneazo-based, cyanine-based, squarylium-based, phenothiazine-based, pyrrolopyrazole azomethine-based, xanthene-based, phthalocyanine-based, benzopyran-based, indigo-based, and pyrromethene-based dyes. Multimers of these dyes may also be used. Dyes disclosed in JP2015-028144A and JP2015-034966A can also be used.

In a case where the curable composition according to the embodiment of the present invention contains a chromatic colorant, the content of the chromatic colorant is preferably 30 mass % or less, more preferably 20 mass % or less, and even more preferably 15 mass % or less with respect to the total solid content of the curable composition. For example, the lower limit can be 0.01 mass % or more and can be 0.5 mass % or more.

The curable composition according to the embodiment of the present invention can be an aspect of substantially not containing a chromatic colorant. In a case where the chromatic colorant is not substantially contained, the content of the chromatic colorant is preferably 0.005 mass % or less and more preferably 0.001 mass % or less with respect to the total solid content of the curable composition according to the embodiment of the present invention, and it is even more preferable that the chromatic colorant is not contained.

<<Coloring Material that Transmits at Least a Portion of Light in Near Infrared Region and Shields Light in Visible Region (Coloring Material that Shields Visible Light)>>

The curable composition according to the embodiment of the present invention can contain a coloring material (hereinafter, referred to as a coloring material that shields visible light) that transmits at least a portion of the light in a near infrared region and shields light in a visible region. In a case where the curable composition according to the embodiment of the present invention contains a coloring material that shields visible light, the content of the pigment is preferably 90 mass % or more, more preferably 95 mass % or more, and even more preferably 99 mass % or more with respect to the total mass of the coloring material that shields the visible light. The coloring material that shields visible light preferably exhibits black, gray, or a color similar to these, by a combination of a plurality of coloring materials. The coloring material that shields the visible light is preferably a material that absorbs light in the violet to red wavelength range. The coloring material that shields visible light is preferably a coloring material that shields light in the wavelength range of 400 to 700 nm.

The coloring material that shields the visible light preferably satisfies at least one requirement of (1) or (2) and more preferably satisfies the requirement of (1).

(1): Form of including two or more kinds of chromatic colorants, and
(2): Form of including organic black colorant.

In a case where the curable composition according to the embodiment of the present invention contains a coloring material that shields visible light, the content of the coloring material that shields visible light is preferably 30 mass % or less, more preferably 20 mass % or less, and even more preferably 15 mass % or less with respect to the total solid content of the curable composition. For example, the lower limit can be 0.01 mass % or more and can be 0.5 mass % or more.

The curable composition according to the embodiment of the present invention can be an aspect of substantially not containing the coloring material that shields visible light. In a case where the coloring material that shields visible light is not substantially contained, the content of the coloring material that shields visible light is preferably 0.005 mass % or less, more preferably 0.001 mass % or less with respect to the total solid content of the curable composition according to the embodiment of the present invention, and it is even more preferable that the coloring material that shields visible light is not contained.

<<Other Near Infrared Absorbing Agents>>

The curable composition according to the embodiment of the present invention may further include near infrared absorbing agents (other near infrared absorbing agents) other than the near infrared absorbing pigment. Examples of the other near infrared absorbing agents include near infrared absorbing dyes. Examples of the near infrared absorbing dye include a phthalocyanine compound, a naphthalocyanine compound, a rylene compound, a merocyanine compound, a croconium compound, an oxonol compound, a diiminium compound, a dithiol compound, a triarylmethane compound, a pyrromethene compound, an azomethine compound, an anthraquinone compound, and a dibenzofuranone compound. As the other near infrared absorbing agent, an inorganic pigment can also be used. As the inorganic pigment, metal oxide particles or metal particles are preferable. Examples of the metal oxide particles include indium tin oxide (ITO) particles, antimony tin oxide (ATO) particles, zinc oxide (ZnO) particles, A1-doped zinc oxide (A1-doped ZnO) particles, fluorine-doped tin dioxide (F-doped $SnO_2$) particles, niobium-doped titanium dioxide (Nb-doped $TiO_2$) particles. Examples of the metal particles include silver (Ag) particles, gold (Au) particles, copper (Cu) particles, and nickel (Ni) particles. As the inorganic particles, a tungsten oxide-based compound can also be used. As the tungsten oxide-based compound, cesium tungsten oxide is preferable. With respect to the details of the tungsten oxide-based compound, paragraph 0080 of JP2016-006476A can be referred to, and the contents thereof are incorporated in the present specification. The shape of the inorganic particle is not particularly limited, and may be a sheet shape, a wire shape, or a tube shape regardless of a spherical shape or a non-spherical shape.

In a case where the curable composition according to the embodiment of the present invention contains other near infrared absorbing agents, the content of the near infrared absorbing agent is preferably 30 mass % or less, more preferably 20 mass % or less, and even more preferably 15 mass % or less with respect to the total solid content of the curable composition. For example, the lower limit can be 0.01 mass % or more and can be 0.5 mass % or more.

<<Silane Coupling Agent>>

The curable composition according to the embodiment of the present invention can contain a silane coupling agent. According to the present invention, the silane coupling agent means a silane compound having a hydrolyzable group and other functional groups. The hydrolyzable group refers to a substituent which is directly connected to a silicon atom and can generate a siloxane bond by at least any one of hydrolysis reaction or condensation reaction. Examples of the hydrolyzable group include a halogen atom, an alkoxy group, and an acyloxy group, and an alkoxy group is preferable. That is, the silane coupling agent is preferably a compound having an alkoxysilyl group. The functional group other than the hydrolyzable group is preferably a group exhibiting affinity by using interaction between resins or forming a bond with the resin and the like. Examples thereof include a vinyl group, a styrene group, a (meth) acryloyl group, a mercapto group, an epoxy group, an oxetanyl group, an amino group, a ureido group, a sulfide group, and an isocyanate group, and a (meth)acryloyl group and an epoxy group are preferable. Examples of the silane coupling agent include compounds disclosed in paragraphs 0018 to 0036 of JP2009-288703A, compounds disclosed in paragraphs 0056 to 0066 of JP2009-242604A, and compounds disclosed in paragraphs 0229 to 0236 of WO2015/166779A, and the contents thereof are incorporated in the present specification.

The content of the silane coupling agent is preferably 0.01 to 15.0 mass % and more preferably 0.05 to 10.0 mass % with respect to the total solid content of the curable composition. The silane coupling agent may be used singly or two or more kinds thereof may be used. In a case where two or more kinds thereof are used, it is preferable that the total amount is in the above range.

<<Surfactant>>

In view of further improving coatability, the curable composition according to the embodiment of the present invention may contain various surfactants. As the surfactant, various kinds of surfactants such as a fluorine-based surfactant, a nonionic surfactant, a cationic surfactant, an anionic surfactant, and a silicone-based surfactant may be used. With respect to the surfactants, paragraphs 0238 to 0245 of WO2015/166779A can be referred to, and the contents thereof are incorporated in the present specification.

Particularly, by causing the curable composition according to the embodiment of the present invention to contain a fluorine-based surfactant, the liquid properties (particularly, fluidity) in a case of being prepared as a coating liquid are further improved and uniformity after coating or liquid saving performance can be further improved. It is possible to more suitably form an even thickness film having small thickness unevenness.

The fluorine content of the fluorine-based surfactant is appropriately 3 to 40 mass %, more preferably 5 to 30 mass %, and particularly preferably 7 to 25 mass %. The fluorine-based surfactant in a case where the fluorine content is in this range is effective in view of the uniformity of the thickness of the coating film and liquid saving performance, and has favorable solubility in the composition.

Specific examples of the fluorine-based surfactant include surfactants disclosed in paragraphs 0060 to 0064 (paragraphs 0060 to 0064 of WO2014/017669A) of JP2014-041318A and surfactants disclosed in paragraphs 0117 to 0132 of JP2011-132503A, and the contents thereof are incorporated in the present specification. Examples of the commercially available products of the fluorine-based surfactant include MEGAFACE F171, F172, F173, F176, F177, F141, F142, F143, F144, R30, F437, F475, F479, F482, F554, and F780 (above, manufactured by DIC Corporation), FLUORAD FC430, FC431, and FC171 (above, manufactured by Sumitomo 3M Limited), SURFLON S-382, SC-101, SC-103, SC-104, SC-105, SC-1068, SC-381, SC-383, SC-393, and KH-40 (above, manufactured by Asahi Glass Co., Ltd.), and PolyFox PF636, PF656, PF6320, PF6520, and PF7002 (above are manufactured by OMNOVA Solutions Inc.).

The fluorine-based surfactant has a molecular structure having a functional group containing a fluorine atom, and an acrylic compound in which a portion of a functional group containing a fluorine atom is broken in a case where heat is applied and the fluorine atom volatilizes can also be suitably used. Examples of the fluorine-based surfactant include MEGAFACE DS series (The Chemical Daily Co., Ltd., Feb. 22, 2016) (Nikkei Inc., Feb. 23, 2016), manufactured by DIC Corporation, and MEGAFACE DS-21.

As the fluorine-based surfactant, a block polymer can also be used. Examples thereof include compounds disclosed in JP2011-089090A. As the fluorine-based surfactant, a fluorine-containing polymer compound including a repeating unit derived from a (meth)acrylate compound having a fluorine atom and a repeating unit derived from a (meth) acrylate compound having two or more (preferably five or more) alkyleneoxy groups (preferably ethyleneoxy group and propyleneoxy group) can also be preferably used. The following compounds are also exemplified as the fluorine-based surfactant used in the present invention.

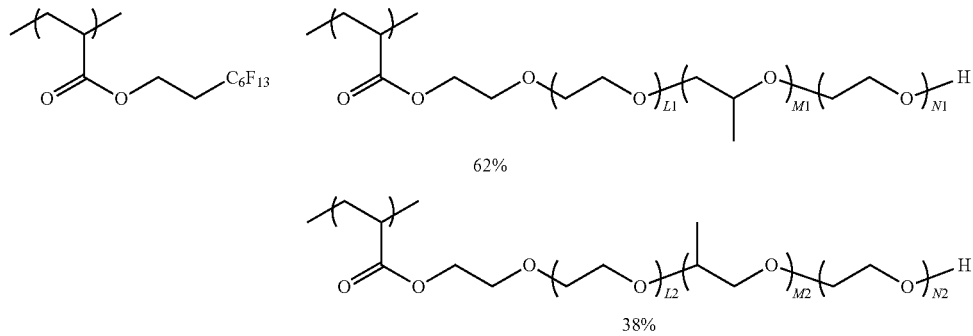

L1 + N1 + L2 + N2 = 14
M1 + M2 = 17

The weight-average molecular weight of the compound is preferably 3,000 to 50,000, and for example, 14,000. In the compound, % that indicates a proportion of the repeating unit is mass %.

As the fluorine-based surfactant, a fluorine-containing polymer having an ethylenically unsaturated group on a side chain can be used. Examples of the specific examples include compounds disclosed in paragraphs 0050 to 0090 and paragraphs 0289 to 0295 of JP2010-164965A, for example, MEGAFACE RS-101, RS-102, RS-718K, and RS-72-K manufactured by DIC Corporation. As the fluorine-based surfactant, compounds disclosed in paragraphs 0015 to 0158 of JP2015-117327A can be used.

Examples of the nonionic surfactant include glycerol, trimethylolpropane, trimethylol ethane, and ethoxylate and propoxylate thereof (for example, glycerol propoxylate and glycerin ethoxylate), polyoxyethylene lauryl ether, polyoxyethylene stearyl ether, polyoxyethylene oleyl ether, polyoxyethylene octyl phenyl ether, polyoxyethylene nonylphenyl ether, polyethylene glycol dilaurate, polyethylene glycol distearate, and sorbitan fatty acid ester, PLURONIC L10, L31, L61, L62, 10R5, 17R2, and 25R2 (manufactured by BASF SE), TETRONIC 304, 701, 704, 901, 904, and 150R1 (manufactured by BASF SE), SOLSPERSE 20000 (manufactured by Lubrizol Japan Limited), NCW-101, NCW-1001, and NCW-1002 (manufactured by FUJIFILM Wako Pure Chemical Corporation), PIONIN D-6112, D-6112-W, and D-6315 (manufactured by Takemoto Oil & Fat Co., Ltd.), and OLFINE E1010 and SURFYNOL 104, 400, and 440 (manufactured by Nissin Chemical Industry Co., Ltd.).

The content of the surfactant is preferably 0.001 mass % to 5.0 mass % and more preferably 0.005 to 3.0 mass % with respect to the total solid content of the curable composition. The surfactant may be used singly or two or more kinds thereof may be used. In a case where two or more kinds are used, it is preferable that the sum thereof is in the above range.

<<Ultraviolet Absorbing Agent>>

The curable composition according to the embodiment of the present invention preferably contains an ultraviolet absorbing agent. Examples of the ultraviolet absorbing agent include a conjugated diene compound and a diketone compound, and a conjugated diene compound is preferable. The conjugated diene compound is more preferably a compound represented by Formula (UV-1).

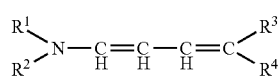

(UV-1)

In Formula (UV-1), $R^1$ and $R^2$ each independently represent a hydrogen atom, an alkyl group having 1 to 20 carbon atoms, or an aryl group having 6 to 20 carbon atoms, and $R^1$ and $R^2$ may be identical to or different from each other, but the both do not represent hydrogen atoms at the same time.

$R^1$ and $R^2$ may form a cyclic amino group together with a nitrogen atom to which $R^1$ and $R^2$ are bonded. Examples of the cyclic amino group include a piperidino group, a morpholino group, a pyrrolidino group, a hexahydroazepino group, and a piperazino group.

$R^1$ and $R^2$ each independently represent preferably an alkyl group having 1 to 20 carbon atoms, more preferably an alkyl group having 1 to 10 carbon atoms, and even more preferably an alkyl group having 1 to 5 carbon atoms.

$R^3$ and $R^4$ represent an electron withdrawing group. $R^3$ and $R^4$ are preferably an acyl group, a carbamoyl group, an alkyloxycarbonyl group, an aryloxycarbonyl group, a cyano group, a nitro group, an alkylsulfonyl group, an arylsulfonyl group, a sulfonyloxy group, and a sulfamoyl group, and more preferably an acyl group, a carbamoyl group, an alkyloxycarbonyl group, an aryloxycarbonyl group, a cyano group, an alkylsulfonyl group, an arylsulfonyl group, a sulfonyloxy group, and a sulfamoyl group. $R^3$ and $R^4$ may combine with each other to form a cyclic electron withdrawing group. Examples of the cyclic electron withdrawing group formed by combining $R^3$ and $R^4$ include a 6-membered ring including two carbonyl groups.

At least one of $R^1$, $R^2$, $R^3$, or $R^4$ described above may have a form of a polymer derived from a monomer bonded to a vinyl group via a linking group. R1, R2, R3, and R4 may be a copolymer with another monomer.

With respect to the descriptions of the substituent of the ultraviolet absorbing agent represented by Formula (UV-1), the description of paragraphs 0320 to 0327 of JP2013-068814A can be referred to, and the contents thereof are incorporated in the present specification. Examples of the commercially available products of the ultraviolet absorbing agent represented by Formula (UV-1) include UV503 (manufactured by Daito Chemical Co., Ltd.)

The diketone compound used as the ultraviolet absorbing agent is preferably a compound represented by Formula (UV-2).

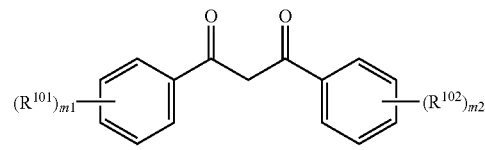

(UV-2)

In Formula (UV-2), $R^{101}$ and $R^{102}$ each independently represent a substituent, m1 and m2 each independently represent 0 to 4. Examples of the substituent include an alkyl group, an alkenyl group, an aryl group, a heteroaryl group, an alkoxy group, an aryloxy group, a heteroaryloxy group, an acyl group, an alkoxycarbonyl group, an aryloxycarbonyl group, a heteroaryloxycarbonyl group, an acyloxy group, an amino group, an acylamino group, an alkoxycarbonylamino group, an aryloxycarbonylamino group, a heteroaryloxycarbonylamino group, a sulfonylamino group, a sulfamoyl group, a carbamoyl group, an alkylthio group, an arylthio group, a heteroarylthio group, an alkylsulfonyl group, an arylsulfonyl group, a heteroarylsulfonyl group, an alkylsulfinyl group, an arylsulfinyl group, a heteroarylsulfinyl group, a ureido group, a phosphoric acid amide group, a mercapto group, a sulfo group, a carboxyl group, a nitro group, a hydroxamic acid group, a sulfino group, a hydrazino group, an imino group, a silyl group, a hydroxy group, a halogen atom, and a cyano group, and an alkyl group and an alkoxy group are preferable.

The number of carbon atoms of the alkyl group is preferably 1 to 20. The alkyl group may be linear, branched, or cyclic, but is preferably linear or branched, and more preferably branched.

The number of carbon atoms of the alkoxy group is preferably 1 to 20. The alkoxy group may be linear, branched, or cyclic, but is preferably linear or branched, and more preferably branched.

A combination in which one of $R^{101}$ and $R^{102}$ is an alkyl group, and the other is an alkoxy group is preferable.

m1 and m2 each independently represent 0 to 4. m1 and m2 each independently and preferably represent 0 to 2, more preferably 0 to 1, and particularly preferably 1.

The compound represented by Formula (UV-2) includes the following compounds.

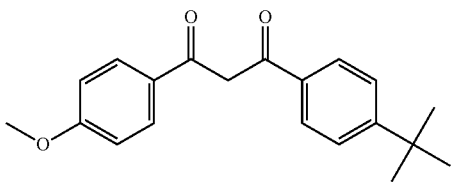 [SMILES: COc1ccc(C(=O)CC(=O)c2ccc(C(C)(C)C)cc2)cc1]

UVINUL A (manufactured by BASF SE) can also be used as the ultraviolet absorbing agent. As the ultraviolet absorbing agent, an aminodiene compound, a salicylate compound, a benzophenone compound, a benzotriazole compound, an acrylonitrile compound, and a triazine compound can be used, and specific examples thereof include compounds disclosed in JP2013-068814A. As the benzotriazole compound, MYUA series (Japan Chemical Daily, Feb. 1, 2016) manufactured by Miyoshi Oils and Fats Co., Ltd. may be used.

The content of the ultraviolet absorbing agent is preferably 0.01 to 10 mass % and more preferably 0.01 to 5 mass % with respect to the total solid content of the present invention is curable composition according to the embodiment of the present invention.

<<Polymerization Inhibitor>>

The curable composition according to the embodiment of the present invention may contain a polymerization inhibitor. Examples of the polymerization inhibitor include hydroquinone, p-methoxyphenol, di-tert-butyl-p-cresol, pyrogallol, tert-butyl catechol, benzoquinone, 4,4'-thiobis(3-methyl-6-tert-butylphenol), 2,2'-methylenebis(4-methyl-6-tert-butylphenol), and N-nitrosophenylhydroxyamine salt (ammonium salt, primary cerium salt, and the like). Among these, p-methoxyphenol is preferable. The polymerization inhibitor may function as an antioxidant. The content of the polymerization inhibitor is preferably 0.01 to 5 mass % with respect to the total solid content of the curable composition.

<<Solvent>>

The curable composition according to the embodiment of the present invention contains a solvent. Examples of the solvent include solvents described in the pigment dispersion liquid, and the preferable ranges are also the same.

The content of the solvent in the curable composition according to the embodiment of the present invention is preferably an amount in which the total solid content of the curable composition according to the embodiment of the present invention becomes 5 to 90 mass %, more preferably an amount in which the total solid content becomes 10 to 80 mass %, and even more preferably an amount in which the total solid content becomes 20 to 75 mass %.

<<Other Components>>

If necessary, the curable composition according to the embodiment of the present invention may contain a sensitizing agent, a curing accelerator, a filler, a thermal curing accelerator, a thermal polymerization inhibitor, a plasticizer, and other auxiliaries (for example, conductive particles, a filler, an antifoaming agent, a flame retardant, a leveling agent, a release promoter, an antioxidant, a perfume, a surface tension adjuster, and a chain transfer agent). By causing these components to be contained by an appropriate amount, stability and film properties of a desired optical filter such as a near infrared cut filter can be adjusted. For example, as these components, disclosures disclosed in paragraph 0183 and the subsequent paragraphs (0237 of the corresponding US2013/0034812A) of JP2012-003225A and paragraphs 0101 to 0104 and 0107 to 0109 of JP2008-250074A, and the content thereof is incorporated in the present specification. As the antioxidant, for example, a phenol compound, a phosphorus-based compound (for example, a compound disclosed in paragraphs 0042 of JP2011-090147A) and a thioether compound can be used. Examples of the commercially available products include ADEKA STAB series (AO-20, AO-30, AO-40, AO-50, AO-50F, AO-60, AO-60G, AO-80, AO-330, and the like). The content of the antioxidant is preferably 0.01 to 20 mass % and more preferably 0.3 to 15 mass % with respect to the total solid content of the curable composition. The antioxidant may be used singly or two or more kinds thereof may be used. In a case where two or more kinds thereof are used, it is preferable that the total amount is in the above range.

<Preparation of Curable Composition>

The curable composition according to the embodiment of the present invention can be prepared by mixing the respective components. It is preferable to perform filtration with the filter for the purpose of removing foreign matters and reducing defects. Examples of the kinds of the filter and the filtration method include those described in the section of the pigment dispersion liquid, and the preferable ranges are also the same.

<Application of Curable Composition>

Since the curable composition according to the embodiment of the present invention can be in a liquid state, for example, the film can be easily manufactured by applying the curable composition according to the embodiment of the present invention to a support or the like and drying the curable composition.

The viscosity of the curable composition according to the embodiment of the present invention is preferably 1 to 100 mPa·s in a case of forming a film by coating. The lower limit is more preferably 2 mPa·s or more and even more preferably 3 mPa·s or more. The upper limit is more preferably 50 mPa·s or less, even more preferably 30 mPa·s or less, and particularly preferably 15 mPa·s or less.

The total solid content of the curable composition according to the embodiment of the present invention is changed by an application method and is preferably 1 to 50 mass %. The lower limit is more preferably 10 mass % or more. The upper limit is more preferably 30 mass % or less.

The use of the curable composition according to the embodiment of the present invention is not particularly limited. For example, the curable composition can be preferably used for forming a near infrared cut filter or the like. For example, a near infrared cut filter (for example, for a near infrared cut filter with respect to a wafer level lens) on a light receiving side of the solid-state imaging element, a near infrared cut filter on the back side (opposite side to the light receiving side) of the solid-state imaging element can be preferably used. Particularly, the curable composition can be preferably used as a near infrared cut filter on the light receiving side of the solid-state imaging element. By causing the curable composition according to the embodiment of the present invention to contain a coloring material that shields visible light, an infrared transmitting filter that can transmit only near infrared rays of a specific wavelength or more can be formed. For example, it is possible to form an infrared transmitting filter that shields light in the wavelength range of 400 to 900 nm and can transmit near infrared rays in a wavelength of 900 nm or more.

<Film>

The film according to the embodiment of the present invention is described. The film according to the embodiment of the present invention is obtained by using the curable composition according to the embodiment of the present invention described above. The film according to the embodiment of the present invention can be preferably used as a near infrared cut filter. The film can also be used as a heat ray shielding filter or an infrared ray transmitting filter. The film according to the embodiment of the present invention may be laminated on a support or may be peeled from a support to be used. The film according to the embodiment of the present invention may have a pattern or may be a film (flat film) not having a pattern.

The thickness of the film according to the embodiment of the present invention can be appropriately adjusted according to the purpose. The thickness of the film is preferably 20 µm or less, more preferably 10 µm or less, and still even more preferably 5 µm or less. The lower limit of the thickness of the film is preferably 0.1 µm or more, more preferably 0.2 µm or more, and even more preferably 0.3 µm or more.

The film according to the embodiment of the present invention preferably has a maximum absorption wavelength in the wavelength range of 600 to 1,200 nm, more preferably has a maximum absorption wavelength in the wavelength range of 700 to 1,000 nm, and even more preferably having a maximum absorption wavelength in the wavelength range of 740 to 960 nm.

In the case where the film according to the embodiment of the present invention is used as a near infrared cut filter, the film according to the embodiment of the present invention preferably satisfies at least one condition of (1) to (4) and more preferably satisfies all conditions of (1) to (4).

(1) The transmittance in the wavelength of 400 nm is preferably 70% or more, more preferably 80% or more, even more preferably 85% or more, and particularly preferably 90% or more.

(2) The transmittance in the wavelength of 500 nm is preferably 70% or more, more preferably 80% or more, even more preferably 90% or more, and particularly preferably 95% or more.

(3) The transmittance in the wavelength of 600 nm is preferably 70% or more, more preferably 80% or more, even more preferably 90% or more, and particularly preferably 95% or more.

(4) The transmittance in the wavelength of 650 nm is preferably 70% or more, more preferably 80% or more, even more preferably 90% or more, and particularly preferably 95% or more.

The film according to the embodiment of the present invention can also be used in combination with a color filter including a chromatic colorant. The color filter can be manufactured by using a coloring composition including a chromatic colorant. Examples of the chromatic colorant include the chromatic colorants described in the section of the curable composition according to the embodiment of the present invention. The coloring composition may further contain a resin, a polymerizable compound, a photopolymerization initiator, a surfactant, a solvent, a polymerization inhibitor, and an ultraviolet absorbing agent. For these details, the above materials can be referred to and these can be used.

In the case where the film according to the embodiment of the present invention and a color filter are used in combination, it is preferable that a color filter is disposed on the optical path of the film according to the embodiment of the present invention. For example, the film according to the embodiment of the present invention and the color filter can be laminated to be used as a laminate. In the laminate, both of the film according to the embodiment of the present invention and the color filter may be adjacent to each other in the thickness direction or may not be adjacent to each other. In the case where the film according to the embodiment of the present invention and the color filter are not adjacent in the thickness direction, the film according to the embodiment of the present invention may be formed on a support different from a support having the color filter formed thereon, or another member (for example, microlens or planarizing layer) constituting the solid-state imaging element may be interposed between the film according to the embodiment of the present invention and a color filter.

According to the present invention, the near infrared cut filter refers to a filter means a filter that transmits light (visible light) in a wavelength of the visible region and shields at least a portion of light having a wavelength of the near infrared region (near infrared ray). The near infrared cut filter may transmit all light having a wavelength of the visible region, and may pass light in a specific wavelength range out of light having the wavelength of the visible region and shield light in a specific wavelength range. According to the present invention, the color filter means a filter that allows light in a specific wavelength range to pass therethrough and shields light in a specific wavelength range, out of light having wavelengths of the visible region. According to the present invention, the infrared transmitting filter means a filter that shields visible light and transmits at least a portion of the near infrared rays.

The film according to the embodiment of the present invention can be used for various devices such as a solid-state imaging element such as a charge coupled device (CCD) and a complementary metal oxide semiconductor (CMOS), an infrared sensor, and an image display device.

<Method of Manufacturing Film>

Subsequently, a method of manufacturing a film according to the embodiment of the present invention is described. The film according to the embodiment of the present invention can be manufactured by a step of applying the curable composition according to the embodiment of the present invention.

In the method of manufacturing the film according to the embodiment of the present invention, the support is preferably coated with the curable composition. Examples of the support include a substrate formed of a material such as silicon, alkali-free glass, soda glass, PYREX (registered trademark) glass, or quartz glass. An organic film, an inorganic film, or the like may be formed on these substrates. Examples of the material of the organic film include the above resins. As the support, a substrate formed of the above resin can be used. A charge coupled device (CCD), a complementary metal oxide semiconductor (CMOS), a transparent conductive film, or the like may be formed on the support. A black matrix for isolating each pixel may be formed on the support. If necessary, an undercoat layer may be provided on the support in order to improve the adhesion to an upper layer, to prevent diffusion of a substance, or to flatten the surface of the substrate. In the case where a glass substrate is used as the support, it is preferable to form an inorganic film on the glass substrate or use the glass substrate after desalting. According to this aspect, a film in which generation of a foreign matter is suppressed can be easily manufactured. In the case of using a support to which a component (such as a sodium ion in a case of soda glass, etc.) included in the support easily migrates into the film formed on the support, from the side of a support such as soda glass, a pigment derivative and a component that is transferred from the support reacted with each other to form a salt and the like, such that crystals are precipitated in some cases. However, with the curable composition according to the embodiment of the present invention, even in a case of being applied to the support, it is possible to manufacture a film in which the generation of foreign matter is suppressed. Therefore, the present invention is particularly effective in a case of forming a film on such a support.

As a method of applying the curable composition, well-known methods can be used. Examples thereof include a dropwise adding method (drop cast); a slit coating method; a spray method; a roll coating method; a spin coating method (spin coating); a casting coating method; a slit and spin method; a pre-wet method (for example, a method disclosed in JP2009-145395A); various printing methods such as inkjet (for example, an on-demand method, a piezo method, and a thermal method), ejection system printing such as nozzle jet, flexo printing, screen printing, gravure printing, inverse offset printing, and a metal mask printing method; a transfer method using a die or the like; and a nanoimprint method. The application method by inkjet is not particularly limited, and examples thereof include methods disclosed in "Spreading and usable inkjet—infinite possibilities in patent—, issued in February 2005, S. B. Research Co., Ltd." (particularly, pages 115 to 133), JP2003-262716A, JP2003-185831A, JP2003-261827A, JP2012-126830A, and JP2006-169325A.

The composition layer formed by applying the curable composition may be dried (pre-baked). In the case of forming a pattern by a low temperature process, pre-baking may not be performed. The pre-baking temperature in a case of performing pre-baking is preferably 150° C. or lower, more preferably 120° C. or lower, and even more preferably 110° C. or lower. For example, the lower limit can be 50° C. or higher and can be 80° C. or higher. In a case where pre-baking is performed by setting the pre-baking temperature to 150° C. or lower, for example, in the case where the photoelectric conversion film of the image sensor is formed of an organic material, these characteristics can be more effectively maintained.

The pre-baking time is preferably 10 seconds to 3,000 seconds, more preferably 40 to 2,500 seconds, and even more preferably 80 to 220 seconds. Drying can be performed with a hot plate, an oven, or the like.

In the method for manufacturing a film according to the embodiment of the present invention, a step of further forming a pattern may be included. Examples of the pattern forming method include a pattern forming method using photolithography and a pattern forming method using a dry etching method. In the case where the film according to the embodiment of the present invention is used as a flat film, a step of forming a pattern may not be performed. Hereinafter, the step of forming a pattern will be described in detail.

(Case of Forming Pattern by Photolithography)

It is preferable that The method of forming a pattern by the photolithography method includes a step (exposure step) of exposing a composition layer formed by applying the curable composition according to the embodiment of the present invention in a pattern form and a step of developing and removing the composition layer in an unexposed portion to form a pattern (development step). If necessary, a step of baking the developed pattern (post-baking step) may be provided. Hereinafter, respective steps are described.

<<Exposure Step>>

In the exposure step, the composition layer is exposed in a pattern form. For example, the composition layer can be pattern-exposed by exposing the composition layer through a mask having a predetermined mask pattern by using an exposure device such as a stepper. Accordingly, the exposed portion can be cured. As the radiation (light) that can be used for the exposure, ultraviolet rays such as g rays and i rays are preferably used and more preferably i rays. For example, the irradiation amount (exposure amount) is preferably 0.03 to 2.5 J/cm$^2$, more preferably 0.05 to 1.0 J/cm$^2$, and most preferably 0.08 to 0.5 J/cm$^2$. The oxygen concentration in a case of exposure can be appropriately selected. In addition to performing the exposure in the atmosphere, exposure is performed under a low oxygen atmosphere (for example, preferably 15 vol %, more preferably 5 vol %, and substantially oxygen free) having an oxygen concentration of 19 vol % or less, or exposure may be performed under a high oxygen atmosphere (for example, 22 vol %, 30 vol %, and 50 vol %) in which the oxygen concentration exceeds 21 vol %. The exposure illuminance can be appropriately set, and can be selected generally in the range of 1,000 W/m$^2$ to 100,000 W/m$^2$ (for example, 5,000 W/m$^2$, 15,000 W/m$^2$, 35,000 W/m$^2$). The conditions of the oxygen concentration and the expose illuminance may be appropriately combined, and for example, at the oxygen concentration can be set as 10 vol %, the illuminance can be set as 10,000 W/m$^2$, or the oxygen concentration can be set as 35 vol %, the illuminance can be set as 20,000 W/m$^2$.

<<Development Step>>

Subsequently, the unexposed portion of the composition layer in the exposed composition layer is removed by development to form a pattern. The step of developing and removing the composition layer of the unexposed area can be performed by using a developer. As a result, the composition layer in the unexposed portion in the exposure step elutes into the developer, and only the photocured portion remains on the support. As a developer, an alkali developer which does not damage an underlying solid-state imaging element, a circuit, and the like is desirable. For example, the temperature of the developer is preferably 20° C. to 30° C. The developing time is preferably 20 to 180 seconds. In order to improve the residue removability, a step of shaking off the developer every 60 seconds and newly supplying the developer may be repeated several times.

Examples of the alkaline agent used in the developer include an organic alkaline compound such as ammonia water, ethylamine, diethylamine, dimethylethanolamine, diglycol amine, diethanolamine, hydroxylamine, ethylenediamine, tetramethylammonium hydroxide, tetraethylammonium hydroxide, tetrapropylammonium hydroxide, tetrabutylammonium hydroxide, benzyltrimethylammonium hydroxide, dimethylbis (2-hydroxyethyl) ammonium hydroxide, colin, pyrrole, piperidine, and 1,8-diazabicyclo [5.4.0]-7-undecene, and an inorganic alkaline compound such as sodium hydroxide, potassium hydroxide, sodium carbonate, sodium hydrogen carbonate, sodium silicate, and sodium metasilicate. As the developer, these alkaline aqueous solutions obtained by diluting an alkali agent with pure water are preferably used. The concentration of the alkaline agent in the alkaline aqueous solution is preferably 0.001 to 10 mass % and more preferably 0.01 to 1 mass %. The surfactant may be added to a developer. Examples of the surfactant include the surfactants described in the aforementioned composition, and a nonionic surfactant is preferable.

In view of convenience of transfer and storage, the developer may be once manufactured as a concentrated solution and diluted to a concentration required in a case of using. The dilution ratio is not particularly limited, but it can be set to, for example, a range of 1.5 to 100 times. In a case where a developer including the alkaline aqueous solution is used, it is preferable to perform rinsing with pure water after development.

After development, a heat treatment (post-baking) can be performed after drying. Post-baking is a post-development heat treatment for completely curing of the film. In a case where post-baking is performed, for example, the post-baking temperature is preferably 100° C. to 240° C. In view of curing a film, the post-baking temperature is more preferably 200° C. to 230° C. In the case where an organic electroluminescence (organic EL) element is used as the light emitting source or in a case where the photoelectric conversion film of the image sensor is formed of an organic material, the post bake temperature is preferably 150° C. or lower, more preferably 120° C. or lower, even more preferably 100° C. or lower, and particularly preferably 90° C. or lower. The lower limit may be, for example, 50° C. or higher. The post-baking may be performed in a continuous or batch manner on the developed film by using heating means such as a hot plate, a convection oven (hot air circulation type dryer), and a high frequency heating machine, so as to satisfy the above conditions. In a case where a pattern is formed by a low temperature process, post baking may not be performed.

(Case of Forming Pattern by Dry Etching)

Pattern formation by a dry etching method is performed by a method of curing a composition layer formed by coating a support or the like with a curable composition to form a cured material layer, forming a patterned photoresist layer on the cured material layer, and dry etching the cured material layer with etching gas by using the patterned photoresist layer as a mask. In the formation of the photoresist layer, it is preferable that a pre-baking treatment is further performed. Particularly, as a step for forming a photoresist, a form of performing a heat treatment after exposure and a heat treatment (post-bake treatment) after development is desirable. With respect to pattern formation by a dry etching method, the description of paragraphs 0010 to 0067 of JP2013-064993A can be referred to, and the contents thereof are incorporated in the present specification.

<Near Infrared Cut Filter>

Subsequently, the near infrared cut filter according to the embodiment of the present invention is described. The near infrared cut filter according to the embodiment of the present invention includes the film according to the embodiment of the present invention.

In addition to the film according to the embodiment of the present invention, the near infrared cut filter according to the embodiment of the present invention may further have a layer containing copper, a dielectric multilayer film, and an ultraviolet absorbing layer. In a case where the near infrared cut filter according to the embodiment of the present invention further has a layer containing copper and/or a dielectric multilayer film, it is possible to obtain a near infrared cut filter having a wide angle of view and excellent near infrared shielding properties. The near infrared cut filter according to the embodiment of the present invention further has an ultraviolet absorbing layer, so as to obtain a near infrared cut filter having excellent ultraviolet shielding properties. As the ultraviolet absorbing layer, for example, absorbing layers disclosed in paragraphs 0040 to 0070, and 0119 to 0145 of WO2015/099060A can be referred to, and the content thereof is incorporated in the present specification. As the dielectric multilayer film, disclosure of paragraph 0255 to 0259 of JP2014-041318A can be referred to, and the content thereof is incorporated in the present specification. As the layer containing copper, a glass substrate formed of glass containing copper (copper-containing glass) or a layer containing a copper complex (copper complex-containing layer) can be used. Examples of the copper-containing glass include phosphate glass containing copper and fluorophosphate glass containing copper. Examples of commercially available products of the copper-containing glass include NF-50 (manufactured by AGC Techno Glass Co., Ltd.), BG-60 and BG-61 (manufactured by Schott AG), and CD5000 (manufactured by HOYA Corporation).

The near infrared cut filter according to the embodiment of the present invention can be used for various devices such as a solid-state imaging element such as a charge coupled device (CCD) and a complementary metal oxide semiconductor (CMOS), an infrared sensor, and an image display device.

The near infrared cut filter according to the embodiment of the present invention has an aspect of having a pixel (pattern) of a film obtained by using the curable composition according to the embodiment of the present invention and a pixel (pattern) selected from red, green, blue, magenta, yellow, cyan, black, and colorless, as a preferable aspect.

<Solid-State Imaging Element>

The solid-state imaging element according to the embodiment of the present invention includes a film according to the embodiment of the present invention. The configuration of the solid-state imaging element has the configuration of the film according to the embodiment of the present invention, and the configuration is not particularly limited, as long as the configuration functions as a solid-state imaging element. Examples thereof include the following configuration.

A plurality of photodiodes that form a light receiving area of a solid-state imaging element and a transfer electrode made of polysilicon or the like are provided on a support, a photodiode and a light shielding film which is made of tungsten or the like and in which only a light receiving section of the photodiode on the transfer electrode is open are provided, a device protective film which is formed to cover the entire surface of the light shielding film and the photodiode light receiving section are provided on the light shielding film and which is made of silicon nitride or the like, and the film according to the embodiment of the present invention is provided on the device protective film. Further, light condensing means (for example, a microlens) may be provided below the film (on the side close to the support) according to the embodiment of the present invention; the same is applied in the following) on the device protective film and light condensing means on the film according to the embodiment of the present invention may be provided. The color filter may have a structure in which a film forming each pixel is embedded, for example, in a space partitioned in a lattice shape by a partition wall. In this case, it is preferable that the partition wall has a low refractive index with respect to each pixel. Examples of the image pick-up device having such a structure include devices disclosed in JP2012-227478A and JP2014-179577A.

<Image Display Device>

The image display device according to the embodiment of the present invention includes the film according to the embodiment of the present invention. Examples of the image display device include a liquid crystal display device and an organic electroluminescence (organic EL) display device. The definition and details of the image display device are disclosed, for example, in "Electronic Display Device (written by Akio Sasaki, published by Kogyo Chosakai Publishing Co., Ltd., 1990)", "Display Device (written by Ibuki Hosaki, published by Sangyo Tosho Publishing Co., Ltd., 1989)". For example, the liquid crystal display device is disclosed in "Next Generation Liquid Crystal Display Technique (edited by Tatsuo Uchida, published by Kogyo Chosakai Publishing Co., Ltd., 1994)". The liquid crystal display device to which the present invention can be applied is not particularly limited and can be applied to various types of liquid crystal display devices disclosed in "Next Generation Liquid Crystal Display Technology". The image display device may have a white organic EL element. As a white organic EL element, a tandem structure is preferable. A tandem structure of the organic EL element is disclosed in JP2003-045676A and "Frontiers of Organic EL Technology Development—High Brightness, High Accuracy, Longer Life, Know-How Collection" supervised by Akiyoshi Mikami, Technical Information Institute Co., Ltd., pages 326 to 328, 2008, and the like. The spectrum of the white light emitted from the organic EL element preferably has strong maximum emission peaks in the blue region (430 nm to 485 nm), the green region (530 nm to 580 nm), and the yellow region (580 nm to 620 nm). In addition to these emission peaks, the spectrum more preferably has a maximum emission peak in the red region (650 nm to 700 nm).

<Infrared Sensor>

The infrared sensor according to the embodiment of the present invention includes the above film according to the embodiment of the present invention. The configuration of the infrared sensor is not particularly limited as long as the configuration functions as an infrared sensor. Hereinafter, the infrared sensor according to an embodiment of the present invention is described with reference to the drawings.

In FIG. 1, a reference numeral 110 refers to a solid-state imaging element. An image pick-up area installed on the solid-state imaging element 110 includes near infrared cut filters 111 and infrared transmitting filters 114. Color filters 112 are laminated on the near infrared cut filters 111. Microlenses 115 are arranged on incidence ray hv side of the color filters 112 and the infrared transmitting filters 114. A planarizing layer 116 is formed so as to cover the microlens 115.

The near infrared cut filter 111 can be formed by using the curable composition according to the embodiment of the present invention. The spectral characteristics of the near infrared cut filter 111 are selected according to the emission wavelength of the infrared light emitting diode (infrared LED) to be used.

The color filter 112 is a color filter in which pixels that transmit and absorb light having a specific wavelength in the visible region are formed, the color filter is not particularly limited, and color filters for forming pixels well-known in the related art can be used. For example, color filters formed with pixels of red (R), green (G), and blue (B) or the like are used. Preferably, for example, paragraphs 0214 to 0263 of JP2014-043556A can be referred to, and the contents thereof are incorporated in the present specification.

The characteristics of the infrared transmitting filter 114 are selected according to the emission wavelength of the infrared LED to be used. In a case where the emission wavelength of the infrared LED is 850 nm, with respect to the infrared transmitting filter 114, a maximum value of the light transmittance in the film thickness direction in the wavelength range of 400 to 650 nm is preferably 30% or less, more preferably 20% or less, more preferably 10 mass % or less, and particularly preferably 0.1 mass % or less. It is preferable that this transmittance satisfies the above condition in the entire range of the wavelength 400 to 650 nm.

In the infrared transmitting filter 114, the minimum value of the light transmittance of the film in the thickness direction in the wavelength range of 800 nm or more (preferably 800 to 1,300 nm) is preferably 70% or more, more preferably 80% or more, and even more preferably 90% or more. The above transmittance preferably satisfies the above condition in a portion of the wavelength range of 800 nm or more, and it is preferable that the above conditions are satisfied at a wavelength corresponding to the emission wavelength of the infrared LED.

The film thickness of the infrared transmitting filter 114 is preferably 100 μm or less, more preferably 15 μm or less, even more preferably 5 μm or less, and particularly preferably 1 μm or less. The lower limit is preferably 0.1 μm. In a case where the film thickness is in the above range, the film satisfying the spectral characteristics described above can be obtained.

Methods of measuring spectral characteristics, film thickness, and the like of the infrared transmitting filter 114 are described below.

The thickness of the film was measured with a probe type surface profile measuring device (DEKTAK150 manufactured by ULVAC Inc.) for the dried substrate having the film.

The spectral characteristics of the film are a value obtained by measuring transmittance in a wavelength range of 300 to 1,300 nm with an ultraviolet-visible-near infrared spectrophotometer (U-4100 manufactured by Hitachi High-Technologies Corporation).

For example, in a case where the emission wavelength of the infrared LED is 940 nm, with respect to the infrared transmitting filter 114, it is preferable that, a maximum value of the transmittance of the light in the thickness direction of the film in the wavelength range of 450 to 650 nm is 20% or less, the transmittance of the light in the thickness direction of the film in the wavelength range of 835 nm is 20% or less, and a minimum value of the transmittance of the light in the thickness direction of the film in the wavelength range of 1,000 to 1,300 nm is 70% or more.

In the infrared sensor illustrated in FIG. 1, a near infrared cut filter (another near infrared cut filter) other than the near infrared cut filter 111 may be further arranged on the planarizing layer 116. Examples of the other near infrared cut filter include a filter having a layer containing copper and/or a dielectric multilayer film. Examples of the details thereof include those described above. As the other near infrared cut filter, a dual band pass filter may be used.

EXAMPLES

Hereinafter, the present invention is specifically described with reference to the examples. A material, an amount used, a treatment detail, a treatment order, and the like provided in the following examples can be suitably changed without departing from the gist of the present invention. The range of the present invention should not be limited by the following specific examples. Unless described otherwise, "%" and "parts" are based on mass.

Test Example 1

<Preparation of Pigment Dispersion Liquid>

Raw materials presented in the following table and 66 parts by mass of zirconia beads having a diameter of 0.5 mm were mixed, a dispersion treatment was performed for 120 minutes with a paint shaker, and the zirconia beads were separated by decantation so as to prepare a dispersion liquid.

<Evaluation of Dispersion Stability>

With respect to the obtained pigment dispersion liquid, the viscosity immediately after the manufacturing was measured. Subsequently, this pigment dispersion liquid was stored at a temperature condition of 45° C. for three days, and the viscosity after the storage was measured. The viscosity of the pigment dispersion liquid was measured in the temperature condition of 25° C.

Based on an absolute value (Δviscosity) of the difference between the viscosity of the pigment dispersion liquid immediately after the manufacturing and the viscosity of the pigment dispersion liquid after storage, the dispersion stability was evaluated by the following standards.

1: 0 mPa·s≤ΔViscosity≤0.3 mPa·s
2: 0.3 mPa·s<ΔViscosity≤0.5 mPa·s
3: 0.5 mPa·s<ΔViscosity≤0.8 mPa·s
4: 0.8 mPa·s<ΔViscosity The raw materials presented in the following table are as follows.

(Near Infrared Absorbing Organic Pigment)

Pigments 1 to 4: Compounds 1 to 4 having the following structures (in the following structural formula, Me represents a methyl group, Ph represents a phenyl group)

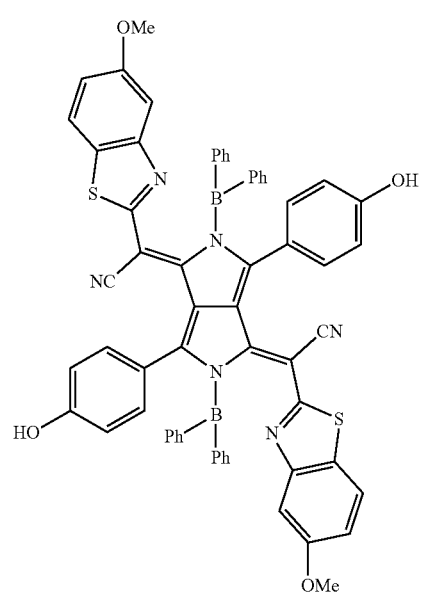

1

TABLE 8

| | Near infrared absorbing organic pigment | | Pigment Derivative | | Dispersing agent | | Solvent | | |
|---|---|---|---|---|---|---|---|---|---|
| | Kind | Formulation amount (part by mass) | Kind | Formulation amount (part by mass) | Kind | Formulation amount (part by mass) | Kind | Formulation amount (part by mass) | Dispersion stability |
| Example 1 | Pigment 1 | 3.42 | Derivative 1/Derivative 2 | 0.17/0.17 | Dispersing agent 1 | 2.25 | PGMEA | 44 | 2 |
| Example 2 | Pigment 1 | 3.42 | Derivative 1/Derivative 3 | 0.17/0.17 | Dispersing agent 1 | 2.25 | PGMEA | 44 | 2 |
| Example 3 | Pigment 1 | 3.42 | Derivative 1/Derivative 4 | 0.17/0.17 | Dispersing agent 1 | 2.25 | PGMEA | 44 | 1 |
| Example 4 | Pigment 1 | 3.42 | Derivative 2/Derivative 3 | 0.17/0.17 | Dispersing agent 1 | 2.25 | PGMEA | 44 | 1 |
| Example 5 | Pigment 1 | 3.42 | Derivative 2/Derivative 4 | 0.31/0.31 | Dispersing agent 1 | 2.25 | PGMEA | 44 | 2 |
| Example 6 | Pigment 1 | 3.42 | Derivative 3/Derivative 4 | 0.31/0.31 | Dispersing agent 1 | 2.25 | PGMEA | 44 | 2 |
| Example 7 | Pigment 1 | 3.42 | Derivative 5/Derivative 6 | 0.17/0.17 | Dispersing agent 1 | 2.25 | PGMEA | 44 | 1 |
| Example 8 | Pigment 1 | 3.42 | Derivative 1/Derivative 2/ Derivative 3 | 0.11/0.11/ 0.11 | Dispersing agent 1 | 2.25 | PGMEA | 44 | 1 |
| Example 9 | Pigment 1 | 3.42 | Derivative 1/Derivative 2 | 0.17/0.17 | Dispersing agent 1 | 2.25 | PGMEA | 44 | 2 |
| Example 10 | Pigment 1 | 3.42 | Derivative 1/Derivative 2 | 0.17/0.17 | Dispersing agent 1 | 2.25 | PGMEA | 44 | 2 |
| Example 11 | Pigment 1 | 3.42 | Derivative 5/Derivative 1 | 0.31/0.31 | Dispersing agent 1 | 2.25 | PGMEA | 44 | 2 |
| Example 12 | Pigment 1 | 3.42 | Derivative 5/Derivative 2 | 0.17/0.17 | Dispersing agent 1 | 2.25 | PGMEA | 44 | 1 |
| Example 13 | Pigment 1 | 3.42 | Derivative 5/Derivative 3 | 0.17/0.17 | Dispersing agent 1 | 2.25 | PGMEA | 44 | 2 |
| Example 14 | Pigment 2 | 3.42 | Derivative 5/Derivative 6 | 0.17/0.17 | Dispersing agent 1 | 2.25 | PGMEA | 44 | 2 |
| Example 15 | Pigment 3 | 3.42 | Derivative 7/Derivative 8 | 0.31/0.31 | Dispersing agent 1 | 2.25 | PGMEA | 44 | 2 |
| Example 16 | Pigment 1 | 3.42 | Derivative 1/Derivative 2/ Derivative 9 | 0.11/0.11/ 0.11 | Dispersing agent 1 | 2.25 | PGMEA | 44 | 1 |
| Example 17 | Pigment 1 | 3.42 | Derivative 10/Derivative 11 | 0.17/0.17 | Dispersing agent 1 | 2.25 | PGMEA | 44 | 1 |
| Example 18 | Pigment 1 | 3.42 | Derivative 10/Derivative 12 | 0.17/0.17 | Dispersing agent 1 | 2.25 | PGMEA | 44 | 3 |
| Example 19 | Pigment 4 | 3.42 | Derivative 5/Derivative 6 | 0.17/0.17 | Dispersing agent 1 | 2.25 | PGMEA | 44 | 1 |
| Example 20 | Pigment 1 | 3.42 | Derivative 13/Derivative 14 | 0.31/0.31 | Dispersing agent 2 | 2.25 | PGMEA | 44 | 3 |

103
-continued
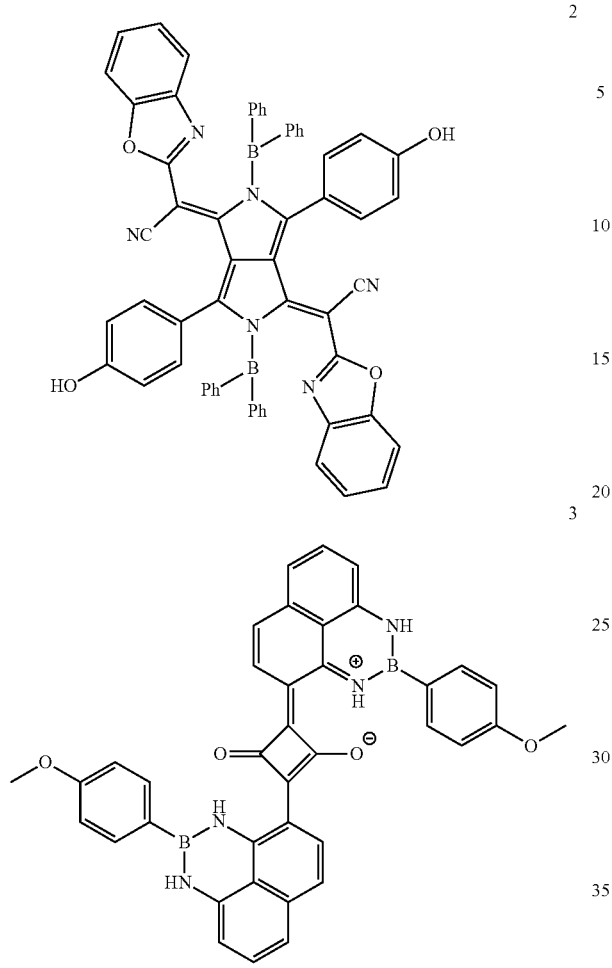
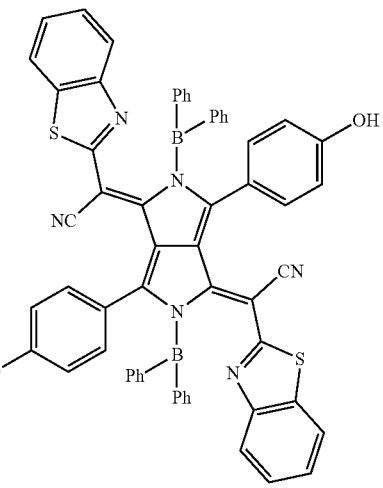
104
-continued
(Pigment Derivative)
Derivatives 1 to 14: Compounds 1 to 14 having the following structures (in the following structural formula, Me represents a methyl group, Ph represents a phenyl group)
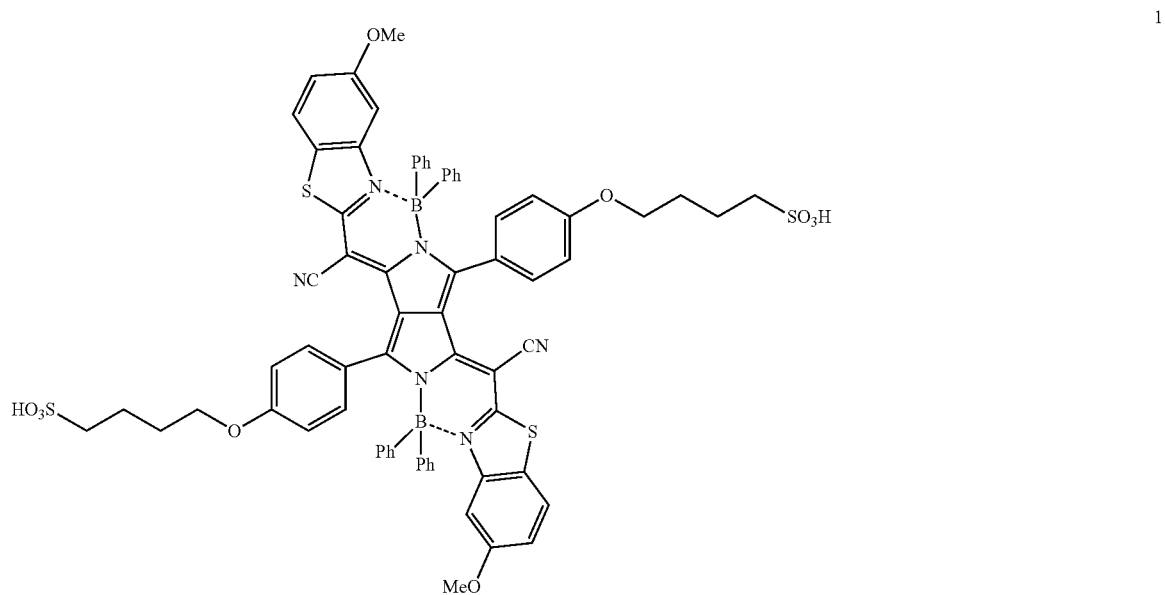

2
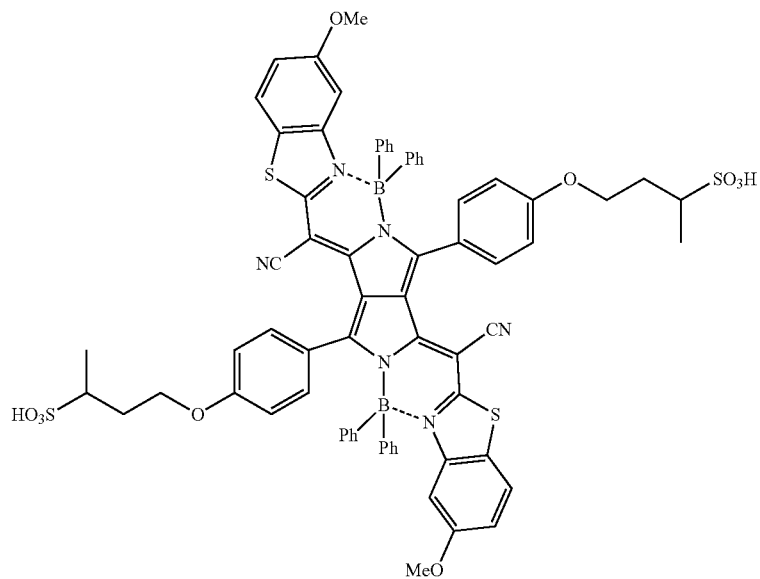
3
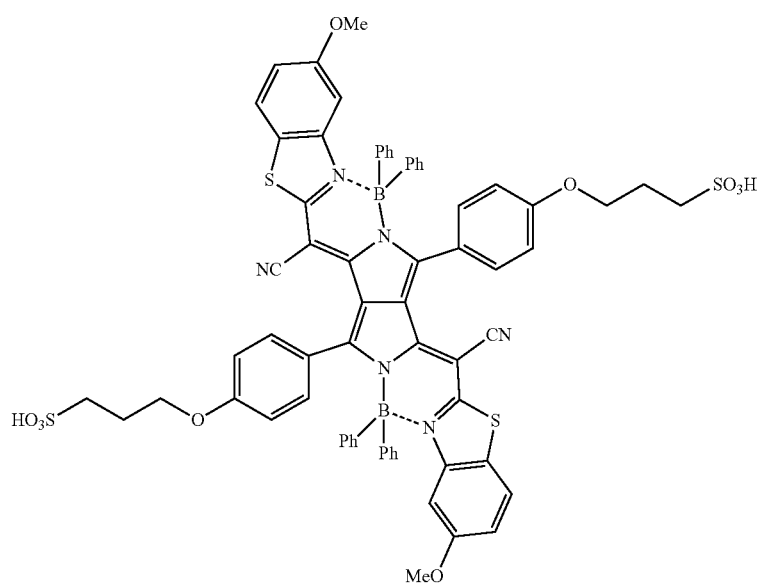

-continued
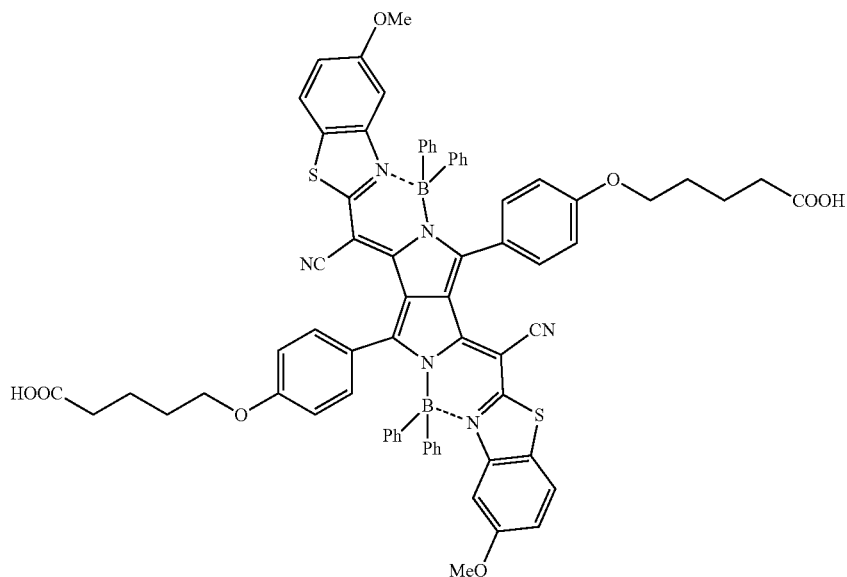
4
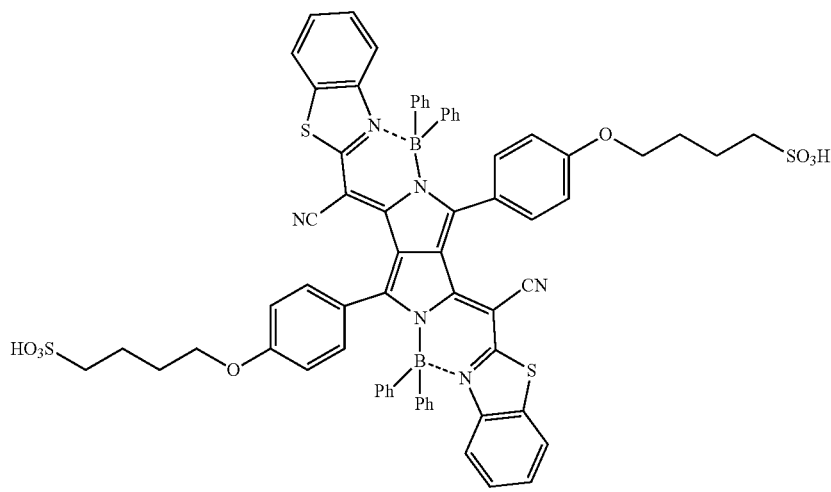
5
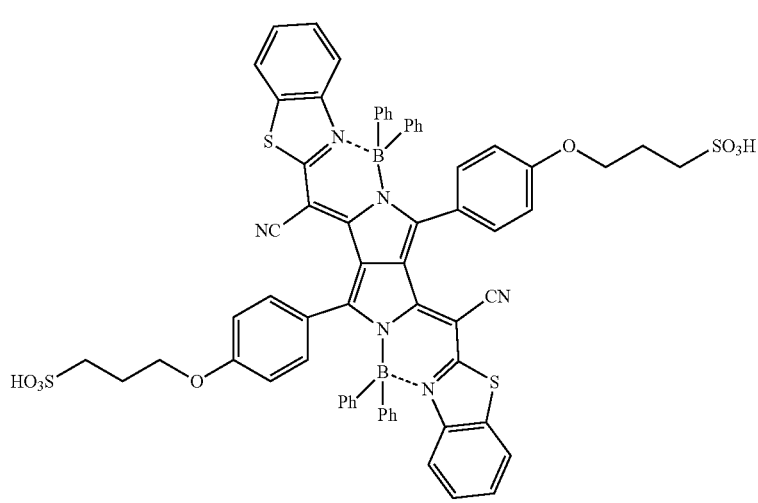
6

7
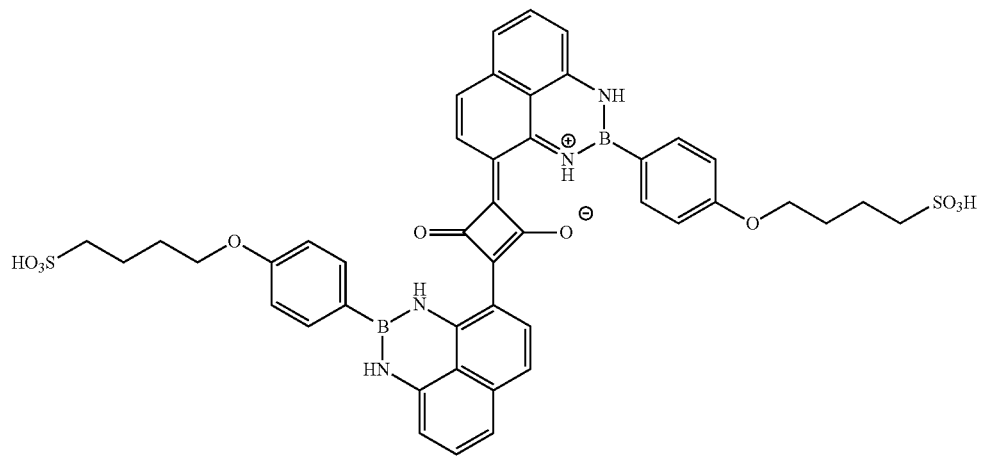
8
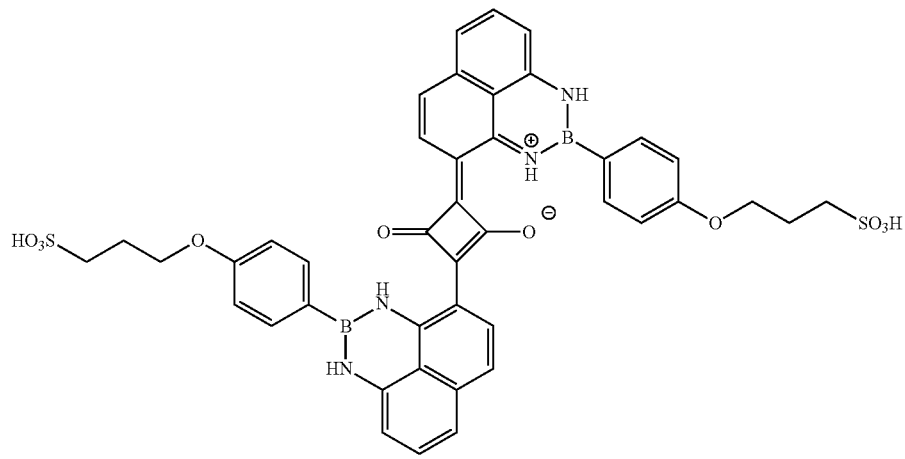
9
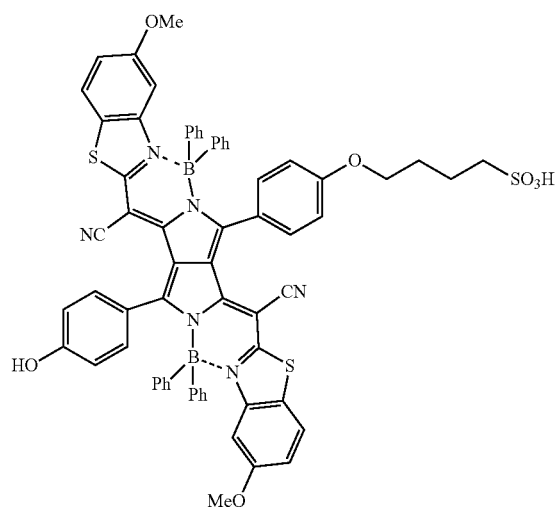
10
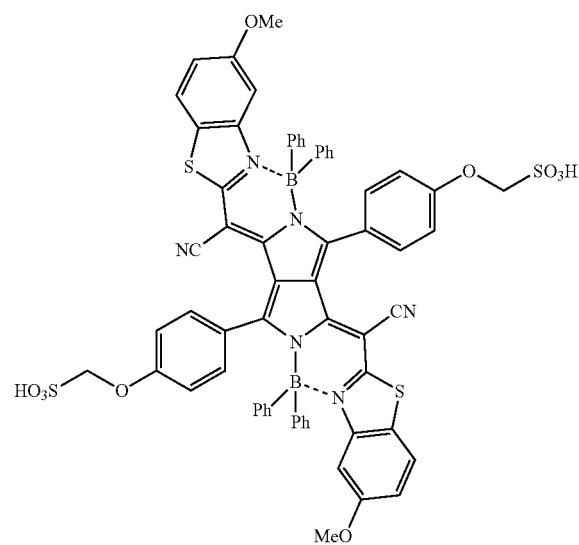

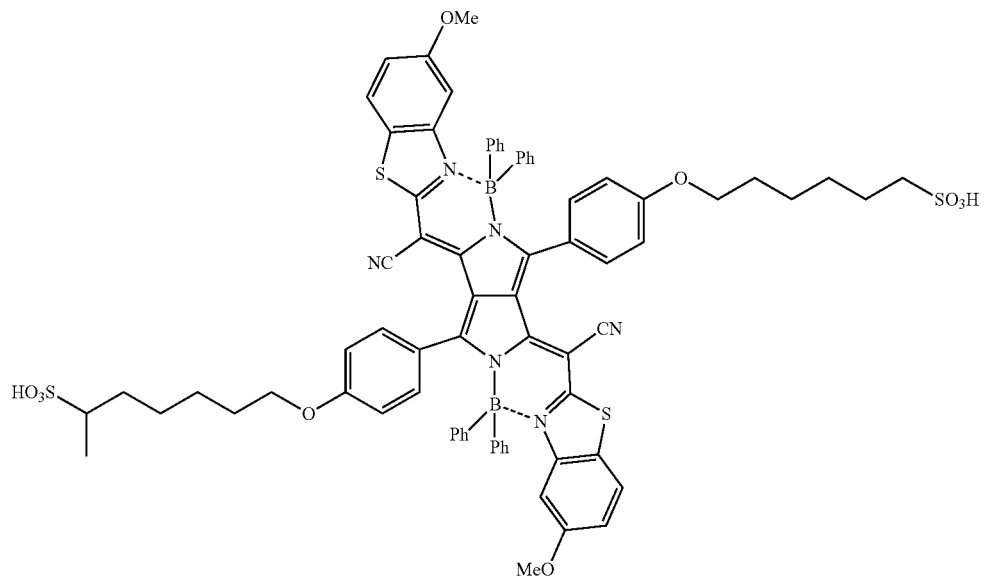
11
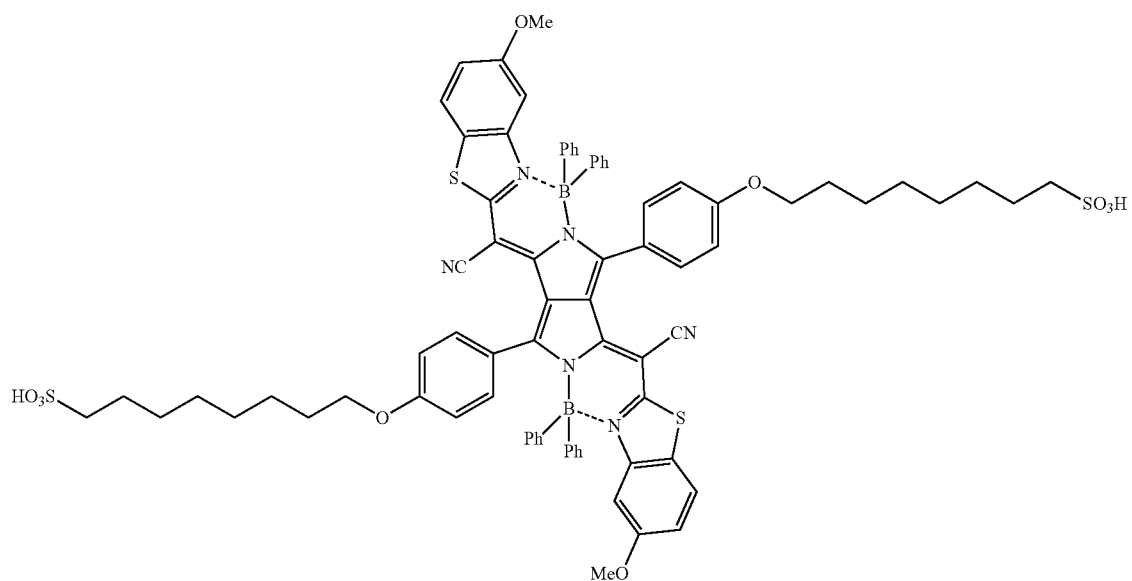
12

-continued
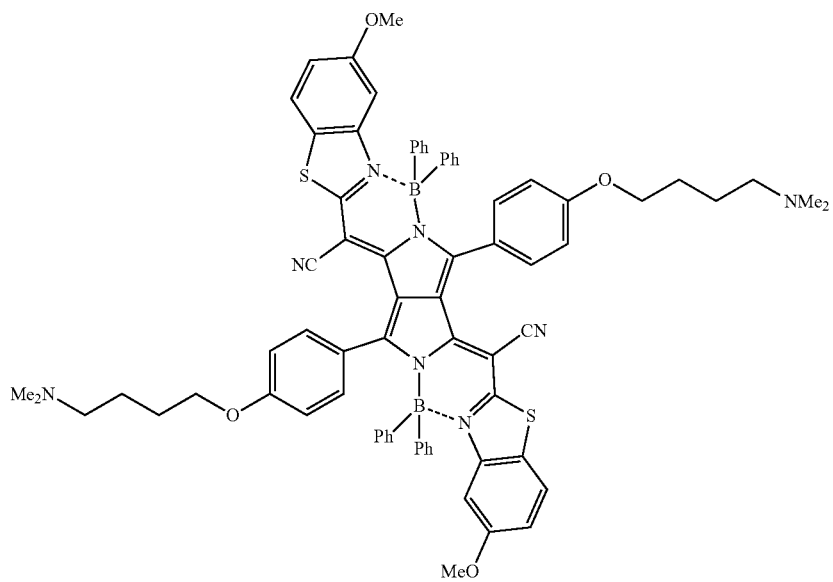
13
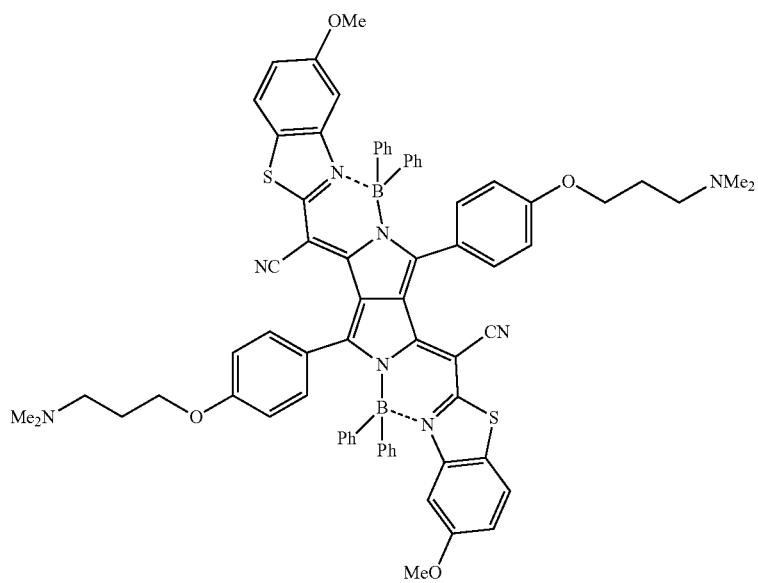
14
(Dispersing Agent)
Dispersing agent 1: Resin having the following structure (weight-average molecular weight=21,000). A numerical value appended to the main chain represents a molar ratio of the repeating unit, and a numerical value appended to a side chain represents the number of repeating units.
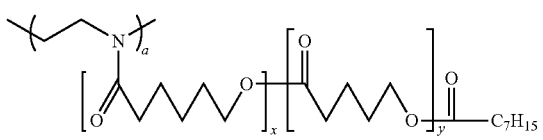
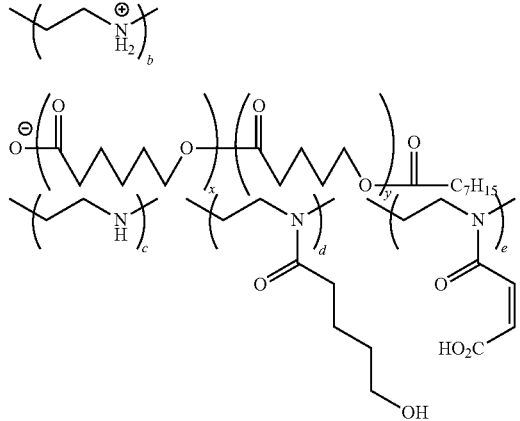
a/b/c/d/e = 36/4/35/1/24 (mol %)
x = 48 y = 12

Dispersing agent 2: Resin having the following structure (weight-average molecular weight=38,900). A numerical value appended to the main chain represents a molar ratio of the repeating unit, and a numerical value appended to a side chain represents the number of repeating units.

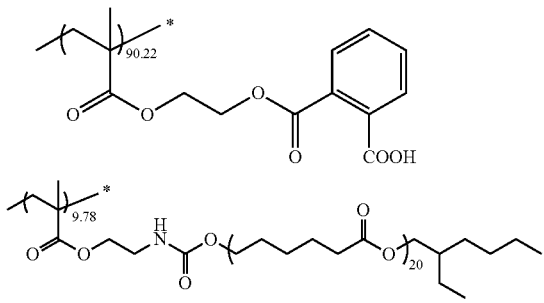

(Solvent)

PGMEA: Propylene glycol monomethyl ether acetate

<Curable Composition>

The raw materials presented in the following table were mixed to manufacture a curable composition. In the following table, as a resin 1, a 4 mass % PGMEA solution including a resin having the following structure (acid value: 70 mgKOH/g, Mw=11,000, a ratio in a structural unit is a molar ratio) was used. As the resin 2, a 4 mass % PGMEA solution of ARTON F4520 (manufactured by JSR Corporation) was used. As the resin 3, a 4 mass % PGMEA solution of a glycidyl methacrylate skeleton random polymer (manufactured by NOF Corporation, MARUFLUFT G-0150 M, Mw=10,000) was used.

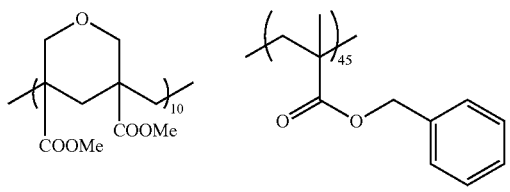

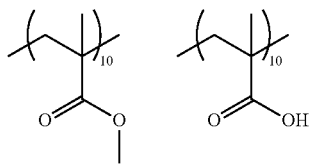

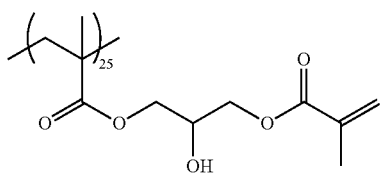

<Evaluation of Spectral Properties>

The curable composition obtained above was applied onto a glass wafer by a spin coating method such that the film thickness after coating was 0.3 μm and then was heated at 100° C. for two minutes by using a hot plate. Subsequently, exposure was performed at 1,000 mJ/cm$^2$ with an i-line stepper exposure device FPA-3000i5+(manufactured by Canon Inc.). The heating was performed at 220° C. for five minutes by using a hot plate to form a film. The maximum absorption wavelength was measured on a substrate on which a film was formed with a spectrophotometer U-4100 (manufactured by Hitachi High-Technologies Corporation).

<Evaluation of Generation of Foreign Matters>

The curable composition obtained above was applied onto a glass wafer by a spin coating method such that the film thickness after coating was 0.3 μm and then was heated at 100° C. for two minutes by using a hot plate. Subsequently, exposure was performed at 1,000 mJ/cm$^2$ with an i-line stepper exposure device FPA-3000i5+(manufactured by Canon Inc.). The heating was performed at 220° C. for five minutes by using a hot plate to form a film. The substrate on which the film was formed was photographed with a scanning electron microscope S-4800 (manufactured by Hitachi High-Technologies Corporation) at a magnification of 10,000 times to count the number of foreign matters, so as to evaluate the generation of foreign matters.

1: The number of foreign matters was 0

2: The number of foreign matters was 1 to 3

3: The number of foreign matters was 4 to 30

4: The number of foreign matters was 31 or more

<Evaluation of Moisture Resistance>

The transmittance of the same film as used in the evaluation of the spectral characteristics was measured. Subsequently, the substrate on which the film was formed was stored for one month under the conditions of 85° C. and relative humidity of 85%, so as to perform a moisture resistance test, and then the transmittance of the film after the moisture resistance test was measured. Among the transmittance in the wavelength range of 400 to 1,000 nm, the change (ΔT) of the transmittance at the wavelength in which the change of the transmittance is the largest before and after the moisture resistance test was obtained from the following formula, and the moisture resistance was evaluated using ΔT according to the following standard.

ΔT=|transmittance before moisture resistance test−transmittance after moisture resistance test|

1: 0%≤ΔT %<3%

2: 3%≤ΔT %<5%

3: 5%≤ΔT %<8%

4: 8%≤ΔT %

TABLE 9

| | Pigment dispersion liquid | | Curable compound | | | | |
|---|---|---|---|---|---|---|---|
| | Kind | Formulation amount (part by mass) | Kind | Formulation amount (part by mass) | Maximum absorption wavelength | Generation of foreign matters | Moisture resistance |
| Example 101 | Example 1 | 10 | Resin 1 | 10 | 845 nm | 1 | 1 |
| Example 102 | Example 2 | 10 | Resin 1 | 10 | 845 nm | 1 | 2 |
| Example 103 | Example 3 | 10 | Resin 1 | 10 | 845 nm | 1 | 1 |
| Example 104 | Example 4 | 10 | Resin 1 | 10 | 845 nm | 1 | 1 |
| Example 105 | Example 5 | 10 | Resin 1 | 10 | 845 nm | 1 | 1 |
| Example 106 | Example 6 | 10 | Resin 1 | 10 | 845 nm | 1 | 1 |
| Example 107 | Example 7 | 10 | Resin 1 | 10 | 845 nm | 2 | 1 |
| Example 108 | Example 8 | 10 | Resin 1 | 10 | 845 nm | 1 | 1 |
| Example 109 | Example 9 | 10 | Resin 2 | 10 | 845 nm | 1 | 1 |
| Example 110 | Example 10 | 10 | Resin 3 | 10 | 845 nm | 1 | 1 |
| Example 111 | Example 11 | 10 | Resin 1 | 10 | 845 nm | 2 | 1 |
| Example 112 | Example 12 | 10 | Resin 1 | 10 | 845 nm | 2 | 1 |
| Example 113 | Example 13 | 10 | Resin 1 | 10 | 845 nm | 1 | 1 |
| Example 114 | Example 14 | 10 | Resin 1 | 10 | 760 nm | 1 | 2 |
| Example 115 | Example 15 | 10 | Resin 1 | 10 | 790 nm | 1 | 2 |
| Example 116 | Example 16 | 10 | Resin 1 | 10 | 845 nm | 1 | 2 |
| Example 117 | Example 17 | 10 | Resin 1 | 10 | 845 nm | 2 | 2 |
| Example 118 | Example 18 | 10 | Resin 1 | 10 | 845 nm | 3 | 2 |
| Example 119 | Example 19 | 10 | Resin 1 | 10 | 795 nm | 1 | 2 |
| Example 120 | Example 20 | 10 | Resin 1 | 10 | 845 nm | 1 | 2 |

As presented in the above table, films having fewer foreign matters were able to be formed in the examples. In the respective examples, it was possible to form films having fewer foreign matters than a case of using a curable composition A described below.

(Curable Composition A)

In the pigment dispersion liquid in Example 1, as the pigment derivative, instead of the mixture of 0.17 parts by mass of a derivative 1 and 0.17 parts by mass of a derivative 2, a pigment dispersion liquid A obtained by only using 0.34 parts by mass of the derivative 1 was manufactured. In the curable composition of Example 101, instead of the pigment dispersion liquid of Example 1, the curable composition was manufactured by the same method as in Example 101 except that the pigment dispersion liquid A was used.

In the curable compositions of the respective examples, it was possible to obtain the same effect as in the respective examples even in a case of causing the compound having a group having an ethylenically unsaturated bond described in paragraphs 0137 to 0139 of the present specification as the curable compound to be contained by 0.1 to 95 mass % with respect to the total solid content of the curable composition and causing the photopolymerization initiator described in paragraphs 0168 to 0176 to be contained by 0.1 to 50 mass % with respect to the total solid content of the curable composition.

In the curable compositions of the respective examples, it was possible to obtain the same effect as in the respective examples, even in a case of using two or more kinds of the curable compounds in combination.

In the curable compositions of the respective examples, it was possible to obtain the same effect as in the respective examples, even in a case of further formulating the near infrared absorbing dye.

Test Example 2

The curable composition of Example 4 was applied onto a silicon wafer by a spin coating method so that the film thickness after film formation became 1.0 μm. Thereafter, heating was performed at 100° C. for two minutes by using a hot plate. Subsequently, heating was performed at 200° C. for five minutes by using a hot plate. Then, a Bayer pattern (near infrared cut filter) of 1.0 μm square was formed by dry etching method.

A red composition was applied onto a Bayer pattern of the near infrared cut filter by a spin coating method so that the film thickness after film formation became 1.0 μm. Subsequently, heating was performed at 100° C. for two minutes by using a hot plate. Subsequently, exposure was by using a mask having a dot pattern of 2 μm square in an exposure amount of 1,000 mJ/cm$^2$ an i-line stepper exposure device FPA-3000i5+(manufactured by Canon Inc.). Subsequently, the puddle development was performed at 23° C. for 60 seconds by using an aqueous solution of 0.3 mass % tetramethylammonium hydroxide (TMAH). Thereafter, the substrate was rinsed with a spin shower, and further washed with pure water. Subsequently, the red composition was patterned on the Bayer pattern of the near infrared cut filter by performing heating at 200° C. for five minutes with a hot plate. A green composition and a blue composition were sequentially patterned in the same manner, so as to form red, green, and blue coloration patterns.

Subsequently, a composition for forming an infrared transmitting filter was applied onto a film on which the pattern was formed by a spin coating method such that the film thickness after film formation became 2.0 μm. Subsequently, heating was performed at 100° C. for two minutes by using a hot plate. Subsequently, exposure was by using a mask having a Bayer pattern of 2 μm square in an exposure amount of 1,000 mJ/cm$^2$ an i-line stepper exposure device FPA-3000i5+(manufactured by Canon Inc.). Subsequently, the puddle development was performed at 23° C. for 60 seconds by using a 0.3 mass % aqueous solution of tetramethylammonium hydroxide (TMAH). Thereafter, the substrate was rinsed with a spin shower, and further washed with pure water. Subsequently, by performing heating at 200° C. for five minutes with a hot plate, patterning of the infrared transmitting filter was performed on a portion of the near infrared cut filter in which the pattern was not provided. This was incorporated in a solid-state imaging element by a well-known method.

With respect to the obtained solid-state imaging element, light was irradiated from a light source of an infrared light emitting diode (infrared LED) under a low illuminance environment (0.001 Lux), images were captured, and image performance was evaluated. A subject was able to be clearly recognized on the image. In addition, the angle of viewing was wide and incident angle dependency was good.

The red composition, the green composition, the blue composition, and the composition for forming an infrared transmitting filter used in Test Example 2 were as below.

(Red Composition)

The following components were mixed and stirred, and then filtrated through a nylon filter (manufactured by Nippon Pall Ltd.) having a pore diameter of 0.45 μm to prepare the red composition.

| | |
|---|---|
| Red pigment dispersion liquid | 51.7 parts by mass |
| Resin 14 (40 mass % PGMEA solution) | 0.6 parts by mass |
| Polymerizable compound 14 | 0.6 parts by mass |
| Photopolymerization initiator 11 | 0.3 parts by mass |
| Surfactant 11 | 4.2 parts by mass |
| PGMEA | 42.6 parts by mass |

(Green Composition)

The following components were mixed and stirred, and then filtrated through a nylon filter (manufactured by Nippon Pall Ltd.) having a pore diameter of 0.45 μm to prepare the green composition.

| | |
|---|---|
| Green pigment dispersion liquid | 73.7 parts by mass |
| Resin 14 (40 mass % PGMEA solution) | 0.3 parts by mass |
| Polymerizable compound 11 | 1.2 parts by mass |
| Photopolymerization initiator 11 | 0.6 parts by mass |
| Surfactant 11 | 4.2 parts by mass |
| Ultraviolet absorbing agent (UV-503, manufactured by Daito Chemical Co., Ltd.) | 0.5 parts by mass |
| PGMEA | 19.5 parts by mass |

(Blue Composition)

The following components were mixed and stirred, and then filtrated through a nylon filter (manufactured by Nippon Pall Ltd.) having a pore diameter of 0.45 μm to prepare the blue composition.

| | |
|---|---|
| Blue pigment dispersion liquid | 44.9 parts by mass |
| Resin 14 (40 mass % PGMEA solution) | 2.1 parts by mass |
| Polymerizable compound 11 | 1.5 parts by mass |
| Polymerizable compound 14 | 0.7 parts by mass |
| Photopolymerization initiator 11 | 0.8 parts by mass |
| Surfactant 11 | 4.2 parts by mass |
| PGMEA | 45.8 parts by mass |

(Composition for Forming Infrared Transmitting Filter)

Components having the following composition were mixed and stirred, and then filtrated through a nylon filter (manufactured by Nippon Pall Ltd.) having a pore diameter of 0.45 μm to prepare the composition for forming an infrared transmitting filter.

| | |
|---|---|
| Pigment dispersion liquid 1-1 | 46.5 parts by mass |
| Pigment dispersion liquid 1-2 | 37.1 parts by mass |
| Polymerizable compound 15 | 1.8 parts by mass |
| Resin 14 | 1.1 parts by mass |
| Photopolymerization initiator 12 | 0.9 parts by mass |
| Surfactant 11 | 4.2 parts by mass |
| Polymerization inhibitor (p-methoxy phenol) | 0.001 parts by mass |
| Silane coupling agent | 0.6 parts by mass |
| PGMEA | 7.8 parts by mass |

Raw materials used in the red composition, the green composition, the blue composition, and the composition for forming an infrared transmitting filter were as below.

Red Pigment Dispersion Liquid

A mixed liquid including 9.6 parts by mass of C. I. Pigment Red 254, 4.3 parts by mass of C. I. Pigment Yellow 139, 6.8 parts by mass of a dispersing agent (Disperbyk-161, manufactured by BYK-Chemie GmbH), and 79.3 parts by mass of PGMEA was mixed and dispersed with a bead mill (zirconia beads 0.3 mm in diameter) for three hours so as to prepare a pigment dispersion liquid. A dispersion treatment was performed with a high pressure dispersing machine with a pressure reducing mechanism NANO-3000-10 (manufactured by manufactured by Beryu corp.), under the pressure of 2,000 kg/cm$^3$ at a flow rate of the dispersion liquid adjusted to 500 g/min. This dispersion treatment was repeated ten times to obtain a red pigment dispersion liquid.

Green Pigment Dispersion Liquid

A mixed liquid including 6.4 parts by mass of C. I. Pigment Green 36, 5.3 parts by mass of C. I. Pigment Yellow 150, 5.2 parts by mass of a dispersing agent (Disperbyk-161, manufactured by BYK-Chemie GmbH), and 83.1 parts by mass of PGMEA was mixed and dispersed with a bead mill (zirconia beads 0.3 mm in diameter) for three hours so as to prepare a pigment dispersion liquid. A dispersion treatment was performed with a high pressure dispersing machine with a pressure reducing mechanism NANO-3000-10 (manufactured by manufactured by Beryu corp.), under the pressure of 2,000 kg/cm$^3$ at a flow rate of the dispersion liquid adjusted to 500 g/min. This dispersion treatment was repeated ten times to obtain a green pigment dispersion liquid.

Blue Pigment Dispersion Liquid

A mixed liquid including 9.7 parts by mass of C. I. Pigment Blue 15:6, 2.4 parts by mass of C. I. Pigment Violet 23, 5.5 parts by mass of a dispersing agent (Disperbyk-161, manufactured by BYK-Chemie GmbH), and 82.4 parts by mass of PGMEA was mixed and dispersed with a bead mill (zirconia beads 0.3 mm in diameter) for three hours so as to prepare a pigment dispersion liquid. A dispersion treatment was performed with a high pressure dispersing machine with a pressure reducing mechanism NANO-3000-10 (manufactured by manufactured by Beryu corp.), under the pressure of 2,000 kg/cm$^3$ at a flow rate of the dispersion liquid adjusted to 500 g/min. This dispersion treatment was repeated ten times to obtain a blue pigment dispersion liquid.

Pigment Dispersion Liquid 1-1

The mixed solution having the following composition was mixed and dispersed for three hours with a bead mill (high-pressure dispersing machine NANO-3000-10 (manufactured by Beryu corp.) with a pressure reducing mechanism) by using zirconia beads having a diameter of 0.3 mm to prepare a pigment dispersion liquid 1-1.

| | |
|---|---|
| Mixed pigment including a red pigment (C.I. Pigment Red 254) and a yellow pigment (C.I. Pigment Yellow 139) | 11.8 parts by mass |
| Resin (Disperbyk-111, manufactured by BYK-Chemie GmbH) | 9.1 parts by mass |
| PGMEA | 79.1 parts by mass |

Pigment Dispersion Liquid 1-2

The mixed solution having the following composition was mixed and dispersed for three hours with a bead mill (high-pressure dispersing machine NANO-3000-10 (manufactured by Beryu corp.) with a pressure reducing mechanism) by using zirconia beads having a diameter of 0.3 mm to prepare a pigment dispersion liquid 1-2.

| | |
|---|---|
| Mixed pigment including a blue pigment (C.I. Pigment Blue 15:6) and a yellow pigment (C.I. Pigment Violet 23) | 12.6 parts by mass |
| Resin (Disperbyk-111, manufactured by BYK-Chemie GmbH) | 2.0 parts by mass |
| Resin A | 3.3 parts by mass |
| Cyclohexanone | 31.2 parts by mass |
| PGMEA | 50.9 parts by mass |

Resin A: The Following Structure (Mw=14,000, a Ratio in a Unit Structure is a Molar Ratio)

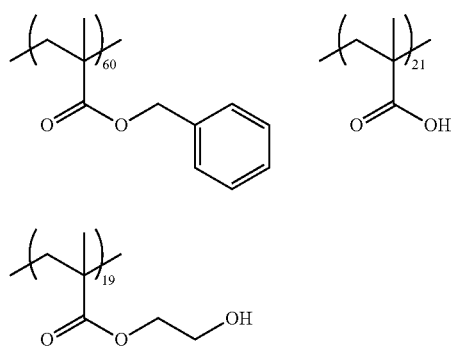

Polymerizable Compound 11: KAYARAD DPHA (Manufactured by Nippon Kayaku Co., Ltd.)

Polymerizable Compound 14: Compound Having the Following Structure

Polymerizable Compound 15: Compound Having the Following Structure (a Mixture of a Molar Ratio of the Left Compound and the Right Compound is 7:3)

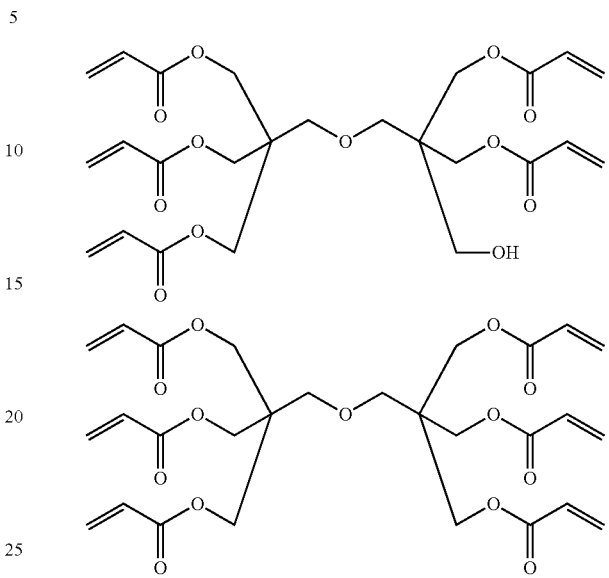

Resin 14: Compound Having the Following Structure (Acid Value: 70 mgKOH/g, Mw=11,000, a Ratio in a Unit Structure is a Molar Ratio)

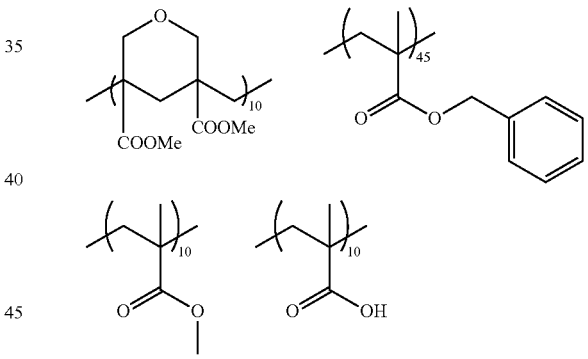

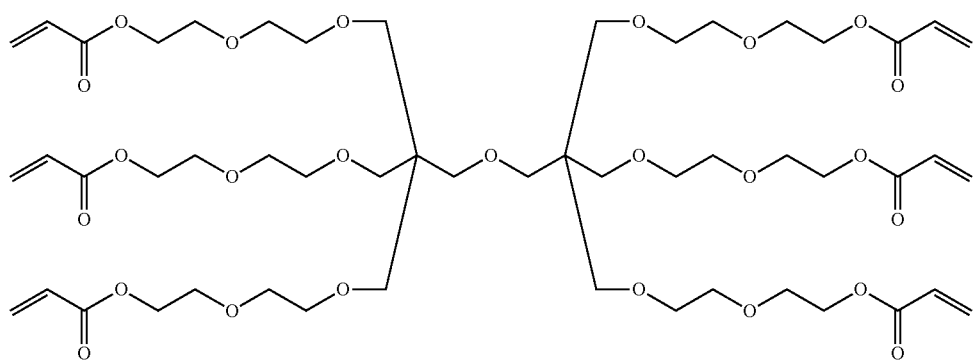 [SMILES: C=CC(=O)OCCOCCOCC(COCCOCCOC(=O)C=C)(COCCOCCOC(=O)C=C)COCC(COCCOCCOC(=O)C=C)(COCCOCCOC(=O)C=C)COCCOCCOC(=O)C=C]

-continued

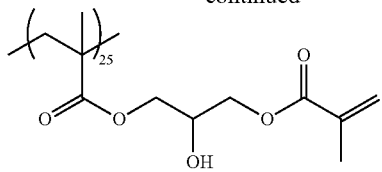

Photopolymerization Initiator 11: IRGACURE-OXE01 (Manufactured by BASF SE)

Photopolymerization Initiator 12: Compound Having the Following Structure

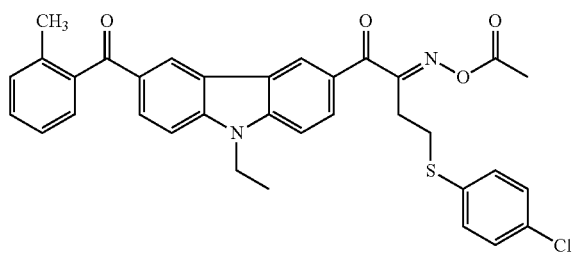 [SMILES: CCn1c2ccc(C(=O)/C(CCSc3ccc(Cl)cc3)=N/OC(C)=O)cc2c2cc(C(=O)c3ccccc3C)ccc21]

Surfactant 11: 1 Mass % PGMEA Solution of the Mixture (Mw=14,000).

In the following formula, % that indicates a proportion of the repeating unit is mass %.

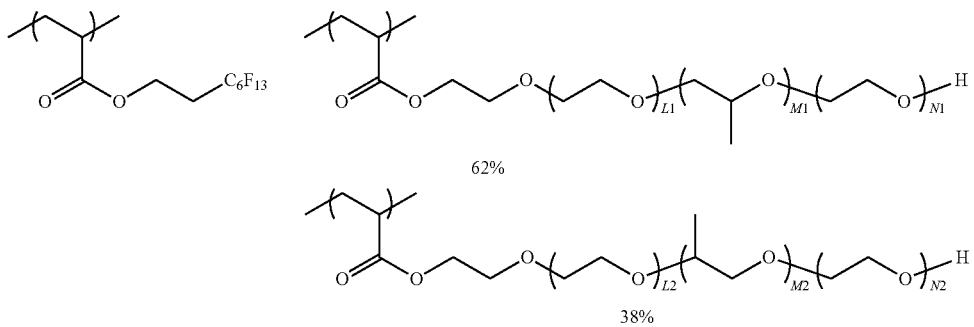

L1 + N1 + L2 + N2 = 14
M1 + M2 = 17

Silane Coupling Agent: Compound Having the Following Structure.

In the following structural formula, Et represents an ethyl group.

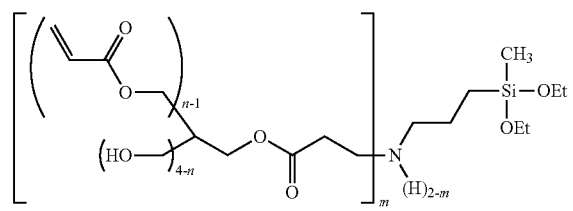

n = 4, 3, 2
(n = main reactant)
m = 2 or 1
(m = 2 main product)

EXPLANATION OF REFERENCES

110: solid-state imaging element
111: near infrared cut filter
112: color filter
114: infrared transmitting filter
115: microlens
116: planarizing layer

What is claimed is:

1. A pigment dispersion liquid comprising:
a near infrared absorbing organic pigment having a maximum absorption wavelength in a wavelength range of 600 to 1,200 nm;
two or more kinds of pigment derivatives having different structures; and
a solvent,
wherein the two or more kinds of pigment derivatives are compounds having a coloring agent structure having a skeleton common to the near infrared absorbing organic pigment and are compounds represented by Formula (1), $$P\text{-}(\text{-}L\text{-}(X)_n)_m \tag{1}$$

in Formula (1), P represents a coloring agent structure, L represents a single bond or a linking group, X represents a carboxyl group, a sulfo group, a phthalimide group, or a group represented by Formulae (X-1) to (X-9), m represents an integer of 1 or more, n represents an integer of 1 or more, in a case where m is 2 or more, a plurality of L's and X's may be different from each other, and in a case where n is 2 or more, a plurality of X's may be different from each other,
wherein the coloring agent structure represented by P in Formula (1) is selected from a pyrrolo pyrrole coloring agent structure, a squarylium coloring agent structure, a cyanine compound, a phthalocyanine compound, and a diiminium compound,
wherein the compound represented by Formula (1) is a compound represented by Formula (1a) when the coloring agent structure represented by P is the pyrrolo pyrrole coloring agent structure

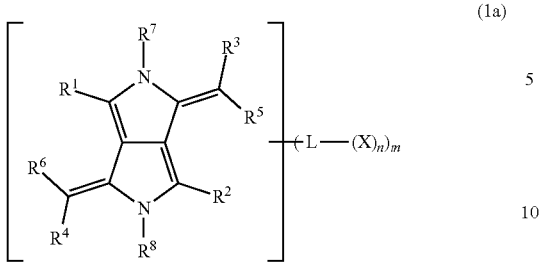

(1a)

wherein in Formula (1a), $R^1$ and $R^2$ each independently represent an alkyl group, an aryl group, or a heteroaryl group, L-(X)$_n$ of Formula (1a) is bonded to at least one of $R^1$ or $R^2$, $R^3$, $R^4$, $R^5$, and $R^6$ each independently represent a cyano group, an acyl group, an alkoxycarbonyl group, an alkylsulfinyl group, an arylsulfinyl group, or a heteroaryl group, $R^7$ and $R^8$ each independently represent a hydrogen atom, an alkyl group, an aryl group, a heteroaryl group, —$BR^9R^{10}$, or a metal atom, $R^7$ may form a covalent bond or a coordinate bond with $R^1$, $R^3$, or $R^5$, $R^8$ may form a covalent bond or a coordinate bond with $R^2$, $R^4$, or $R^6$, $R^9$ and $R^{10}$ each independently represent a hydrogen atom, a halogen atom, an alkyl group, an alkenyl group, an aryl group, a heteroaryl group, an alkoxy group, an aryloxy group, or a heteroaryloxy group, and $R^9$ and $R^{10}$ are bonded to each other to form a ring, L represents an alkylene group, an arylene group, a nitrogen-containing heterocyclic group, —O—, —S—, —NR'—, —CO—, —COO—, —OCO—, —SO$_2$—, or a group obtained by combining these; and R' represents a hydrogen atom, an alkyl group, or an aryl group, X represents a carboxyl group, a sulfo group, a phthalimide group, or a group represented by Formulae (X-1) to (X-9):

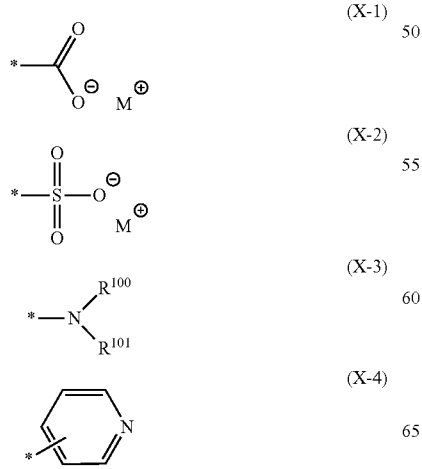

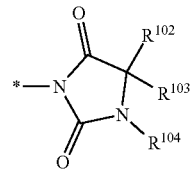

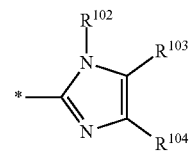

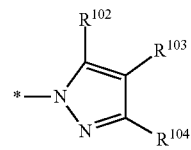

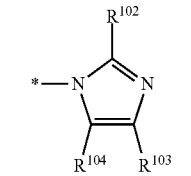

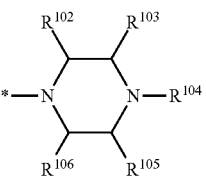

in Formulae (X-1) to (X-9), * represents a linking hand, $R^{100}$ to $R^{106}$ each independently represent a hydrogen atom, an alkyl group, an alkenyl group, or an aryl group, $R^{100}$ and $R^{101}$ may be linked to each other to form a ring, and M represents an anion and an atom or an atomic group constituting a salt, and m represents an integer of 1 to 10, n represents an integer of 1 to 10, in a case where m is 2 or more, a plurality of L's and X's may be different from each other, and in a case where n is 2 or more, a plurality of X's may be different from each other, wherein a total content of the pigment derivatives is 5 to 30 parts by mass with respect to 100 parts by mass of the near infrared absorbing organic pigment.

2. The pigment dispersion liquid according to claim 1, wherein the near infrared absorbing organic pigment has a maximum absorption wavelength in a wavelength range of 700 to 1,000 nm.

3. The pigment dispersion liquid according to claim 1, wherein at least two kinds of the two or more kinds of pigment derivatives having different structures are compounds in which L's in Formula (1) are linking groups of a structural isomer.

4. The pigment dispersion liquid according to claim 1, wherein in the two or more kinds of pigment derivatives having different structures, a difference in the numbers of carbon atoms of L's in Formula (1) is 6 or less.

5. The pigment dispersion liquid according to claim 1, wherein at least two kinds of the two or more kinds of pigment derivatives having different structures are compounds having different X's in Formula (1).

6. The pigment dispersion liquid according to claim 1, wherein the coloring agent structure represented by P in Formula (1) is a coloring agent structure derived from a coloring agent compound having a π conjugate plane including a monocyclic or fused aromatic ring.

7. The pigment dispersion liquid according to claim 1, wherein the coloring agent structure represented by P in Formula (1) is a pyrrolo pyrrole coloring agent structure or a squarylium coloring agent structure.

8. The pigment dispersion liquid according to claim 1, wherein a content of one kind of the pigment derivative included in the two or more kinds of the pigment derivatives having different structures is 99 mass % or less.

9. The pigment dispersion liquid according to claim 1, wherein the compound represented by Formula (1a) is a compound represented by Formula (1a-1):

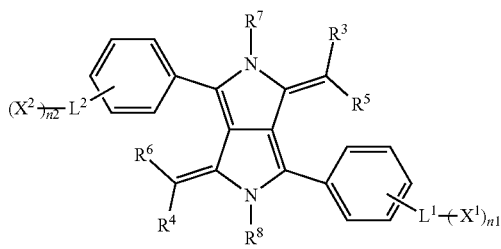

(1a-1)

wherein in Formula (1a-1), $R^3$, $R^4$, $R^5$, and $R^6$ each independently represent a cyano group, an acyl group, an alkoxycarbonyl group, an alkylsulfinyl group, an arylsulfinyl group, or a heteroaryl group, $R^7$ and $R^8$ each independently represent a hydrogen atom, an alkyl group, an aryl group, a heteroaryl group, —$BR^9R^{10}$, or a metal atom, $R^7$ may form a covalent bond or a coordinate bond with $R^3$ or $R^5$, $R^8$ may form a covalent bond or a coordinate bond with $R^4$ or $R^6$, $R^9$ and $R^{10}$ each independently represent a hydrogen atom, a halogen atom, an alkyl group, an alkenyl group, an aryl group, a heteroaryl group, an alkoxy group, an aryloxy group, or a heteroaryloxy group, and $R^9$ and $R^{10}$ are bonded to each other to form a ring, $L^1$ and $L^2$ each independently represent a single bond, an alkylene group, an arylene group, a nitrogen-containing heterocyclic group, —O—, —S—, —NR'—, —CO—, —$SO_2$—, a linking group obtained by combining these, and R' represents a hydrogen atom, an alkyl group, or an aryl group, $X^1$ and $X^2$ each independently represent a carboxyl group, a sulfo group, a phthalimide group, or a group represented by Formulae (X-1) to (X-9), and n1 and n2 each independently represent 0 to 4, and at least one of n1 or n2 is 1 or more.

10. The pigment dispersion liquid according to claim 1, wherein in Formula (1), P represents a squarylium coloring agent structure.

11. The pigment dispersion liquid according to claim 1, wherein in Formula (1), P represents a coloring agent structure derived from a coloring agent compound having a maximum absorption wavelength in the wavelength range of 700 to 1,000 nm.

12. The pigment dispersion liquid according to claim 1, wherein the near infrared absorbing organic pigment is a pyrrolo pyrrole compound and the pigment derivative is a compound represented by Formula (1a).

13. The pigment dispersion liquid according to claim 1, wherein the near infrared absorbing organic pigment is a squarylium compound and the coloring agent structure represented by P in Formula (1) is a squarylium coloring agent structure.

14. A curable composition comprising:
the pigment dispersion liquid according to claim 1; and
a curable compound.

15. The curable composition according to claim 14, wherein a content of a chromatic colorant is 0.005 mass % or less with respect to the total solid content of the curable composition.

16. A film formed of the curable composition according to claim 14.

17. A near infrared cut filter comprising: the film according to claim 16.

18. A solid-state imaging element comprising: the film according to claim 16.

19. An image display device comprising: the film according to claim 16.

20. An infrared sensor comprising: the film according to claim 16.

21. A pigment dispersion liquid comprising:
a near infrared absorbing organic pigment having a maximum absorption wavelength in a wavelength range of 600 to 1,200 nm;
two or more kinds of pigment derivatives having different structures; and
a solvent,
wherein the two or more kinds of pigment derivatives are compounds having a coloring agent structure having a skeleton common to the near infrared absorbing organic pigment and are compounds represented by Formula (1), P-(-L-(X)$_n$)$_m$     (1)

in Formula (1), P represents a coloring agent structure, L represents a single bond or a linking group, X represents a carboxyl group, a sulfo group, a phthalimide group, or a group represented by Formulae (X-1) to (X-9), m represents an integer of 1 or more, n represents an integer of 1 or more, in a case where m is 2 or more, a plurality of L's and X's may be different from each other, and in a case where n is 2 or more, a plurality of X's may be different from each other, wherein the coloring agent structure represented by P in Formula (1) is a pyrrolo pyrrole coloring agent structure, wherein the compound represented by Formula (1) is a compound represented by Formula (1a) when the coloring agent structure represented by P is the pyrrolo pyrrole coloring agent structure

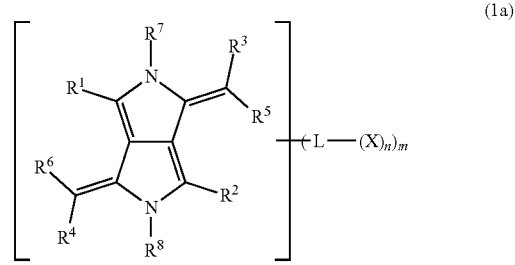

(1a)

wherein in Formula (1a), $R^1$ and R each independently represent an alkyl group, an aryl group, or a heteroaryl group, L-(X)$_n$ of Formula (1a) is bonded to at least one of $R^1$ or $R^2$, $R^3$, $R^4$, $R^5$, and $R^6$ each independently represent a cyano group, an acyl group, an alkoxycarbonyl group, an alkylsulfinyl group, an arylsulfinyl group, or a heteroaryl group, $R^7$ and $R^8$ each independently represent a hydrogen atom, an alkyl group, an aryl group, a heteroaryl group, —$BR^9R^{10}$, or a metal atom, $R^7$ may form a covalent bond or a coordinate bond with $R^1$, $R^3$, or $R^5$, $R^8$ may form a covalent bond or a coordinate bond with $R^2$, $R^4$, or $R^6$, $R^9$ and $R^{10}$ each independently represent a hydrogen atom, a halogen atom, an alkyl group, an alkenyl group, an aryl group, a heteroaryl group, an alkoxy group, an aryloxy group, or a heteroaryloxy group, and $R^9$ and $R^{10}$ are bonded to each other to form a ring, L represents an alkylene group, an arylene group, a nitrogen-containing heterocyclic group, —O—, —S—, —NR'—, —CO—, —COO—, —OCO—, —SO$_2$—, or a group obtained by combining these; and R' represents a hydrogen atom, an alkyl group, or an aryl group, X represents a carboxyl group, a sulfo group, a phthalimide group, or a group represented by Formulae (X-1) to (X-9):

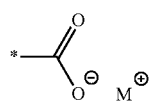 (X-1)

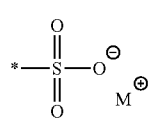 (X-2)

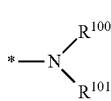 (X-3)

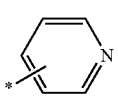 (X-4)

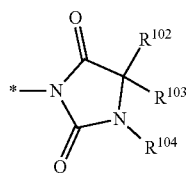 (X-5)

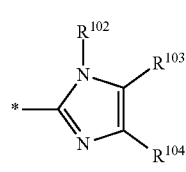 (X-6)

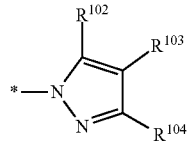 (X-7)

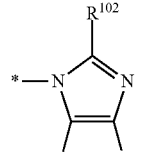 (X-8)

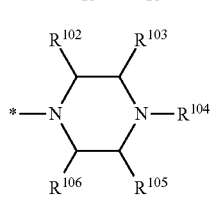 (X-9)

in Formulae (X-1) to (X-9), * represents a linking hand, $R^{100}$ to $R^{106}$ each independently represent a hydrogen atom, an alkyl group, an alkenyl group, or an aryl group, $R^{100}$ and $R^{101}$ may be linked to each other to form a ring, and M represents an anion and an atom or an atomic group constituting a salt, and m represents an integer of 1 to 10, n represents an integer of 1 to 10, in a case where m is 2 or more, a plurality of L's and X's may be different from each other, and in a case where n is 2 or more, a plurality of X's may be different from each other.

22. A pigment dispersion liquid comprising:

a near infrared absorbing organic pigment having a maximum absorption wavelength in a wavelength range of 600 to 1,200 nm;

two or more kinds of pigment derivatives having different structures; and a solvent, wherein the two or more kinds of pigment derivatives are compounds having a coloring agent structure having a skeleton common to the near infrared absorbing organic pigment and are compounds represented by Formula (1), P-(-L-(X)$_n$)$_m$  (1)

in Formula (1), P represents a coloring agent structure, L represents a single bond or a linking group, X represents a carboxyl group or a sulfo group, m represents an integer of 1 or more, n represents an integer of 1 or more, in a case where m is 2 or more, a plurality of L's and X's may be different from each other, and in a case where n is 2 or more, a plurality of X's may be different from each other, wherein the coloring agent structure represented by P in Formula (1) is selected from a pyrrolo pyrrole coloring agent structure, a squarylium coloring agent structure, a cyanine compound, a phthalocyanine compound, and a diiminium compound, wherein the compound represented by Formula (1) is a compound represented by Formula (1a) when the coloring agent structure represented by P is the pyrrolo pyrrole coloring agent structure

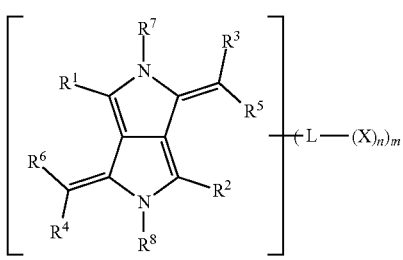

(1a)

wherein in Formula (1a), $R^1$ and $R^2$ each independently represent an alkyl group, an aryl group, or a heteroaryl group, -L-(X)$_n$ of Formula (1a) is bonded to at least one of $R^1$ or $R^2$, $R^3$, $R^4$, $R^5$, and $R^6$ each independently represent a cyano group, an acyl group, an alkoxycarbonyl group, an alkylsulfinyl group, an arylsulfinyl group, or a heteroaryl group, $R^7$ and $R^8$ each independently represent a hydrogen atom, an alkyl group, an aryl group, a heteroaryl group, —BR$^9$R$^{10}$, or a metal atom, $R^7$ may form a covalent bond or a coordinate bond with $R^1$, $R^3$, or $R^5$, $R^8$ may form a covalent bond or a coordinate bond with $R^2$, $R^4$, or $R^6$, $R^9$ and $R^{10}$ each independently represent a hydrogen atom, a halogen atom, an alkyl group, an alkenyl group, an aryl group, a heteroaryl group, an alkoxy group, an aryloxy group, or a heteroaryloxy group, and $R^9$ and $R^{10}$ are bonded to each other to form a ring, L represents an alkylene group, an arylene group, a nitrogen-containing heterocyclic group, —O—, —S—, —NR'—, —CO—, —COO—, —OCO—, —SO$_2$—, or a group obtained by combining these; and R' represents a hydrogen atom, an alkyl group, or an aryl group, X represents a carboxyl group or a sulfo group, and m represents an integer of 1 to 10, n represents an integer of 1 to 10, in a case where m is 2 or more, a plurality of L's and X's may be different from each other, and in a case where n is 2 or more, a plurality of X's may be different from each other.

* * * * *